(12) United States Patent
Fujimatsu et al.

(10) Patent No.: US 12,073,350 B2
(45) Date of Patent: Aug. 27, 2024

(54) METHOD OF PREDICTING SOYBEAN YIELD

(71) Applicant: KAO CORPORATION, Tokyo (JP)

(72) Inventors: Teruhisa Fujimatsu, Utsunomiya (JP); Mai Suetsugu, Wakayama (JP); Jun Deguchi, Shinjuku-ku (JP); Keiji Endo, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 17/603,731

(22) PCT Filed: Apr. 16, 2020

(86) PCT No.: PCT/JP2020/016687
§ 371 (c)(1),
(2) Date: Oct. 14, 2021

(87) PCT Pub. No.: WO2020/213672
PCT Pub. Date: Oct. 22, 2020

(65) Prior Publication Data
US 2022/0198360 A1 Jun. 23, 2022

(30) Foreign Application Priority Data

Apr. 16, 2019 (JP) ................... 2019-078179
Apr. 16, 2019 (JP) ................... 2019-078180

(51) Int. Cl.
*G06Q 10/0637* (2023.01)
*G06Q 10/0639* (2023.01)
*G06Q 50/02* (2024.01)

(52) U.S. Cl.
CPC . *G06Q 10/06375* (2013.01); *G06Q 10/06395* (2013.01); *G06Q 50/02* (2013.01)

(58) Field of Classification Search
CPC ....... G06Q 10/06375; G06Q 10/06395; G06Q 50/02; A01G 7/00
See application file for complete search history.

(56) References Cited

U.S. PATENT DOCUMENTS 5,516,528 A 5/1996 Hughes et al.
5,821,361 A 10/1998 Waggle et al.
(Continued)

FOREIGN PATENT DOCUMENTS

CN 101891796 A 11/2010
CN 102768246 A * 11/2012
(Continued)

OTHER PUBLICATIONS

Ma, et al., "Early Prediction of Soybean Yield from Canopy Reflectance Measurements", Agronomy Journal, vol. 93, pp. 1227-1234. Nov.-Dec. 2002. (Year: 2002).*
(Continued)

*Primary Examiner* — Pan G Choy
(74) *Attorney, Agent, or Firm* — Oblon, McClelland, Maier & Neustadt, L.L.P.

(57) ABSTRACT

To provide a method for predicting a soybean yield at an early stage with high accuracy.
The method for predicting a soybean yield comprises: acquiring analytical data of one or more components from a leaf sample collected from the soybean; and predicting a soybean yield using a correlation between the data and a soybean yield.

27 Claims, 14 Drawing Sheets

(56) References Cited

U.S. PATENT DOCUMENTS

| | | | |
|---|---|---|---|
| 8,324,457 B2* | 12/2012 | Guida, Jr | C12N 15/8274 800/300 |
| 2005/0108794 A1* | 5/2005 | Stephens | A01H 6/542 800/312 |
| 2005/0234691 A1* | 10/2005 | Singh | G06Q 10/04 703/11 |
| 2010/0093537 A1 | 4/2010 | Smith et al. | |
| 2012/0119080 A1 | 5/2012 | Hazebroek et al. | |
| 2014/0189903 A1 | 7/2014 | Duncan et al. | |
| 2014/0373191 A1* | 12/2014 | Beazley | C12N 15/8286 435/6.12 |
| 2016/0081285 A1 | 3/2016 | Deblock | |
| 2020/0025762 A1* | 1/2020 | Edwards | C12Q 1/6895 |

FOREIGN PATENT DOCUMENTS

| | | | |
|---|---|---|---|
| CN | 102768246 A | | 11/2012 |
| CN | 103323557 A | | 9/2013 |
| CN | 104718293 A * | 6/2015 | ......... C12N 15/8277 |
| CN | 106706820 A | | 5/2017 |
| CN | 108271389 A * | 7/2018 | ......... C12N 15/8213 |
| CN | 109444314 A | | 3/2019 |
| CN | 109509112 A * | 3/2019 | |
| HU | 0001798 A2 * | 9/2009 | |
| JP | 10-67770 A | | 3/1998 |
| JP | 2017-209027 A | | 11/2017 |
| JP | 2018-62492 A | | 4/2018 |
| JP | 2020174553 A * | 10/2020 | ....... G06Q 10/06375 |
| WO | WO-2010080829 A1 * | 7/2010 | ......... C12N 15/8271 |
| WO | 2015/034344 A1 | | 3/2015 |
| WO | WO-2020213672 A1 * | 10/2020 | ....... G06Q 10/06375 |

OTHER PUBLICATIONS

Christenson et al., "Predicting Soybean Relative Maturity and Seed Yield Using Canopy Reflectance", Crop Science, vol. 56, Mar.-Apr. 2016. (Year: 2016).*

Yang et al., "Predicting Soybean Yield in a dry and wet year using a soil productivity index", Department of Soil & Atmospheric Science, Department of Biological Engineering, University of Missouri, Columbia, MO USA. Plan and Soil 250: 175-182, 2003. (Year: 2003).*

Hassanijalilian, "Soybean leaf chlorophyll estimation and iron deficiency field rating determination at plot and field scales through image processing and machine learning", Submitted to the Graduate Faculty of the North Dakota State University of Agriculture and Applied Science. Jul. 2020. (Year: 2020).*

Cox et al., "Characterization of the Relationships between Soybean Yield, Trifoliolate Leaf Chloride Concentration, and Cultivar Chloride Inclusion/Exclusion Rating". University of Arkansas Bachelor of Science in Agriculture, 2015. (Year: 2015).*

International Search Report issued Jul. 21, 2020 in PCT/JP2020/016687 filed Apr. 16, 2020, citing documents AA-AE and AM-AT therein, 3 pages.

Yoichi Fujita, et al., "Yield components and growth indicators based on high-yielding cases of soybean "Enrei" in heavy clay areas," Fiscal Year Research Result Information, 2009, 4 pages (with English machine translation).

Ken-ichi Inoue, et al., "Analytical Studies of Growth Pattern in High Yielding Soybean from the Viewpoint of Dry Matter Production and Nitrogen Assimilation—in case of soybean cultivar "Enrei" on the farmers' field in Fukui prefecture," 229th Meeting of Crop Science Society of Japan, Collection of abstracts, 2018, 4 pages (with English machine translation).

Yuya Chonan, et al., "Easy Growth Diagnosis Method of Soybean before Flowering," 245th Meeting of Crop Science Society of Japan, collection of abstracts, 2018, 3 pages (with English machine translation).

Tomoya Watanabe, et al., "Evaluation of Soybean Yield Using Non-destructive Measurement and Convolutional Neural Network," 245th Meeting of Crop Science Society of Japan, collection of abstracts, 2018, 3 pages (with English machine translation).

Zhiwu Dan, et al., "Metabolic prediction of important agronomic traits in hybrid rice (*Oryza sativa* L.)," Scientific Reports, vol. 6, 21732, 2016, 9 pages.

* cited by examiner

METHOD OF PREDICTING SOYBEAN YIELD

FIELD OF THE INVENTION

The present invention relates to a method for predicting a soybean yield at an early stage.

BACKGROUND OF THE INVENTION

Soybean is an important grain, and is widely eaten throughout the world including Japan. In addition, unlike other representative grains such as rice, wheat and corn, soybean has higher percentages of protein and lipid and is rich in nutritive values. Thus, it is important as feeds or fat/oil materials, and techniques for increasing a yield have been developed.

The growth period of soybeans varies slightly depending on the varieties or cultivation conditions, and it usually needs a long period of 4 to 5 months from the seeding to the harvesting. Thus, in the development of techniques for increasing a soybean yield, a long period of time is required for cultivation a yield evaluation. Further, under seasonal/climate conditions in Japan, a soybean which needs 4 to 5 months to harvest is usually cultivated once a year. A yield evaluation for outdoor cultivation can be carried out only once a year, and this is an impediment to develop techniques for increasing a yield; and therefore, a method for predicting a yield at an early stage has been demanded. Further, if a yield can be predicted at an early stage in actual production scenes, a producer can easily determine whether or not an additional costly technique should be input to secure a stable yield.

Various methods to evaluate a yield performance at an early stage using a correlation between a growth status of a plant during growth and a yield have been studied so far. For example, Non-Patent Literature 1 discloses a method utilizing a correlation (r=0.51) between a yield and a main stem length measured around 40th days after seeding of soybean; and Non-Patent Literature 2 discloses a method utilizing a correlation (r=0.66) between a yield and a dry weight of an aboveground part measured around 60th to 70th days after seeding. In addition, Non-Patent Literatures 3 and 4 disclose attempts to evaluate a growth or a yield performance by measuring NDVI (normalized difference vegetation index) or LAI (leaf area index), and canopy spectral reflectance in a farm field by use of an imaging diagnostic technology.

However, the method of Non-Patent Literature 1 has the potential to predict a yield at a relatively early stage while being insufficient in the correlation. Further, the method of Non-Patent Literature 2 improves the correlation; however, the prediction timing thereof is 2 months or later from the start of cultivation, that is the lapse of a half of growth period; and it is invasive since it measures a dry weight of an aboveground part, and it is not suitable for evaluation in case of matching a predictive factor of an individual plant with a yield. The methods of Non-Patent Literatures 3 and 4 are a non-invasive and simple measurement method; however, the prediction timing is a flowering period, that is about 50th days or later after seeding, and they are not sufficient in the accuracy.

In addition to the above, for rice, there is a report that metabolites extracted from an aboveground part around 15 days after seeding are measured comprehensively by GC-MS, and data obtained therefrom is used to create a hybrid rice yield prediction model (Non-Patent Literature 5). In this report, cross validation, which is predictability evaluation of a model, is not carried out though it is usually carried out at the time of construction of a prediction model, and therefore, the verification thereof is not sufficient. Further, it is invasive and it is not suitable for evaluation in case of matching a predictive factor of an individual plant with a yield.

Non-Patent Literature 1

Yoichi Fujita, et al., Heisei 21 (2009) Fiscal Year Research Result Information "Kanto-Tokai-Hokuriku Agriculture, "Yield elements and growth index based high-yielding cases of soybean "ENREI" in heavy soil areas," http://www.naro.affrc.go.jp/org/narc/seika/kanto21/12/21_12_04.html

Non-Patent Literature 2

Ken-ichi Inoue and Masaki Takahashi, 229th Meeting of Crop Science Society of Japan, Collection of abstracts, 2010, page 50, "Analytical Studies of Growth Patten in High Yielding Soybean from the Viewpoint of Dry Matter Production and Nitrogen Assimilation"

Non-Patent Literature 3

Yuya Chonan, et al., 245th Meeting of Crop Science Society of Japan, collection of abstracts, 2018, page 83, "Easy Growth Diagnosis Method of Soybean before flowering"

Non-Patent Literature 4

Tomoya Watanabe, et al., 245th Meeting of Crop Science Society of Japan, collection of abstracts, 2018, page 84, "Evaluation of Soybean Yield Using Non-destructive Measurement and Convolutional Neural Network"

Non-Patent Literature 5

Dan, Z. et al., Scientific Reports, 2016, 6, 21732

SUMMARY OF INVENTION

First, the present invention provides a method for predicting a soybean yield, which comprises acquiring analytical data of one or more components from a leaf sample collected from soybean, and predicting a soybean yield by using a correlation between the data and a soybean yield.

Second, the present invention provides a method for predicting a soybean yield, which comprises acquiring analytical data of one or more components from a leaf sample collected from soybeans and predicting a soybean yield using a correlation between the data and a soybean yield, wherein the component is one or more selected from the group consisting of 2-hydroxypyridine, choline, citric acid, glyceric acid, glycine, L-pyroglutamic acid, malonic acid, sucrose and threitol.

DETAILED DESCRIPTION OF THE INVENTION

Figure 1A:
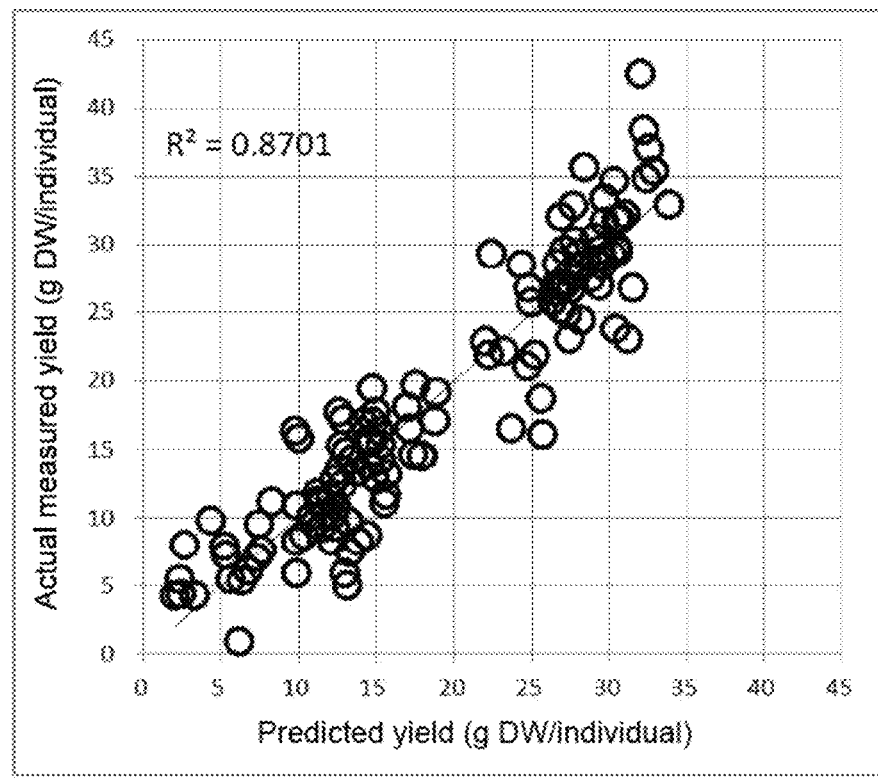
FIG. 1A shows a relationship between predicted values and actual measured values of yields for an OPLS model constructed using all of 125 data items.

The present invention relates to a provision of a method for predicting a soybean yield at an early stage with accuracy.

As a result of various studies on yield evaluation of soybean, the present inventors found that some metabolites contained in leaves are components whose abundances correlate with a yield; and a final yield can be evaluated at an individual level by collecting one developed leaf at an early stage about 1 month after seeding and analyzing components contained in the leaf.

According to the method of the present invention, a soybean yield can be predicted at an early stage. This makes it easy to determine that an additional technology should be input to secure a yield, for example, additionally enabling a significant efficiency improvement in the development of yield-increasing technologies.

In the present invention, soybean means an annual leguminous plant (scientific name: *Glycine max*). Examples of varieties thereof are wide and include Fukuyutaka, Enrei, Satono hohoemi, Yuagari musume, Ryuhou, and Suzuyutaka; however, in the present invention, they are not limited thereto.

Growth stages from the budding to the defoliation of soybean are divided into VC: cotyledon stage (about 7 days after seeding), R1-2: bloom stage (about 50 days after seeding), R3-4: pod stage (about 70 days after seeding), and R5-6: seed stage (about 90 days after seeding) (Fehr, W. R., Caviness, C. E., 1977, Stages of soybean development, Cooperative Extension Service, Agriculture and Home Economics Experiment Station, Iowa State University, Ames, Iowa). In the present invention, a soybean leaf to be used as a sample may be collected during a period from the cotyledon stage (VC) to the seed stage (R5-6), in which a leaf can be collected, preferably from the cotyledon stage to R3-4 stage, more preferably 14 days after seeding to R3-4 stage, more preferably 21 days after seeding to R1-2 stage, and further preferably 28 days after seeding to R1-2 stage. Note that the range of days indicated by the term "about" in each growth stage is suitably within 10 days.

Alternatively, the timing to collect a soybean leaf is 7 days or later, preferably 14 days or later, more preferably 21 days or later, and further preferably 28 days or later after seeding; and preferably 50 days or earlier, more preferably 40 days or earlier after seeding, and further preferably 35 days or earlier after seeding. In addition, the timing may be from 7 to 50 days, preferably 14 to 40 days, and more preferably 28 to 35 days after seeding. For example, a leaf is suitably collected from a soybean on 30 days±3 to 5 days after seeding.

A portion from which a leaf is collected is not particularly limited; but for example, a central compound leaf may be collected from three compound leaves forming true leaves with one or two foliar ages of true leaves developed at the uppermost node.

In the present invention, examples of the obtained analytical data of components include data analyzed and measured by use of instrumental analysis means such as high performance liquid chromatography (HPLC), gas chromatography (GC), ion chromatography, mass spectrometry (MS), near-infrared spectroscopy (NIR), Fourier transform infrared spectroscopy (FT-IR), nuclear magnetic resonance spectrometry (NMR), Fourier transform nuclear magnetic resonance spectrometry (FT-NMR), inductively coupled plasma mass spectrometry (ICP-MS), and combination of liquid chromatograph and mass spectrometry, LC/MS. Data of mass spectroscopy is preferred, and data of mass spectroscopy by LC/MS is more preferred.

Examples of the data of mass spectroscopy include accurate mass ("m/z value"), ionic strength and retention time, and information on accurate mass is preferred.

For application of a leaf sample to the above instrumental analysis means, the leaf sample is appropriately pre-treated depending on analytical means; however, usually, a collected leaf is covered with an aluminum foil, and immediately, frozen in liquid nitrogen to stop metabolic reaction; and dried by freeze-drying, and then, subjected to extraction.

The extraction is conducted by pulverizing a freeze-dried leaf sample by use of a bead pulverizer, etc. and then adding an extraction solvent and stirring. Examples of the extraction solvent used herein include methanol, ethanol, butanol, acetonitrile, chloroform, ethyl acetate, hexane, acetone, isopropanol and water, and mixtures thereof. When LC/MS is used as analytical means, an internal standard material-added 80 v/v % methanol aqueous solution is suitably used.

In a first invention, examples of components in a leaf to be analyzed include metabolites of soybean, which are separated and detected by LC/MS. Preferred are components with an accurate mass (m/z) of 139 to 1,156, which is provided by mass spectrometry. More preferred are 431 components described in the following Tables A1a to A1c, which are defined by an accurate mass (m/z value) provided by mass spectrometry. In the case that a partially decomposed substance from a metabolite and a molecular ion peak of a different adduct (M+H, M+Na, etc.) are produced in the process of separation and detection by LC/MC, a detected partially decomposed substance is identified as a separate component from an original metabolite.

TABLE A1a

| Component No. | m/z | Component No. | m/z | Component No. | m/z | Component No. | m/z |
|---|---|---|---|---|---|---|---|
| 1 | 139.0389 | 41 | 209.1545 | 81 | 259.0827 | 121 | 288.2911 |
| 2 | 141.9592 | 42 | 209.1548 | 82 | 259.2076 | 122 | 289.0727 |
| 3 | 147.0435 | 43 | 211.0608 | 83 | 261.1501 | 123 | 289.1228 |
| 4 | 147.0446 | 44 | 213.1503 | 84 | 261.2233 | 124 | 291.0401 |
| 5 | 149.0234 | 45 | 214.2539 | 85 | 263.2381 | 125 | 291.1973 |

TABLE A1a-continued

| Component No. | m/z | Component No. | m/z | Component No. | m/z | Component No. | m/z |
|---|---|---|---|---|---|---|---|
| 6 | 149.0241 | 46 | 217.1961 | 86 | 264.2335 | 126 | 291.1975 |
| 7 | 161.0606 | 47 | 219.1754 | 87 | 265.1440 | 127 | 291.2340 |
| 8 | 163.0398 | 48 | 219.1950 | 88 | 269.0818 | 128 | 293.2118 |
| 9 | 163.1325 | 49 | 220.1137 | 89 | 271.0618 | 129 | 293.2130 |
| 10 | 165.0550 | 50 | 221.0456 | 90 | 271.0619 | 130 | 293.2498 |
| 11 | 170.0974 | 51 | 221.6020 | 91 | 271.2280 | 131 | 295.0936 |
| 12 | 171.1501 | 52 | 225.1500 | 92 | 273.0769 | 132 | 295.1037 |
| 13 | 175.1486 | 53 | 225.1972 | 93 | 274.0541 | 133 | 295.1299 |
| 14 | 177.0551 | 54 | 226.0991 | 94 | 274.0928 | 134 | 295.2288 |
| 15 | 179.0717 | 55 | 226.1610 | 95 | 274.1606 | 135 | 297.2436 |
| 16 | 181.1232 | 56 | 226.1812 | 96 | 275.2020 | 136 | 298.0986 |
| 17 | 181.1237 | 57 | 227.1286 | 97 | 275.2023 | 137 | 299.2023 |
| 18 | 183.1865 | 58 | 227.1294 | 98 | 277.2184 | 138 | 301.1424 |
| 19 | 186.0921 | 59 | 228.1954 | 99 | 277.2186 | 139 | 305.0674 |
| 20 | 189.1278 | 60 | 228.2321 | 100 | 277.2186 | 140 | 305.9907 |
| 21 | 190.0506 | 61 | 231.0512 | 101 | 279.0512 | 141 | 307.0128 |
| 22 | 191.1437 | 62 | 233.9842 | 102 | 279.0515 | 142 | 307.0943 |
| 23 | 191.1439 | 63 | 234.0928 | 103 | 279.0951 | 143 | 309.2075 |
| 24 | 193.0859 | 64 | 235.1702 | 104 | 279.1610 | 144 | 309.2228 |
| 25 | 193.0861 | 65 | 239.0562 | 105 | 279.1611 | 145 | 315.0062 |
| 26 | 193.1597 | 66 | 241.1446 | 106 | 279.2320 | 146 | 316.2134 |
| 27 | 194.1182 | 67 | 242.2485 | 107 | 279.2333 | 147 | 316.2865 |
| 28 | 195.0655 | 68 | 243.0667 | 108 | 279.2340 | 148 | 318.2806 |
| 29 | 196.1127 | 69 | 243.1608 | 109 | 279.2343 | 149 | 319.1536 |
| 30 | 197.1181 | 70 | 243.2114 | 110 | 281.2485 | 150 | 319.2853 |
| 31 | 199.1333 | 71 | 245.2281 | 111 | 282.1376 | 151 | 320.9916 |
| 32 | 199.1818 | 72 | 249.0621 | 112 | 282.2236 | 152 | 321.0632 |
| 33 | 200.2382 | 73 | 252.0874 | 113 | 282.2800 | 153 | 321.0983 |
| 34 | 205.0872 | 74 | 252.0882 | 114 | 284.2960 | 154 | 321.1463 |
| 35 | 205.0983 | 75 | 253.2170 | 115 | 285.1255 | 155 | 322.2765 |
| 36 | 207.0650 | 76 | 255.0669 | 116 | 285.1713 | 156 | 323.0751 |
| 37 | 207.1390 | 77 | 256.2649 | 117 | 285.1718 | 157 | 323.1290 |
| 38 | 209.1171 | 78 | 256.2650 | 118 | 285.6271 | 158 | 325.1444 |
| 39 | 209.1178 | 79 | 257.0660 | 119 | 287.0566 | 159 | 327.0795 |
| 40 | 209.1538 | 80 | 257.1908 | 120 | 287.0567 | 160 | 327.2336 |

TABLE A1b

| Component No. | m/z | Component No. | m/z | Component No. | m/z | Component No. | m/z |
|---|---|---|---|---|---|---|---|
| 161 | 327.2340 | 201 | 363.2553 | 241 | 401.0882 | 281 | 435.1300 |
| 162 | 329.1613 | 202 | 363.3128 | 242 | 401.0907 | 282 | 435.1304 |
| 163 | 331.1409 | 203 | 364.3237 | 243 | 401.0909 | 283 | 436.1466 |
| 164 | 333.1528 | 204 | 365.3202 | 244 | 401.2869 | 284 | 439.1991 |
| 165 | 335.1237 | 205 | 366.1783 | 245 | 401.7112 | 285 | 439.3603 |
| 166 | 335.1542 | 206 | 366.3393 | 246 | 403.2351 | 286 | 440.2333 |
| 167 | 335.2595 | 207 | 367.0343 | 247 | 404.1215 | 287 | 440.2513 |
| 168 | 335.2595 | 208 | 367.2635 | 248 | 404.2102 | 288 | 441.3741 |
| 169 | 335.2600 | 209 | 367.2652 | 249 | 405.1316 | 289 | 441.3746 |
| 170 | 336.3128 | 210 | 369.0831 | 250 | 405.3534 | 290 | 442.2570 |
| 171 | 337.0938 | 211 | 369.1268 | 251 | 405.3538 | 291 | 443.1002 |
| 172 | 337.1724 | 212 | 371.1876 | 252 | 406.1362 | 292 | 443.1020 |
| 173 | 338.3440 | 213 | 371.1881 | 253 | 406.2078 | 293 | 445.2077 |
| 174 | 339.0715 | 214 | 371.2075 | 254 | 407.3688 | 294 | 448.1949 |
| 175 | 339.0734 | 215 | 372.1673 | 255 | 407.3692 | 295 | 449.1093 |
| 176 | 341.1385 | 216 | 373.0778 | 256 | 409.0757 | 296 | 449.1101 |
| 177 | 341.1451 | 217 | 373.1291 | 257 | 409.2738 | 297 | 454.2944 |
| 178 | 341.2680 | 218 | 374.1088 | 258 | 409.2749 | 298 | 455.1197 |
| 179 | 342.2139 | 219 | 374.1459 | 259 | 410.7059 | 299 | 457.2091 |
| 180 | 342.3390 | 220 | 375.2710 | 260 | 411.0022 | 300 | 457.2096 |
| 181 | 343.1022 | 221 | 379.0634 | 261 | 411.1627 | 301 | 461.1784 |
| 182 | 343.1042 | 222 | 380.3389 | 262 | 412.3808 | 302 | 466.2667 |
| 183 | 343.2288 | 223 | 382.2026 | 263 | 419.1201 | 303 | 468.2829 |
| 184 | 343.2292 | 224 | 383.0771 | 264 | 420.2238 | 304 | 468.3930 |
| 185 | 344.1358 | 225 | 383.2574 | 265 | 423.2245 | 305 | 469.1831 |
| 186 | 346.1516 | 226 | 383.2591 | 266 | 423.2762 | 306 | 471.2180 |
| 187 | 349.0912 | 227 | 385.2945 | 267 | 423.3643 | 307 | 471.2243 |
| 188 | 349.1485 | 228 | 387.0938 | 268 | 423.3644 | 308 | 473.1087 |
| 189 | 349.2761 | 229 | 387.1832 | 269 | 424.3649 | 309 | 473.2048 |
| 190 | 351.2558 | 230 | 387.2032 | 270 | 424.3681 | 310 | 474.1748 |
| 191 | 352.2528 | 231 | 388.1627 | 271 | 425.1943 | 311 | 477.1435 |
| 192 | 353.2713 | 232 | 390.1035 | 272 | 427.1044 | 312 | 478.1385 |

TABLE A1b-continued

| Component No. | m/z | Component No. | m/z | Component No. | m/z | Component No. | m/z |
| --- | --- | --- | --- | --- | --- | --- | --- |
| 193 | 355.0832 | 233 | 390.1892 | 273 | 431.1017 | 313 | 479.1907 |
| 194 | 355.1027 | 234 | 391.2862 | 274 | 432.2476 | 314 | 482.3270 |
| 195 | 357.1584 | 235 | 393.2811 | 275 | 432.2597 | 315 | 483.0931 |
| 196 | 357.1705 | 236 | 393.7143 | 276 | 433.1140 | 316 | 484.2764 |
| 197 | 358.1656 | 237 | 394.2089 | 277 | 433.1149 | 317 | 489.0813 |
| 198 | 358.9809 | 238 | 398.2341 | 278 | 433.1355 | 318 | 489.2158 |
| 199 | 361.2551 | 239 | 399.1645 | 279 | 434.1386 | 319 | 489.3604 |
| 200 | 362.0177 | 240 | 399.2520 | 280 | 434.2406 | 320 | 492.2465 |

TABLE A1c

| Component No. | m/z | Component No. | m/z | Component No. | m/z |
| --- | --- | --- | --- | --- | --- |
| 321 | 495.2516 | 361 | 567.4059 | 401 | 759.2281 |
| 322 | 495.2983 | 362 | 568.4282 | 402 | 771.5090 |
| 323 | 496.3441 | 363 | 577.3607 | 403 | 773.2175 |
| 324 | 497.3151 | 364 | 589.4859 | 404 | 773.5266 |
| 325 | 499.2284 | 365 | 593.2836 | 405 | 773.5271 |
| 326 | 501.7425 | 366 | 595.1687 | 406 | 786.4227 |
| 327 | 503.1948 | 367 | 595.3716 | 407 | 796.5558 |
| 328 | 503.2243 | 368 | 599.3987 | 408 | 806.5469 |
| 329 | 511.1280 | 369 | 599.3990 | 409 | 808.5582 |
| 330 | 511.3803 | 370 | 599.4149 | 410 | 811.5014 |
| 331 | 511.7557 | 371 | 607.2588 | 411 | 813.5185 |
| 332 | 512.2363 | 372 | 607.2968 | 412 | 820.4071 |
| 333 | 512.2555 | 373 | 608.3000 | 413 | 824.5537 |
| 334 | 513.2753 | 374 | 609.4550 | 414 | 824.5603 |
| 335 | 514.0452 | 375 | 611.1640 | 415 | 829.5145 |
| 336 | 514.7519 | 376 | 611.4690 | 416 | 840.5490 |
| 337 | 517.1378 | 377 | 611.4711 | 417 | 842.5683 |
| 338 | 517.3932 | 378 | 612.4753 | 418 | 847.5255 |
| 339 | 519.1171 | 379 | 613.4849 | 419 | 923.5063 |
| 340 | 519.2090 | 380 | 613.4871 | 420 | 923.5066 |
| 341 | 519.7403 | 381 | 614.4900 | 421 | 943.5349 |
| 342 | 520.1200 | 382 | 617.4082 | 422 | 945.5359 |
| 343 | 520.3438 | 383 | 617.4263 | 423 | 969.5500 |
| 344 | 521.2610 | 384 | 618.0719 | 424 | 970.6150 |
| 345 | 523.1272 | 385 | 621.2735 | 425 | 973.5566 |
| 346 | 524.3749 | 386 | 623.3030 | 426 | 975.5749 |
| 347 | 525.3656 | 387 | 627.4672 | 427 | 986.6112 |
| 348 | 529.3922 | 388 | 636.4255 | 428 | 1013.5361 |
| 349 | 529.3922 | 389 | 638.4423 | 429 | 1069.5653 |
| 350 | 535.2828 | 390 | 660.4261 | 430 | 1073.5610 |
| 351 | 541.3908 | 391 | 666.3033 | 431 | 1155.5683 |
| 352 | 545.3872 | 392 | 673.3398 | | |
| 353 | 547.1474 | 393 | 686.4532 | | |
| 354 | 549.3956 | 394 | 691.4073 | | |
| 355 | 550.2466 | 395 | 741.2290 | | |
| 356 | 551.2617 | 396 | 742.4794 | | |
| 357 | 551.4265 | 397 | 743.4423 | | |
| 358 | 562.7721 | 398 | 747.4319 | | |
| 359 | 563.3983 | 399 | 748.4819 | | |
| 360 | 566.1687 | 400 | 758.2248 | | |

The 431 components are selected and extracted from metabolites of soybean, and details of a selection method thereof are as shown in Examples. An outline thereof is: 1) 125 soybean plants different in varieties, soils and fertilizers are cultivated from 2015 to 2017; 2) one leaf of each plant was collected about 1 month after seeding; 3) components are extracted using a 80 v/v % methanol aqueous solution; 4) then, LC/MS analysis is conducted to obtain molecular ion information (accurate mass, m/z) and structure information derived from a fragment; and 5) component-derived peaks are extracted and then subjected to alignment treatment to align peaks among samples, removal of isotope peaks, peak intensity correction among samples, and noise removal, so that analytical data of 431 components are obtained. A method for peak intensity correction among samples is not particularly limited, but examples thereof include correction using a pooled QC method or an internal standard substance. The pooled QC method is to correct the sensitivity among samples by: mixing a certain amount of all samples in one batch to prepare samples called pooled QC; and conducting pooled QC analysis at a certain frequency (once in 5 to 9 times) between the samples, so that an estimated value on "what peak intensity each would have assuming that QC samples are analyzed at the time when each sample is analyzed" is calculated and the estimated value is used to conduct a correction treatment. Correction by use of an internal standard substance is to correct the sensitivity among samples by making correction by a value of a peak area of an internal standard substance (such as lidocaine and 10-camphorsulfonic acid), which is added in an equivalent amount to each sample. Note that a data correction method does not cause a significant impact on the correlation with a yield and the performance of a prediction model.

In addition, regarding the obtained 125 leaves, a correlational analysis between analytical data of 431 components and corresponding yield data are conducted (a simple correlation coefficient "r" between a peak area of analytical data of each component and a yield and a p value is calculated by an uncorrelation test); and as a result, it is indicated that certain components have a significant correlation with a yield (see Tables A3a to 3f described below).

Thus, a component to be analyzed in the present invention preferably includes components having a significant correlation ($p<0.05$) with a yield and an absolute value of correlation coefficient $|r|>0.51$ among 431 components, that is one or more selected from the group consisting of component Nos. 13, 14, 17, 20, 21, 22, 23, 28, 35, 36, 37, 39, 41, 42, 44, 47, 48, 51, 52, 54, 57, 58, 68, 71, 73, 80, 85, 86, 90, 91, 96, 98, 99, 100, 107, 108, 110, 122, 125, 131, 134, 135, 137, 139, 142, 149, 150, 153, 157, 159, 160, 161, 171, 174, 176, 179, 181, 182, 188, 202, 208, 209, 214, 215, 217, 218, 228, 230, 235, 244, 245, 246, 247, 249, 251, 252, 253, 261, 264, 268, 275, 278, 279, 280, 282, 283, 284, 288, 294, 296, 298, 299, 305, 308, 310, 313, 317, 325, 327, 329, 330, 341, 347, 353, 355, 356, 363, 367, 369, 370, 384, 389, 395, 421, 422, 423, 428 and 431. Note that the above components all have a VIP value, described below, of 1.16 or more, and if the VIP value is 1.30 or more, the absolute value of correlation coefficient $|r|$ is $>0.51$.

Further, the component to be analyzed in the present invention more preferably includes a component having a significant correlation ($p<0.05$) with a yield and an absolute value of correlation coefficient $|r|>0.63$ among 431 components, that is one or more selected from the group consisting of component Nos. 14, 22, 23, 36, 37, 41, 42, 51, 52, 68, 90, 122, 139, 149, 159, 214, 228, 230, 235, 247, 249, 252, 253, 268, 275, 278, 284, 288, 298, 305, 308, 313, 317, 329, 347, 363, 395, 421, 422 and 428. Note that the above components all have a VIP value, described below, of 1.522 or more, and if the VIP value is 1.62 or more, the absolute value of correlation coefficient $|r|$ is $>0.63$.

Further, the component to be analyzed in the present invention more preferably includes a component having a significant correlation ($p<0.05$) with a yield and an absolute value of correlation coefficient $|r|>0.66$ among 431 components, that is one or more selected from the group consisting of component Nos. 14, 23, 36, 37, 41, 51, 68, 90, 122, 149, 214, 230, 235, 247, 249, 252, 275, 284, 298, 305, 308, 313, 317, 347, 363, 421, 422 and 428. Note that the above components all have a VIP value, described below, of 1.59 or more, and if the VIP value is 1.652 or more, the absolute value of correlation coefficient $|r|$ is $>0.66$.

In Tables A1a to A1c, 431 components are defined by an accurate mass obtained by mass spectrometry, but data of these accurate masses allows to infer a composition formula of a compound. In addition, MS/MS data simultaneously obtained during analysis can provide partial structure information of a compound. Thus, from a composition formula and partial structure information, a component of interest can be inferred, and further, one that can be compared with a reagent can be identified.

For example, among 431 components, those identified as a result of analysis include the following components. It is estimated that: component No. 10 is 4-coumaric acid; component Nos. 68, 90, 122 and 308 are the same component and a monoglucoside of a composition formula $C_{21}H_{22}O_{11}$, wherein a glucose is bonded to dihydroflavonol with an aglycon of a composition formula $C_{15}H_{12}O_6$; compound No. 92 is prunin (naringenin 7-O-glucoside); component No. 119 is flavonoid with a composition formula $C_{15}H_{10}O_6$; component No. 139 is a monoglucoside of a composition formula $C_{21}H_{22}O_{12}$, wherein a glucose is bonded to dihydroflavonol with an aglycon of a composition formula $C_{15}H_{12}O_7$; component No. 277 is of a composition formula, $C_{26}H_{30}O_{10}$ and a prenylated form of flavonoid of a composition formula $C_{15}H_{10}O_5$; composition No. 295 is a diglycoside wherein a glucose and rhamnose are bonded to a flavonol of a composition formula $C_{15}H_{10}O_6$; component Nos. 296 and 395 are the same component, a triglycoside of a composition formula $C_{33}H_{10}C_{19}$, wherein one glucose and two rhamnoses are bonded to a flavonol with an aglycon of a composition formula $C_{15}H_{10}C_6$; component No. 302 is a diglycoside of a composition formula $C_{22}H_{36}O_{10}$, wherein a glucose and an arabinose are bonded to a geraniol; and component No. 429 is soyasaponin βg. Further, due to agreement with reagents, it is identified that: component No. 76 is daidzein; component No. 89 is genistein; component No. 276 is genistin; component No. 399 is malonylgenistin; and component Nos. 421 and 422 are the same component and soyasaponin Bb.

Among the above, the component to be analyzed in the present invention is preferably a component having a significant correlation ($p<0.05$) with a yield and an absolute value of correlation coefficient $|r|>0.51$, and example thereof include: soyasaponin Bb; a monoglucoside of a composition formula $C_{21}H_{22}O_{11}$, wherein a glucose is bonded to dihydroflavonol with an aglycon of a composition formula $C_{15}H_{12}O_6$; a triglycoside of a composition formula $C_{33}H_{40}O_{19}$, wherein one glucose and two rhamnoses are bonded to a flavonol with an aglycon of a composition formula $C_{15}H_{10}C_6$; and a monoglucoside of a composition formula $C_{21}H_{22}O_{12}$, wherein a glucose is bonded to dihydroflavonol with an aglycon of a composition formula $C_{15}H_{12}O_7$.

Through means for predicting a soybean yield, an abundance is measured for 431 components, preferably a component having a significant correlation ($p<0.05$) with a yield and an absolute value of correlation coefficient $|r|>0.51$, more preferably a component having a significant correlation ($p<0.05$) and an absolute value of correlation coefficient $|r|>0.63$, and further preferably having a significant correlation ($p<0.05$) and an absolute value of correlation coefficient $|r|>0.66$, for example, a peak area of a component having a correlation coefficient of −0.777 and an accurate mass (m/z) of 473.1087; and a yield value can be estimated from a correlation between a known yield and a peak area.

In addition, a yield can be predicted by using a plurality of data from analytical data of the above 431 components and collating with a yield prediction model constructed by use of a multivariate analysis method.

That is, a leaf of a soybean is collected after a predetermine period has passed from the seeding and an analytical sample is obtained; instrumental analysis data is obtained by using the analytical sample in the instrumental analysis; the instrumental analysis data is collated with a yield prediction model; and thereby, a yield of the soybean can be predicted.

The yield prediction model can be constructed by conducting regression analysis by use of: a peak area value of corrected component analytical data with each accurate mass as an explanatory variable; and a yield value as an objective variable. Examples of a regression analysis method include principal component regression analysis, PLS (partial least squares projection to latent structures) regression analysis, OPLS (Orthogonal projections to latent structures) regression analysis and generalized linear regression analysis; and in addition to them, multivariate regression analysis methods such as machine learning/regression analysis methods, for example, bagging, support vector machine, random forest and neural network regression analysis. Among these, it is preferred to use a PLS method, an OPLS method that is an improved version of PLS method, or a machine learning/regression analysis method. The OPLS method has the same predictability as the PLS method while it is excellent for the purpose of the present case since visualization for interpretation is easier. The PLS method and the OPLS method both are a method wherein information is summarized from high-dimensional data and replaced with a small number of latent variables, and the latent variables are used to express an objective variable. It is important to appropriately select the number of latent variables, and for determination of the number of latent variables, cross validation is often used. That is, data for model construction is divided into several groups; a certain group is used for model validation and other groups are used for model construction to estimate a prediction error; this operation is repeated by exchanging groups; and a number of latent variables to minimize a total of prediction errors is selected.

Evaluation of a prediction model is made mainly by use of two indexes. One is $R^2$ representing prediction accuracy, the other is $Q^2$ representing the predictability. $R^2$ is the square of a correlation coefficient between actual measured values of data used for the prediction model construction and predicted values calculated by use of the model; and $R^2$ closer to 1 indicates a higher prediction accuracy. Meanwhile, $Q^2$ is a result of the cross validation, and it expresses a square of a correlation coefficient between the actual measured values and the predicted values as a result of repeatedly-conducted model validation. In the soybean yield prediction model of the present invention, $Q^2 > 0.50$ is preferred as a criterion for model evaluation. Note that since $R^2$ is always larger than $Q^2$, $Q^2 > 0.50$ simultaneously satisfies $R^2 > 0.50$.

Hereafter, various soybean yield prediction models are created by use of peak area values of analytical data of all or part of the 431 components, and fruit yields; and their accuracy is verified. Results thereof are shown below. Among them, an OPLS model of $Q^2 > 0.50$ is preferably used.

(1) Construction of a Yield Prediction Model Using Information of all of 431 Components An OPLS model (FIG. 1A) is constructed from all of 125 data matrices each having peak area values of analytical data of 431 components per one data item and a yield value. At the time of the construction, a peak area value of analytical data of each component and yield data are converted by auto scaling to have an average of 0 and a variance of 1. It has $R^2 = 0.87$ and $Q^2 = 0.78$, and it can be a model with a high prediction performance.

For the above model, a degree of contribution to model performance, which is given to each component and is called as a VIP (Variable Importance in the Projection) value is calculated.

A VIP value is obtained by the following equation 1.

$$VIP = \sqrt{\sum_{a=1}^{A} \left(W_{ak}^2 * (SSY_{a-1} - SSY_a)\right) * \frac{K}{SSY_0 - SSYA}}$$

-continued

A: Number of latent variables

W: Weight of explanatory variables

SSY: Variance of predictive residue

K: Number of components

A larger VIP value has a larger degree of contribution to a model, and it correlates with an absolute value of a correlation coefficient. Lists of VIP values are shown in the following Tables A5a to 5f.

(2) Machine learning model constructed by use of analytical data of 97 components having a higher VIP value calculated from the model of (1).

As an analysis tool, Visual Mining Studio (hereinafter, referred to as VMS, NTT DATA Mathematical System Inc.) was used.

(2-1) All of 125 data matrices each having peak area values of analytical data of components with 97th and higher VIP values per one data item and a yield value as learning data were incorporated into VMS, and a model (random forest) (FIG. 1B) is constructed. $R^2$ was 0.92.

(2-2) All of 125 data matrices each having peak area values of analytical data of components with 97th and higher VIP values per one data item and a yield value were randomly divided into 2 groups (one for learning and the other for validation); and the one group of 63 data matrices was used for learning to construct a model (neural network) (FIG. 1C) by VMS. $R^2$ was 0.83. Note that $R^2$ of the data for validation was 0.58, and it can be said that this model has a good prediction performance.

(3) Model Construction Using as an Index a VIP Value Calculated by Use of the Model of (1) (Model Using Analytical Data of Two or More Components)

(3-1) Model using analytical data of components having a lower VIP value

A model (FIG. 1D) was constructed by the OPLS method using: analytical data of all of the components having 11th and lower VIP values; analytical data of all of the components having 21st and lower VIP values; analytical data of all of the components having 31st and lower VIP values; . . . and analytical data of all of the components having 351st and lower VIP values.

Models using from analytical data of all of the components having 11th and lower VIP values to analytical data of all of the components having 251st and lower VIP values satisfy $Q^2 > 0.50$. Even when all analytical data of components having 261st and lower VIP values are used, $Q^2 > 0.50$ is not satisfied.

(3-2) Model Using Analytical Data of 2 Components Among Components Having 10th and Higher VIP Values Models (FIG. 1E) with respect to a combination of any 2 components (45 combinations) among analytical data of components having 1st to 10th highest VIP values were constructed by the OPLS method.

All of the models satisfy $Q^2 > 0.50$.

(3-3) Model Using Analytical Data of 2 Consecutive Components Based on the VIP Value Models (FIG. 1F) were constructed by the OPLS method using analytical data of components having: 1st and 2nd highest VIP values; 11th and 12th highest VIP values; 21st and 22nd highest VIP values; . . . and 201st and 202nd highest VIP values.

Among models created using analytical data of any 2 components selected from the components having 30th or higher VIP values, there are many models satisfying $Q^2>0.50$.

(3-4) Model Using Analytical Data of 3 Consecutive Components Based on the VIP Value Models (FIG. 1G) were constructed by the OPLS method using analytical data of components having: 1st, 2nd and 3rd highest VIP values; 11th, 12th and 13th highest VIP values; 21st, 22nd and 23rd highest VIP values; . . . and 221st, 222nd and 223rd highest VIP values.

Among models created using analytical data of any 3 components selected from the components having 70th or higher VIP values, there are many models satisfying $Q^2>0.50$.

(3-5) Model Using Analytical Data of 4 Consecutive Components Based on the VIP Value Models (FIG. 1H) were constructed by the OPLS method using analytical data of components having: 1st, 2nd, 3rd and 4th highest VIP values; 11th, 12th, 13th and 14th highest VIP values; 21st, 22nd, 23rd and 24th highest VIP values; . . . and 221st, 222nd, 223rd and 224th highest VIP values.

Among models created using analytical data of any 4 components selected from the components having 100th or higher VIP values, there are many models satisfying $Q^2>0.50$.

(3-6) Model Using Analytical Data of 5 Consecutive Components Based on the VIP Value Models (FIG. 1I) were constructed by the OPLS method using analytical data of components having: 1st to 5th highest VIP values; 11th to 15th highest VIP values; 21st to 25th highest VIP values; . . . and 251st to 255th highest VIP values.

Among models created using analytical data of any 5 components selected from the components having 100th or higher VIP values, there are many models satisfying $Q^2>0.50$.

(3-7) Model Using Analytical Data of 6 Consecutive Components Based on the VIP Value Models (FIG. 1J) were constructed by the OPLS method using analytical data of components having: 1st to 6th highest VIP values; 11th to 16th highest VIP values; 21st to 26th highest VIP values; . . . and 281st to 286th highest VIP values.

Among models created using analytical data of any 6 components selected from the components having 130th or higher VIP values, there are many models satisfying $Q^2>0.50$.

(3-8) Model Using Analytical Data of 7 Consecutive Components Based on the VIP Value Models (FIG. 1K) were constructed by the OPLS method using analytical data of components having: 1st to 7th highest VIP values; 11th to 17th highest VIP values; 21st to 27th highest VIP values; . . . and 281st to 287th highest VIP values.

Among models created using analytical data of any 7 components selected from the components having 140th or higher VIP values, there are many models satisfying $Q^2>0.50$.

(3-9) Model Using Analytical Data of 8 Consecutive Components Based on the VIP Value Models (FIG. 1L) were constructed by the OPLS method using analytical data of components having: 1st to 8th highest VIP values; 11th to 18th highest VIP values; 21st to 28th highest VIP values; . . . and 281st to 288th highest VIP values.

Among models created using analytical data of any 8 components selected from the components having 140th or higher VIP values, there are many models satisfying $Q^2>0.50$.

(3-10) Model Using Analytical Data of 9 Consecutive Components Based on the VIP Value Models (FIG. 1M) were constructed by the OPLS method using analytical data of components having: 1st to 9th highest VIP values; 11th to 19th highest VIP values; 21st to 29th highest VIP values; . . . and 281st to 289th highest VIP values.

Among models created using analytical data of any 9 components selected from the components having 140th or higher VIP values, there are many models satisfying $Q^2>0.50$.

(3-11) Model Using Analytical Data of 10 Consecutive Components Based on the VIP Value Models (FIG. 1N) were constructed by the OPLS method using analytical data of components having: 1st to 10th highest VIP values; 11th to 20th highest VIP values; 21st to 30th highest VIP values; . . . and 281st to 290th highest VIP values.

Among models created using analytical data of any 10 components selected from the components having 160th or higher VIP values, there are many models satisfying $Q^2>0.50$.

Regarding the number of components to be used for prediction, when a simple prediction is conducted, a smaller number of components is suitable; and examples thereof include 10 or less, preferably 5 or less, more preferably 3 or less, and even more preferably 1. Further, when the accuracy is desired to be enhanced, a larger number of components is suitable; and examples thereof include 11 or more, preferably 20 or more, more preferably 50 or more, even more preferably 90 or more, and even more preferably 97. When the prediction is made with a smaller number of components, it is preferred to use components with higher VIP values or components with a higher correlation coefficient.

(4) Construction of a Yield Prediction Model Using a Part of Component Information Selected from 431 Components In addition to use of peaks of all of the 431 components of Tables A3a to A3f, use of peaks of components selected therefrom enables construction of a prediction model with a high accuracy.

Figure 1B:
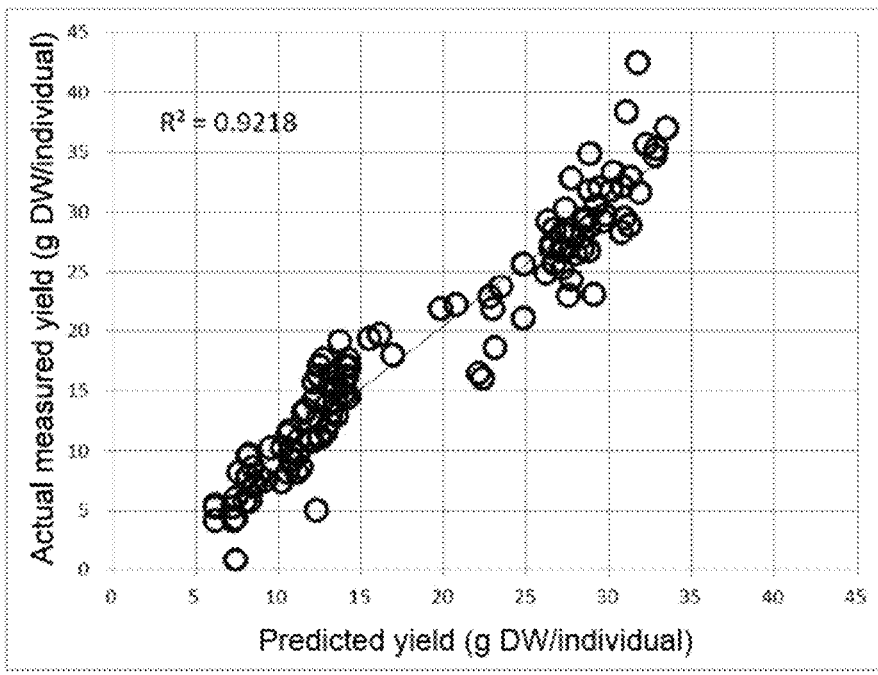
FIG. 1B shows a relationship between predicted values and actual measured values of yields for a machine learning model constructed using all of 125 data items.
Figure 1C:
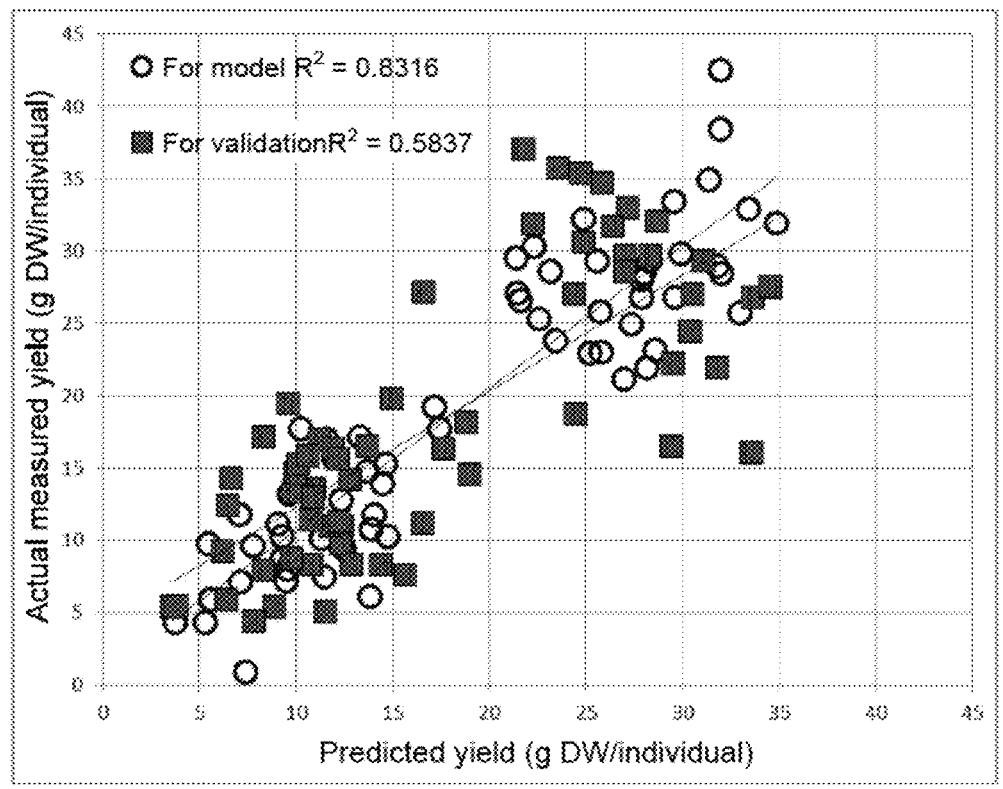
FIG. 1C shows a relationship between predicted values and actual measured values of each of data for learning and data for validation. The 125 data matrices are randomly divided into two groups (for learning and validation). The one group of 63 data matrices are used for learning and the other group of the remaining 62 data matrices are used for validation.
Figure 1D:
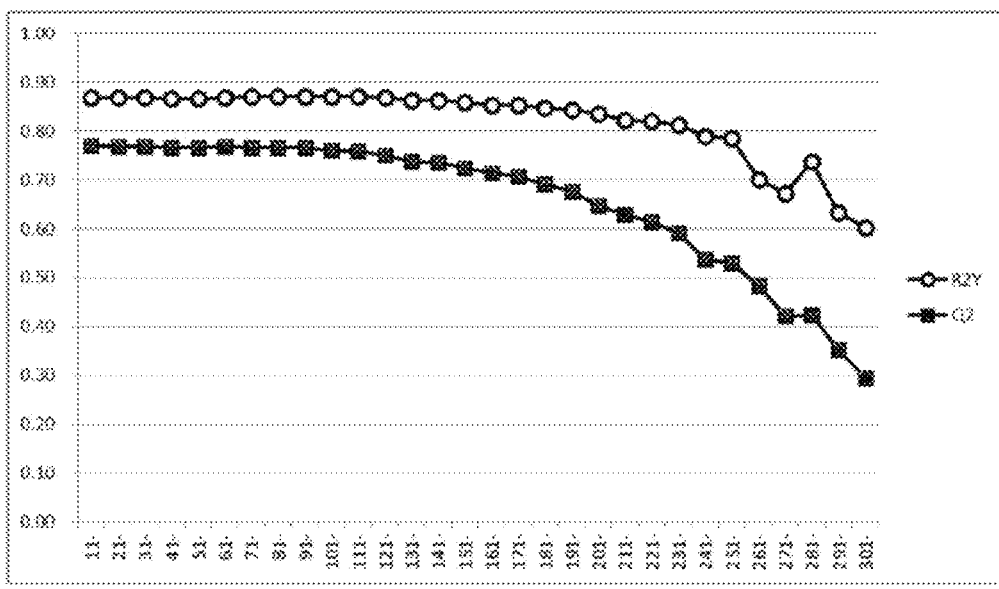
FIG. 1D shows $R^2$ values (indicated as R2Y in the figure) and $Q^2$ values (indicated as Q2 in the figure) of respective models constructed by an OPLS method using analytical data of all the components having 11th and lower VIP values, analytical data of all the components having 21st and lower VIP values, analytical data of all the components having 31st and lower VIP values, . . . and analytical data of all the components having 351st and lower VIP values in the model of FIG. 1A.
Figure 1E:
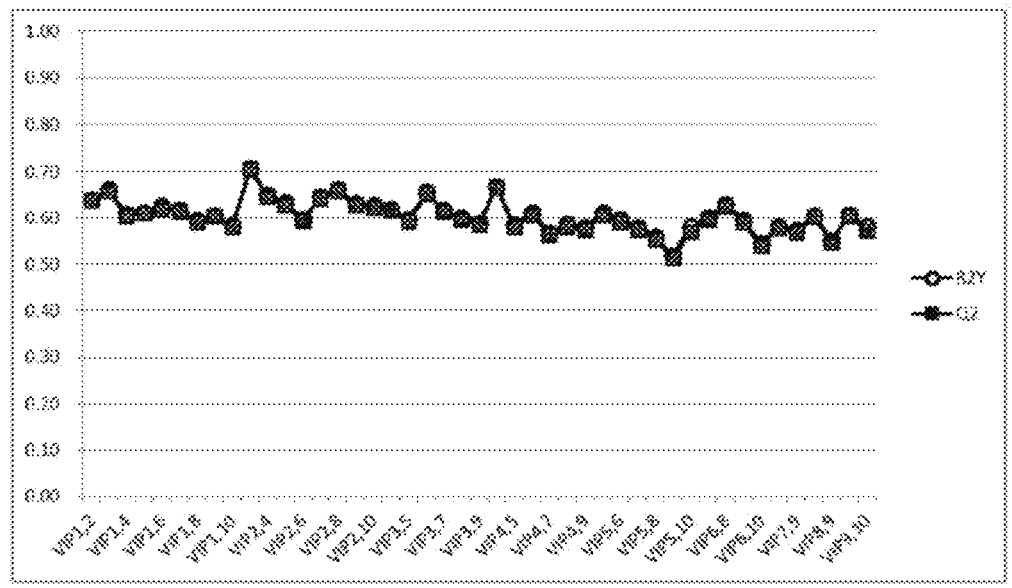
FIG. 1E shows $R^2$ values (indicated as R2Y in the figure) and $Q^2$ values (indicated as Q2 in the figure) of respective models constructed by the OPLS method with respect to a combination of any 2 components (45 combinations) among analytical data of components having 1st to 10th highest VIP values in the model of FIG. 1A.
Figure 1F:
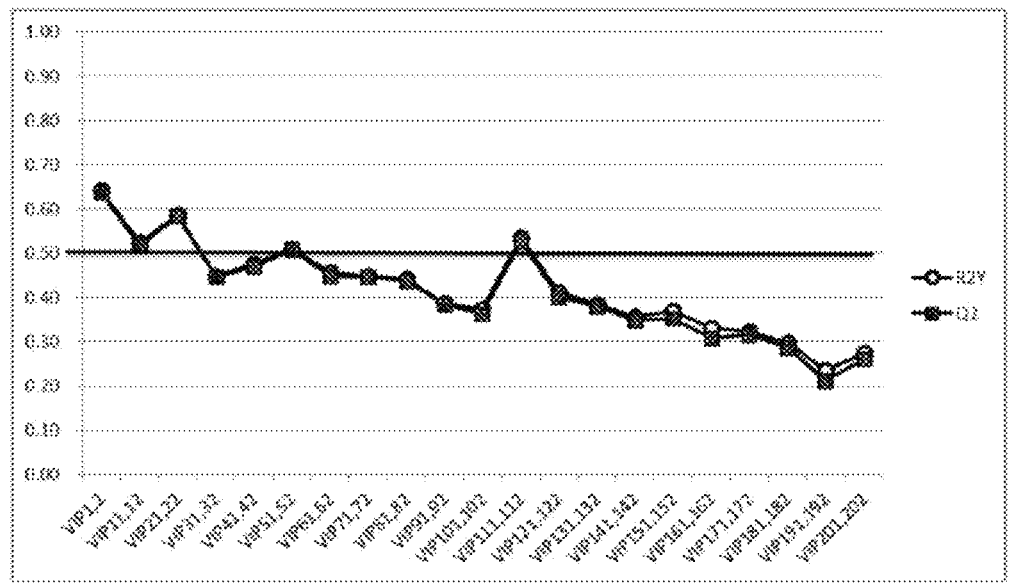
FIG. 1F shows $R^2$ values (indicated as R2Y in the figure) and $Q^2$ values (indicated as Q2 in the figure) of respective models constructed by the OPLS method using analytical data of components having: 1st and 2nd highest VIP values, 11th and 12th highest VIP values; 21st and 22nd highest VIP values; . . . and 201st and 202nd highest VIP values in the model of FIG. 1A.
Figure 1G:
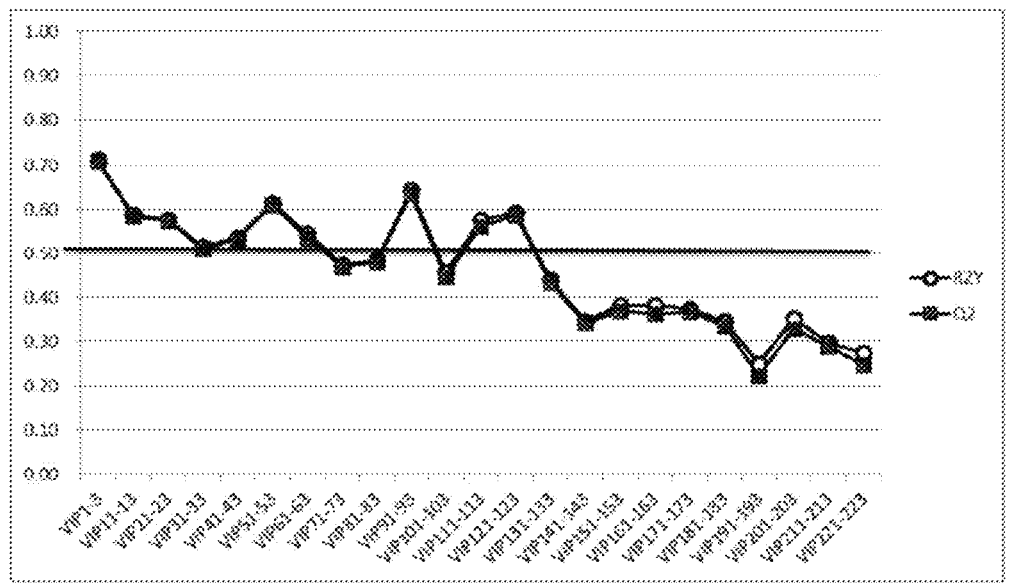
FIG. 1G shows $R^2$ values (indicated as R2Y in the figure) and $Q^2$ values (indicated as Q2 in the figure) of respective models constructed by the OPLS method using analytical data of components having: 1st, 2nd and 3rd highest VIP values; 11th, 12th and 13th highest VIP values; 21st, 22nd and 23rd highest VIP values; . . . and 221st to 223rd highest VIP values in the model of FIG. 1A.
Figure 1H:
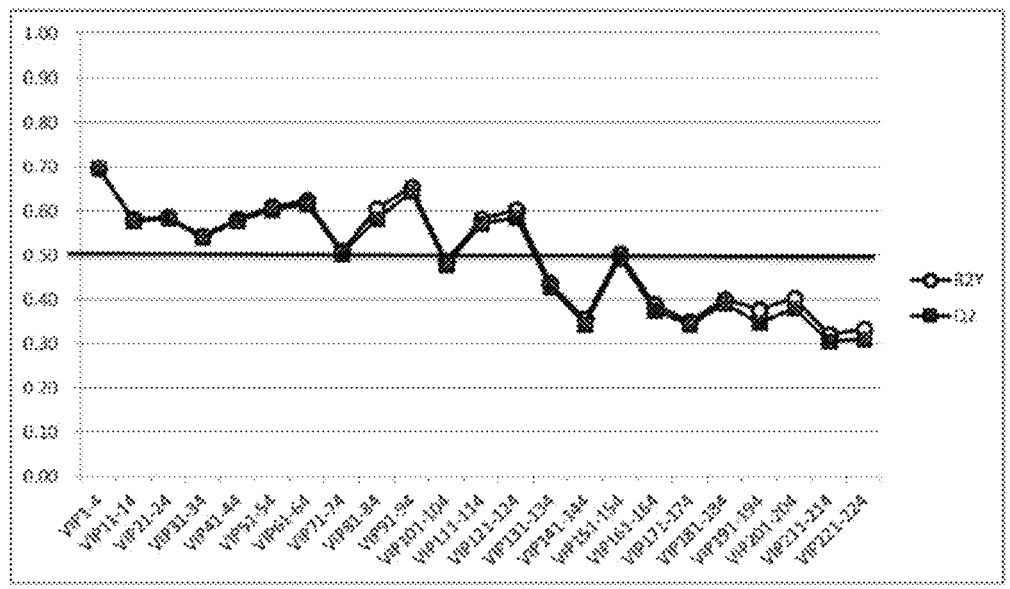
FIG. 1H shows $R^2$ values (indicated as R2Y in the figure) and $Q^2$ values (indicated as Q2 in the figure) of respective models constructed by the OPLS method using analytical data of components having: 1st, 2nd, 3rd and 4th highest VIP values; 11th, 12th, 13th and 14th highest VIP values; 21st, 22nd, 23rd and 24th highest VIP values; . . . and 221st to 224th highest VIP values in the model of FIG. 1A.
Figure 1I:
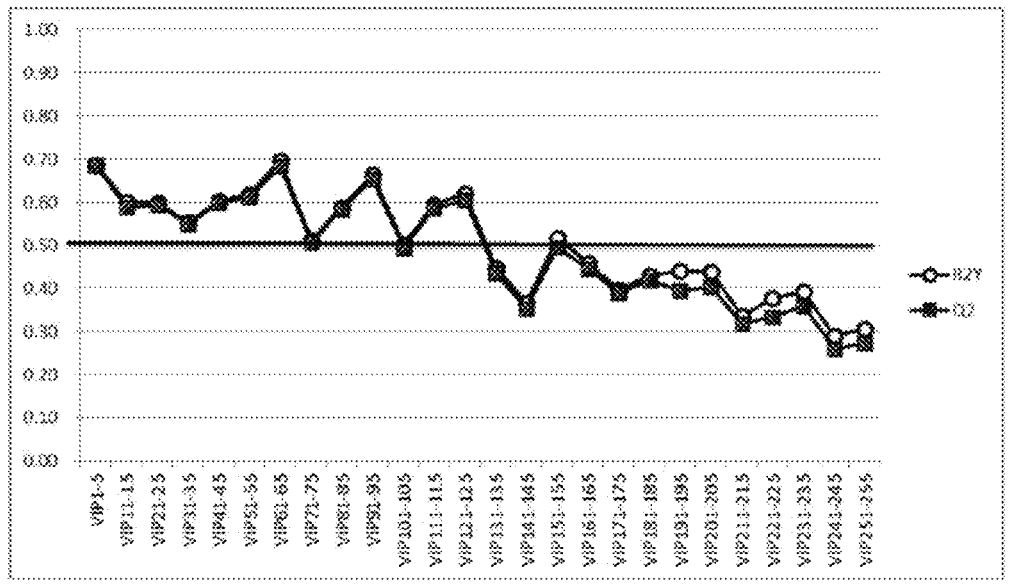
FIG. 1I shows $R^2$ values (indicated as R2Y in the figure) and $Q^2$ values (indicated as Q2 in the figure) of respective models constructed by the OPLS method using analytical data of components having: 1st to 5th highest VIP values; 11th to 15th highest VIP values; 21st to 25th highest VIP values; . . . and 251st to 255th highest VIP values in the model of FIG. 1A.
Figure 1J:
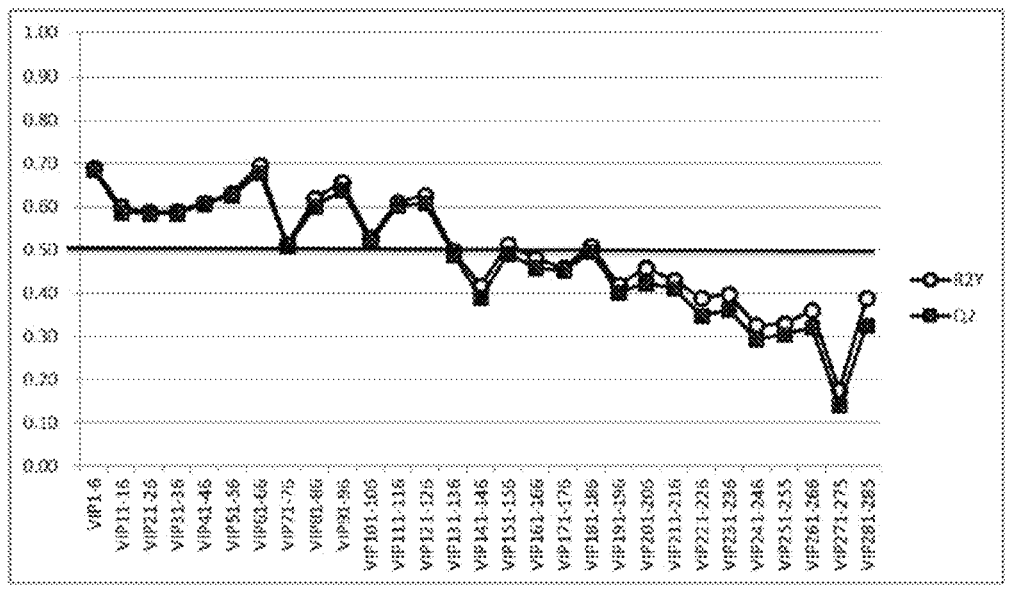
FIG. 1J shows $R^2$ values (indicated as R2Y in the figure) and $Q^2$ values (indicated as Q2 in the figure) of respective models constructed by the OPLS method using analytical data of components having: 1st to 6th highest VIP values; 11th to 16th highest VIP values; 21st to 26th highest VIP values; . . . and 281st to 286th highest VIP values in the model of FIG. 1A.
Figure 1K:
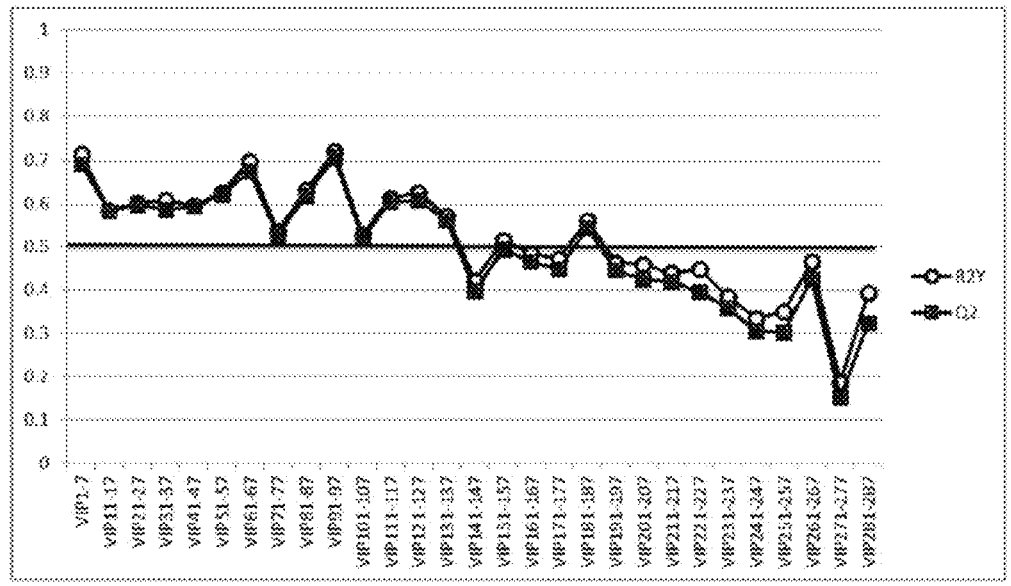
FIG. 1K shows $R^2$ values (indicated as R2Y in the figure) and $Q^2$ values (indicated as Q2 in the figure) of respective models constructed by the OPLS method using analytical data of components having: 1st to 7th highest VIP values; 11th to 17th highest VIP values; 21st to 27th highest VIP values; . . . and 281st to 287th highest VIP values in the model of FIG. 1A.
Figure 1L:
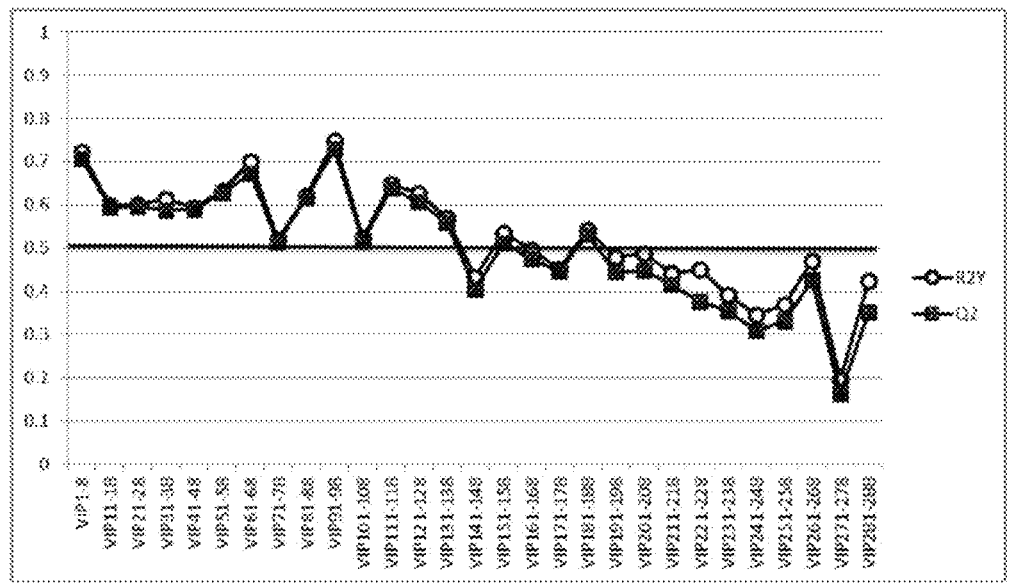
FIG. 1L shows $R^2$ values (indicated as R2Y in the figure) and $Q^2$ values (indicated as Q2 in the figure) of respective models constructed by the OPLS method using analytical data of components having: 1st to 8th highest VIP values; 11th to 18th highest VIP values; 21st to 28th highest VIP values; . . . and 281st to 288th highest VIP values in the model of FIG. 1A.

For example, among peaks of all of the 431 components of Tables A3a to A3f, peak data of 301 components is selected with consideration of a peak shape, an average detection intensity among samples or the like, an OPLS model is constructed by an appropriate correction of component peaks in the same manner as above, VIP values of the constructed model are calculated (Tables A6a to A6d described below), and a prediction model is constructed using analytical data of components having 100th and higher VIP values (see below). This allows construction of a highly accurate model having a prediction accuracy of $R^2=0.82$ and predictability of $Q^2=0.78$ (in the following example, this is referred to as prediction model A; FIG. 1O).

<Component Numbers Having 100th and Higher VIP Values in the Prediction Model A>

7, 15, 17, 20, 21, 22, 23, 35, 37, 39, 42, 44, 51, 54, 57, 58, 68, 71, 73, 80, 85, 86, 90, 93, 95, 108, 116, 122, 131, 139, 149, 153, 157, 158, 160, 161, 165, 171, 176, 179, 187, 208, 214, 223, 227, 233, 237, 245, 252, 253, 261, 278, 279, 282, 283, 284, 294, 298, 299, 300, 304, 305, 308, 309, 310, 313, 316, 317, 318, 320, 325, 327, 328, 329, 330, 331, 352, 353, 355, 356, 357, 358, 359, 362, 363, 367, 380, 381, 385, 388, 389, 390, 392, 395, 396, 399, 421, 422, 428, 431.

In a second invention, a component to be analyzed in a leaf is one or more selected from the group consisting of 2-hydroxypyridine, choline, citric acid, glyceric acid, glycine, L-pyroglutamic acid, malonic acid, sucrose and threitol.

These 9 components are selected and extracted from metabolites of soybean, and a selection method thereof is as described in detail in the example. As in the first invention, an outline thereof is: 1) 125 soybean plants different in varieties, soils and fertilizers were cultivated from 2015 to 2017; 2) one leaf of each plant was collected about 1 month after seeding; then, 3) component extraction was conducted using a solvent mixture of methanol/water/chloroform (5:2:2, v/v/v) and derivatization was conducted; thereafter, 4) GC/MS analysis was conducted, and obtained peak information of each component (retention time, mass information) was collated with existing GC/MS mass spectral library to identify a peak; and 5) correlation analysis was conducted between analytical data and corresponding yield data to obtain a component, which was determined to have a correlation with the yield.

Results of correlation analysis between obtained analytical data of 9 components in 125 leaves and corresponding yield data (to calculate a simple correlation coefficient r between a peak area of analytical data of each component and a yield, and p value by uncorrelated test) are as shown in Table B2 below. Among these, 4 components, 2-hydroxypyridine, glycine, L-pyroglutamic acid and sucrose had a correlation coefficient, whose absolute value |r| exceeded 0.51. Thus, the component to be analyzed in the present invention preferably includes one or more selected from 2-hydroxypyridine, glycine, L-pyroglutamic acid and sucrose.

Thus, through means of predicting a soybean yield, with respect to a sample to be predicted, one or more analytical data pieces selected from the group consisting of the above 9 components, preferably 2-hydroxypyridine, glycine, L-pyroglutamic acid and sucrose, are obtained to thereby enable a yield value to be estimated from a correlation between a known yield and a peak area.

In addition, a plurality of analytical data pieces of the above 9 components are used and collated with a yield prediction model constructed by use of a multivariate analysis method, and thereby, a yield can be predicted.

That is, a leaf is collected from a soybean after a lapse of a predetermined period from the seeding; an analytical sample is obtained; the analytical sample is subjected to instrumental analysis, so that instrumental analysis data is obtained; the instrumental analysis data is collated with a yield prediction model; and thereby a yield of the soybean can be predicted.

With respect to construction and evaluation of a yield prediction model, the same methods as explained for the first invention are used.

Hereafter, various soybean yield prediction models are created by use of peak area values of mass analysis data of the above 9 components, and fruit yields; and their accuracy is verified. Results thereof are shown below.

(1) Construction of Yield Prediction Model Using Information on all Components

An OPLS model (FIG. 2A) is constructed from all of 125 data matrices each having peak area values of analytical data of 9 components per one data item and a yield value. At the time of the construction, a peak area value of analytical data of each component and yield data are converted by auto scaling to have an average of 0 and a variance of 1. It has $R^2=0.56$ and $Q^2=0.55$, and it can be a model with a high prediction performance.

Note that a model constructed by only analytical data of L-pyroglutamic acid has $R^2=0.32$ and $Q^2=0.29$, and therefore, use of data of a plurality of components enables construction of a model with a higher accuracy.

VIP values calculated from the above model in the same manner as in the first invention are listed in Table B3 below.

(2-1) Model Using Peaks Derived from Components Having Lower VIP Values Calculated from the Model of (1)

Figure 2A:
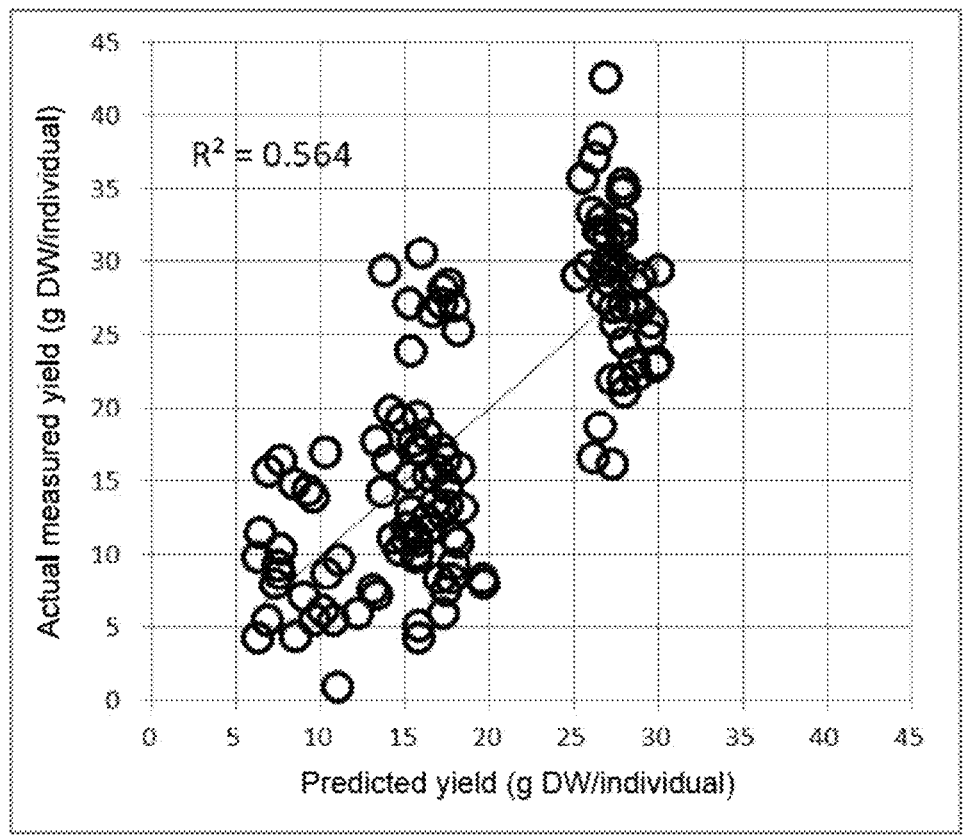
FIG. 2A shows a relation between predicted value of yields for the OPLS model constructed using all of the 125 data items, and actual measured value of yields.
Figure 2B:
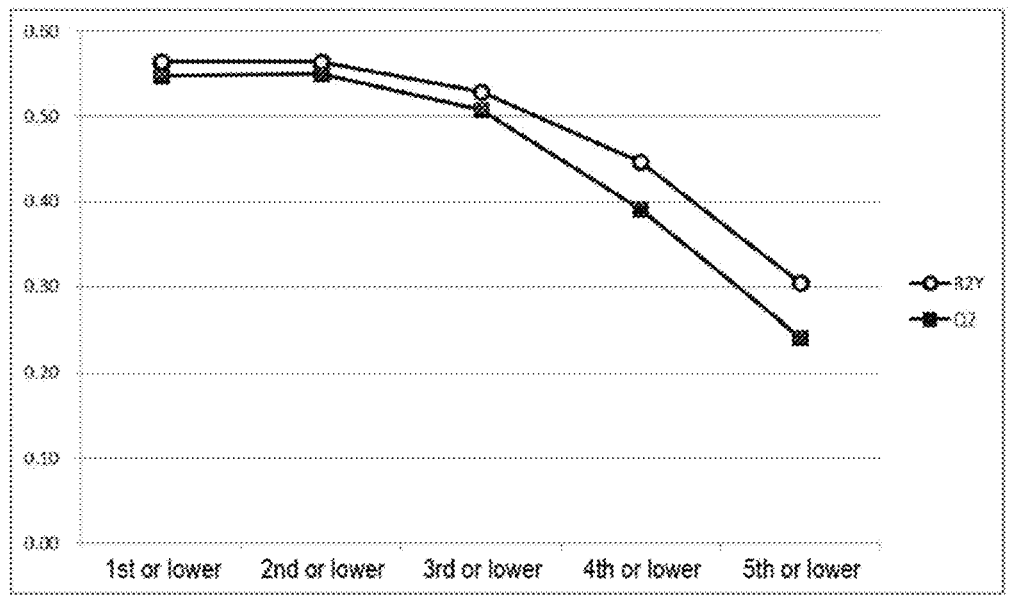
FIG. 2B shows $R^2$ values (indicated as R2Y in the figure) and $Q^2$ values (indicated as Q2 in the figure) of respective models constructed by the OPLS method using data of all the components having 1st and lower VIP values, 2nd and lower VIP values; 3rd and lower VIP values, 4th and lower VIP values, 5th and lower VIP values, and 6th and lower VIP values in the model of FIG. 2A.

OPLS models are constructed using: analytical data of all of the components having 1st and lower VIP values; analytical data of all of the components having 2nd and lower VIP values; or analytical data of all of the components having 3rd and lower VIP values; they satisfy $Q^2>0.50$; and they are preferred as a yield prediction model (FIG. 2B). Both of OPLS models constructed using analytical data of all of the components having 4th and lower VIP values and analytical data of all of the components having 5th and lower VIP values failed to satisfy $Q^2>0.50$.

(2-2) Model Using Analytical Data of a Plurality of Components Having Higher VIP Values Calculated from the Model (1)

Among models constructed using data of any four or more components selected from analytical data of 9 components, a model satisfying $Q^2>0.50$ is preferred as a yield prediction model. Specific examples thereof include models 1) to 4) described below.

1) Model Using Analytical Data of 4 Consecutive Components Having Higher VIP Values OPLS models are constructed using analytical data of 4 consecutive components having higher VIP values among the components having 6th or higher VIP values; they satisfy $Q^2>0.50$, and they are preferred as a yield prediction model. In addition, an OPLS model constructed using analytical data of components having 3rd to 6th VIP values satisfies $Q^2>0.50$; and it is therefore considered that use of analytical data of any 4 components having 6th or higher VIP value can provide a prediction model satisfying $Q^2>0.50$.

Figure 2C:
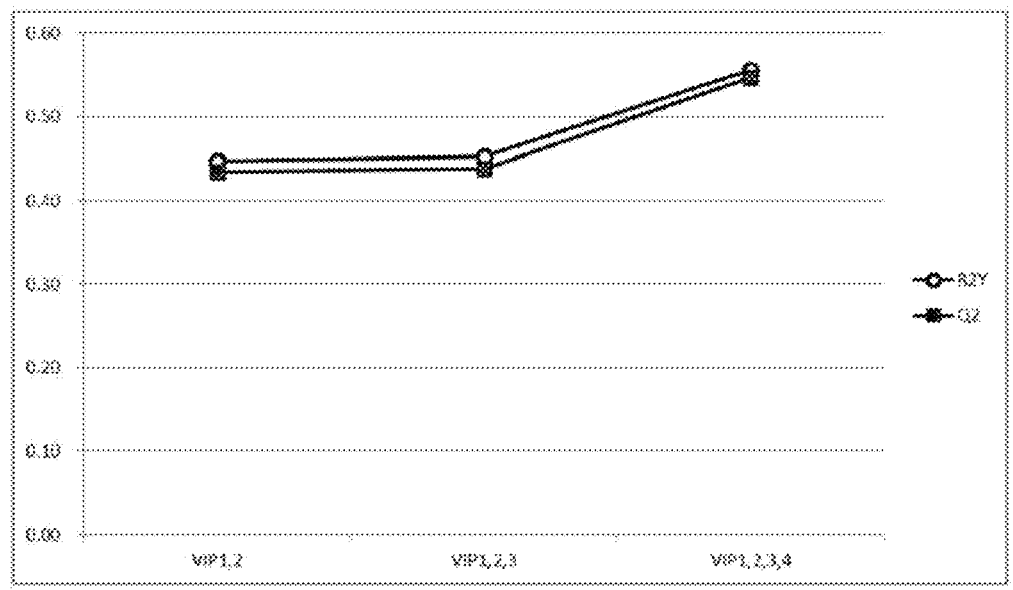
FIG. 2C shows $R^2$ values (indicated as R2Y in the figure) and $Q^2$ values (indicated as Q2 in the figure) of respective models constructed by the OPLS method using data of components having 1st and 2nd highest VIP values; components having 1st to 3rd highest VIP values; and components having 1st to 4th VIP values in the model of FIG. 2A.
Figure 2D:
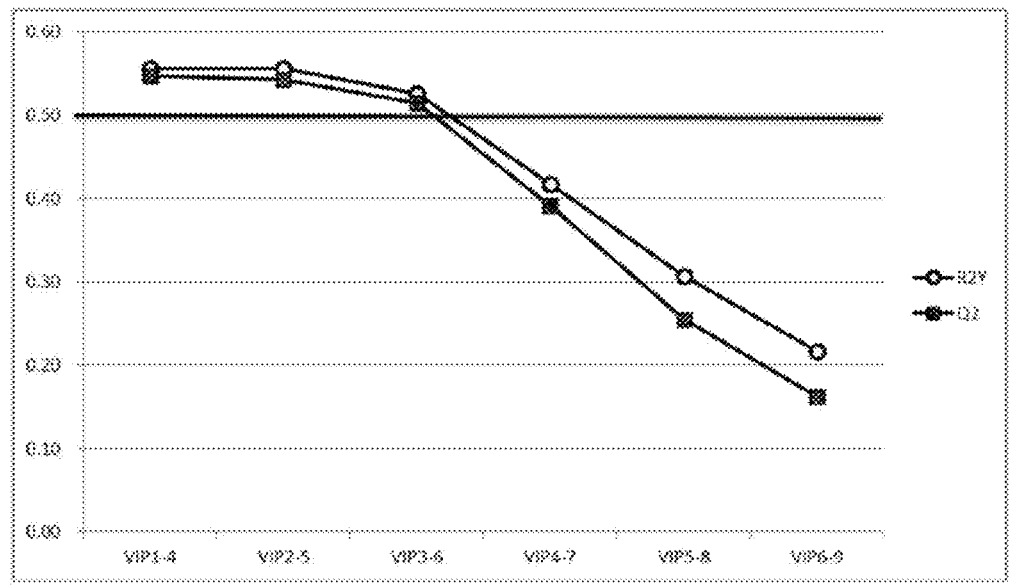
FIG. 2D shows $R^2$ values (indicated as R2Y in the figure) and $Q^2$ values (indicated as Q2 in the figure) of respective models constructed by the OPLS method using data of components having 1st to 4th highest VIP values, components having 2nd to 5th highest VIP values, components having 3rd to 6th highest VIP values, components having 4th to 7th highest VIP values, components having 5th to 8th highest VIP values, and components having 6th to 9th highest VIP values in the model of FIG. 2A.

Examples thereof include OPLS models constructed using analytical data of: components having 1st to 4th VIP values; components having 2nd to 5th VIP values; and components having 3rd to 6th VIP values (FIG. 2D).

2) Model Using Analytical Data of 5 Consecutive Components Having Higher VIP Values OPLS models are constructed using analytical data of 5 consecutive components having higher VIP values among the components having 7th or higher VIP values; they satisfy $Q^2>0.50$, and they are preferred as a yield prediction model. In addition, an OPLS model constructed using analytical data of components having 3rd to 7th VIP values satisfies $Q^2>0.50$; and it is therefore considered that use of analytical data of any 5 components having 7th or higher VIP value can provide a prediction model satisfying $Q^2>0.50$.

Figure 2E:
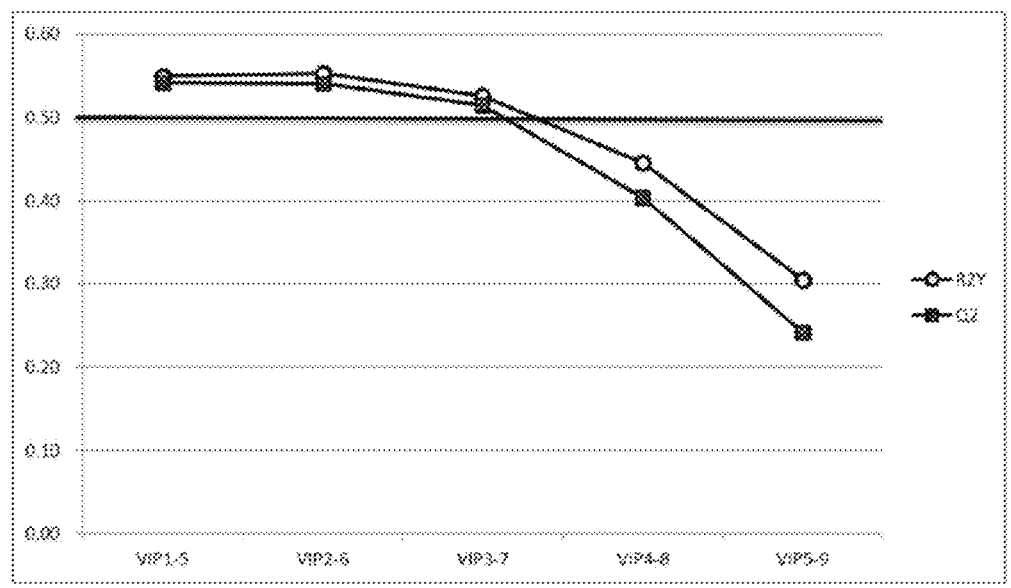
FIG. 2E shows $R^2$ values (indicated as R2Y in the figure) and values (indicated as Q2 in the figure) of respective models constructed by the OPLS method using data of components having 1st to 5th highest VIP values, components having 2nd to 6th highest VIP values, components having 3rd to 7th highest VIP values, components having 4th to 8th highest VIP values, and components having 5th to 9th highest VIP values in the model of FIG. 2A.

Examples thereof include OPLS models constructed using analytical data of: components having 1st to 5th VIP values; components having 2nd to 6th VIP values; and components having 3rd to 7th VIP values (FIG. 2E).

3) Model Using Analytical Data of 6 Consecutive Components Having Higher VIP Values OPLS models are constructed using analytical data of 6 consecutive components having higher VIP values among the components having 8th or higher VIP values; they satisfy $Q^2>0.50$, and they are preferred as a yield prediction model. In addition, an OPLS model constructed using analytical data of components having 3rd to 8th VIP values satisfies $Q^2>0.50$; and it is therefore considered that use of analytical data of any 6 components having 8th or higher VIP value can provide a prediction model satisfying $Q^2>0.50$.

Figure 2F:
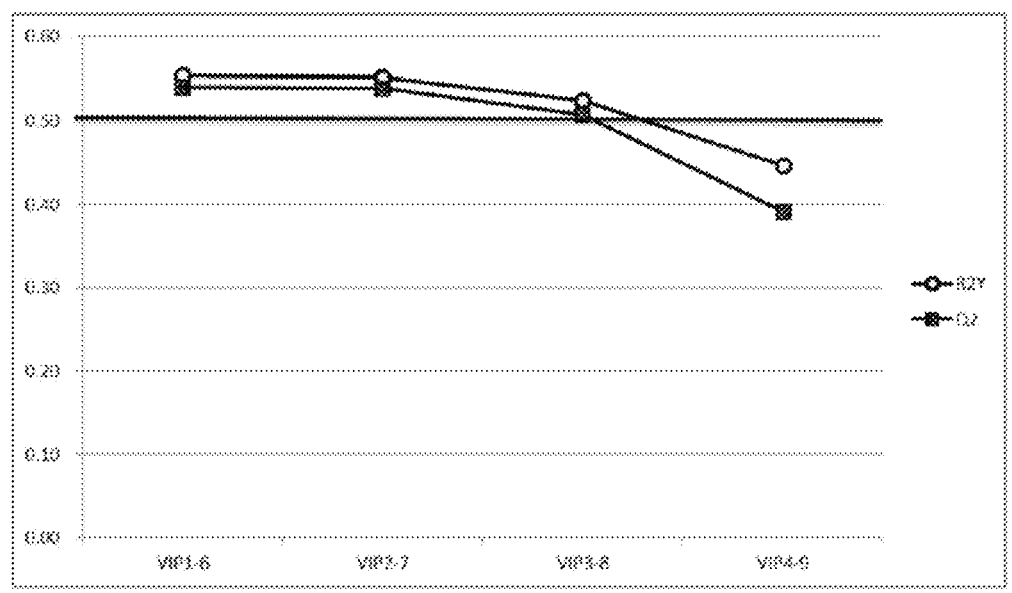
FIG. 2F shows $R^2$ values (indicated as R2Y in the figure) and $Q^2$ values (indicated as Q2 in the figure) of respective models constructed by the OPLS method using data of components having 1st to 6th highest VIP values, components having 2nd to 7th highest VIP values, components having 3rd to 8th highest VIP values, and components having 4th to 9th highest VIP values in the model of 2A.

Examples thereof include OPLS models constructed using analytical data of: components having 1st to 6th VIP values; components having 2nd to 7th VIP values; and components having 3rd to 8th VIP values (FIGS. 2F and 2B).

4) Model Using Analytical Data of 7 Consecutive Components Having Higher VIP Values OPLS models are constructed using analytical data of 7 consecutive components having higher VIP values; they satisfy $Q^2>0.50$, and they are preferred as a yield prediction model. In addition, an OPLS model constructed using analytical data of components having 3rd to 9th VIP values satisfies $Q^2>0.50$; and it is therefore considered that use of analytical data of any 7 components among 9 components can provide a prediction model satisfying $Q^2>0.50$.

Figure 2G:
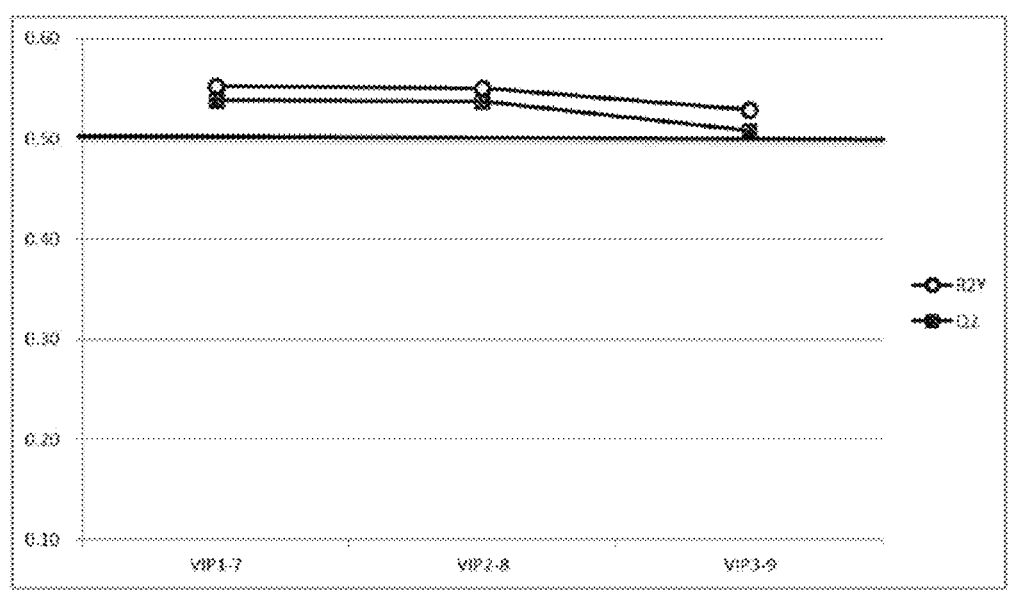
FIG. 2G shows $R^2$ values (indicated as R2Y in the figure) and $Q^2$ values (indicated as Q2 in the figure) of respective models constructed by the OPLS method using data of components having 1st to 7th highest VIP values, components having 2nd to 8th highest VIP values and components having 3rd to 9th highest VIP values in the model of FIG. 2A.

Examples thereof include OPLS models constructed using analytical data of: components having 1st to 7th VIP values; components having 2nd to 8th VIP values; or components having 3rd to 9th VIP values (FIG. 2G).

Hereafter, aspects and preferred embodiments of the present invention are described.

<1> A method for predicting a soybean yield comprising: acquiring analytical data of one or more components from a leaf sample collected from the soybean, and predicting a soybean yield using a correlation between the data and a soybean yield.

<2> The method according to <1>, wherein the analytical data of one or more components is corrected by a pooled QC method.

<3> The method according to <1>, wherein the analytical data of one or more components is corrected by an internal standard material.

<4> The method according to any one of <1> to <3>, wherein the component is one or more selected from the group consisting of components having an accurate mass (m/z), provided by mass analysis, of 139 to 1156.

<5> The method according to any one of <1> to <3>, wherein the component is one or more selected from the group consisting of the components described in the above Tables A1a to 1c, defined by an accurate mass (m/z) provided by mass analysis.

<6> The method according to <5>, wherein the component is one or more selected from the group consisting of component Nos. 13, 14, 17, 20, 21, 22, 23, 28, 35, 36, 37, 39, 41, 42, 44, 47, 48, 51, 52, 54, 57, 58, 68, 71, 73, 80, 85, 86, 90, 91, 96, 98, 99, 100, 107, 108, 110, 122, 125, 131, 134, 135, 137, 139, 142, 149, 150, 153, 157, 159, 160, 161, 171, 174, 176, 179, 181, 182, 188, 202, 208, 209, 214, 215, 217, 218, 228, 230, 235, 244, 245, 246, 247, 249, 251, 252, 253, 261, 264, 268, 275, 278, 279, 280, 282, 283, 284, 288, 294, 296, 298, 299, 305, 308, 310, 313, 317, 325, 327, 329, 330, 341, 347, 353, 355, 356, 363, 367, 369, 370, 384, 389, 395, 421, 422, 423, 428 and 431 described in the Tables A1a to 1c.

<7> The method according to <5>, wherein the component is one or more selected from the group consisting of component Nos. 14, 22, 23, 36, 37, 41, 42, 51, 52, 68, 90, 122, 139, 149, 159, 214, 228, 230, 235, 247, 249, 252, 253, 268, 275, 278, 284, 288, 298, 305, 308, 313, 317, 329, 347, 363, 395, 421, 422 and 428 described in the Tables A1a to 1c.

<8> The method according to <5>, wherein the component is one or more selected from the group consisting of component Nos. 14, 23, 36, 37, 41, 51, 68, 90, 122, 149, 214, 230, 235, 247, 249, 252, 275, 284, 298, 305, 308, 313, 317, 347, 363, 421, 422 and 428 described in the Tables A1a to 1c.

<9> The method according to <5>, wherein the component comprises one or more selected from the group consisting of soyasaponin Bb; a monoglucoside of a composition formula $C_{21}H_{22}O_{11}$, wherein a glucose is bonded to dihydroflavonol with an aglycon of a composition formula $C_{15}H_{12}O_6$; a triglycoside of a composition formula $C_{33}H_{40}O_{19}$, wherein one glucose and two rhamnoses are bonded to a flavonol with an aglycon of a composition formula $C_{15}H_{10}C_6$; and a monoglucoside of a composition formula $C_{21}H_{22}C_{12}$, wherein a glucose is bonded to dihydroflavonol with an aglycon of a composition formula $C_{15}H_{12}O_7$.

<10> The method according to any one of <1> to <9>, wherein the leaf sample is collected from a soybean from a cotyledon period to a seed period.

<11> The method according to any one of <1> to <9>, wherein the leaf sample is collected from a soybean from a cotyledon period to a bloom period.

<12> The method according to any one of <1> to <11>, wherein the analytical data is mass analysis data.

<13> The method according to any one of <5> to <12>, comprising a step of collating the analytical data of the component acquired from the leaf sample with a yield prediction model constructed using analytical data of components described in the Tables A1a to 1c.

<14> The method according to <13>, wherein the yield prediction model uses at least 2 of 10 components having higher VIP values among the components described in the Tables A1a to 1c.

<15> The method according to <13>, wherein the yield prediction model uses at least 2 of 22 components having higher VIP values among the components described in the Tables A1a to 1c.

<16> The method according to <13>, wherein the yield prediction model uses at least 3 of 63 components having higher VIP values among the components described in the Tables A1a to 1c.

<17> The method according to <13>, wherein the yield prediction model uses at least 4 of 94 components having higher VIP values among the components described in the Tables A1a to 1c.

<18> The method according to <13>, wherein the yield prediction model uses at least 5 of 95 components having higher VIP values among the components described in the Tables A1a to 1c.

<19> The method according to <13>, wherein the yield prediction model uses at least 6 of 126 components having higher VIP values among the components described in the Tables A1a to 1c.

<20> The method according to <13>, wherein the yield prediction model uses at least 7 of 137 components having higher VIP values among the components described in the Tables A1a to A1c.

<21> The method according to <13>, wherein the yield prediction model uses at least 8 of 138 components having higher VIP values among the components described in the Tables A1a to 1c.

<22> The method according to <13>, wherein the yield prediction model uses at least 9 of 139 components having higher VIP values among the components described in the Tables A1a to 1c.

<23> The method according to <13>, wherein the yield prediction model uses at least 10 of 160 components having higher VIP values among the components described in the Tables A1a to 1c.

<24> The method according to any one of <14> to <23>, wherein the VIP value is calculated by a yield prediction model constructed using component information of all of the components described in the Tables A1a to 1c.
<25> The method according to <5>, comprising a step of collating the analytical data of the component acquired from the leaf sample with a yield prediction model constructed using analytical data of components described in the following Tables A6a to A6d selected from the components described in the Tables A1a to 1c.
<26> The method according to <5>, comprising a step of collating the analytical data of the component acquired from the leaf sample with a yield prediction model constructed using analytical data of the following 100 components selected from the components described in the Tables A1a to 1c,
components Nos. 7, 15, 17, 20, 21, 22, 23, 35, 37, 39, 42, 44, 51, 54, 57, 58, 68, 71, 73, 80, 85, 86, 90, 93, 95, 108, 116, 122, 131, 139, 149, 153, 157, 158, 160, 161, 165, 171, 176, 179, 187, 208, 214, 223, 227, 233, 237, 245, 252, 253, 261, 278, 279, 282, 283, 284, 294, 298, 299, 300, 304, 305, 308, 309, 310, 313, 316, 317, 318, 320, 325, 327, 328, 329, 330, 331, 352, 353, 355, 356, 357, 358, 359, 362, 363, 367, 380, 381, 385, 388, 389, 390, 392, 395, 396, 399, 421, 422, 428, and 431.
<27> The method according to <25> or <26>, wherein the leaf sample is collected from a soybean from a cotyledon period to a seed period.
<28> The method according to <25> or <26>, wherein the leaf sample is collected from a soybean from a cotyledon period to a bloom period.
<29> The method according to any one of <25> to <28>, wherein the analytical data is mass analysis data.
<30> The method according to any one of <13> to <29>, wherein the yield prediction model is a model constructed using an OPLS method.
<31> The method according to any one of <13> to <29>, wherein the yield prediction model is a model constructed using a machine learning/regression analysis method.
<32> The method according to any one of <4> to <31>, wherein the accurate mass is measured with the accuracy of 4 digits or more after the decimal point.
<33> A method for predicting a soybean yield, comprising: acquiring analytical data of one or more components from a leaf sample collected from the soybean; and predicting a soybean yield using a correlation between the data and a soybean yield, wherein the component is one or more selected from the group consisting of 2-hydroxypyridine, choline, citric acid, glyceric acid, glycine, L-pyroglutamic acid, malonic acid, sucrose and threitol.
<34> The method according to <33>, wherein the component is one or more selected from the group consisting of 2-hydroxypyridine, glycine, L-pyroglutamic acid and sucrose.
<35> The method according to <33> or <34>, wherein the leaf sample is collected from a soybean from a cotyledon period to a seed period.
<36> The method according to any one of <33> to <34>, wherein the leaf sample is collected from a soybean from a cotyledon period to a bloom period.
<37> The method according to any one of <33> to <36>, wherein the analytical data is mass analysis data.
<38> The method according to any one of <33> to <37>, comprising a step of collating the analytical data of the component acquired from the leaf sample with a yield prediction model constructed using analytical data selected from the group consisting of the 9 components.

<39> The method according to <38>, wherein the yield prediction model uses data of any 4 components having 6th or higher VIP values among the analytical data of the 9 components.
<40> The method according to <38>, wherein the yield prediction model uses data of any 5 components having 7th or higher VIP values among the analytical data of the 9 components.
<41> The method according to <38>, wherein the yield prediction model uses data of any 6 components having 8th or higher VIP values among the analytical data of the 9 components.
<42> The method according to <38>, wherein the yield prediction model uses data of any 7 components among the analytical data of the 9 components.
<43> The method according to <38>, wherein the yield prediction model uses data of all of the components having 1st and lower VIP values, data of all of the components having 2nd and lower VIP values, or data of all of the components having 3rd and lower VIP values among the analytical data of the 9 components.
<44> The method according to <38>, wherein the yield prediction model uses analytical data of components having 1st to 4th highest VIP values, 2nd to 5th highest VIP values, or 3rd to 6th highest VIP values among the analytical data of the 9 components.
<45> The method according to <38>, wherein the yield prediction model uses analytical data of components having 1st to 5th highest VIP values, 2nd to 6th highest VIP values, or 3rd to 7th highest VIP values among the analytical data of the 9 components.
<46> The method according to <38>, wherein the yield prediction model uses analytical data of components having 1st to 6th highest VIP values, 2nd to 7th highest VIP values, or 3rd to 8th highest VIP values among the analytical data of the 9 components.
<47> The method according to <38>, wherein the yield prediction model uses analytical data of components having 1st to 7th highest VIP values, 2nd to 8th highest VIP values, or 3rd to 9th highest VIP values among the analytical data of the 9 components.
<48> The method according to any one of <38> to <47>, wherein the yield prediction model is a model constructed using an OPLS method.
<49> The method according to any one of <38> to <47>, wherein the yield prediction model is a model constructed using a regression analysis method.
<50> The method according to any one of <37> to <47>, wherein the mass analysis data is of the accuracy of 4 digits or more after the decimal point.

EXAMPLES

A1. Each Cultivation Tests

A detailed explanation will be made on data of outdoor pot cultivation tests conducted in the years 2015 to 2017. 4 tests were conducted in total.

1) Pot Test (1) in 2015:

Pot cultivation was conducted in Tochigi Prefecture. As soil therefor, domestic farm field soil was used and fertilized so as to provide a ratio of nitrogen:phosphoric acid:potassium of 3:6:6 (Kg/10a); and the soil was tilled by a tiller. This tilled soil was used. As a pot, a ½000a Wagner pot was used; about 8 L of the above soil was put into one pot; and 15 pots were prepared. On Jun. 25, 2015, 3 seeds were planted at 2 locations in each pot (6 seeds were used per one pot). A planted variety was "Satono hohoemi." During a cotyledon period, plants were thinned out to leave one plant for one location, allowing 2 plants to remain in each pot. Harvesting was carried out on November 9 (137 days after seeding). For yield prediction, 10 plants in 5 pots were used.

2) Pot Test (2) in 2015:

Pot cultivation was conducted in Wakayama Prefecture. As soil therefor, domestic farm field soil was used and fertilized so as to provide ratios of nitrogen:phosphoric acid:potassium of 1:6:6, 3:6:6 and 10:6:6 (Kg/10a); and tilled soil was used (3 fertilization conditions different only in the nitrogen amount were set). As a pot, a ½₀₀₀a Wagner pot was used; about 8 L of the above soil was put into one pot; and 15 pots were prepared for each fertilization condition, and in total, 45 pots were prepared. On Jul. 1, 2015, 3 seeds were planted at two locations in each pot (6 seeds were used per one pot). A planted variety was "Fukuyutaka". During a cotyledon period, plants were thinned out to leave one plant for one location, allowing 2 plants to remain in each pot. Harvesting was carried out November 11 (133 days after seeding). For yield prediction, 10 plants for 5 pots were planned to be used; however, since one missing plant occurred, 29 plants were used in total.

3) Pot Test in 2016

Pot cultivation was conducted in Tochigi Prefecture. As soil therefor, domestic farm field soil was used to conduct the test. As a pot, a ½₀₀₀a Wagner pot was used; about 8 L of the above soil was put into one pot; and 75 pots were prepared. After several-days still standing, seeding was conducted in the same manner as in 2015. Seeding was conducted Jul. 1, 2016, and harvesting was conducted November 15. A planted variety was "Satono hohoemi." For yield prediction, 46 plants for 23 pots were used.

4) Pot Test in 2017

Pot cultivation was conducted in Tochigi Prefecture. As soil therefor, domestic farm field soil was used, and 2 kinds of soils were prepared: one soil, to which 125 g/m² of dolomite (Kyowa) and 100 g/m² of phosphoric acid-containing oil cake (Daiei Bussan) were added as fertilizers (1x); and the other soil, which was prepared by mixing a half of fertilizer-added soil and a half of non-added soil (0.5×). In addition, 4 varieties were used "Satono hohoemi," "Fukuyutaka," "Enrei" and "Yuagari musume." As a pot, a ½₀₀₀a Wagner pot was used; about 8 L of the above soil was put into one pot; and 5 pots for each soil, that is 40 pots for 4 varieties were prepared in total. After several-days still standing, 4 seeds of each variety were planted at 2 locations in each pot (8 seeds were used for each pot). During a cotyledon period, plants were thinned out to leave one plant for one location, allowing 2 plants to remain in each pot. Seeding was conducted on Jul. 4, 2017; and harvesting was conducted in October or later, that is, plants that were matured and determined to be in a proper time of harvesting were harvested sequentially.

A2. Sampling of Leaves

Leaves were sampled during day time on 28th to 32nd day after seeding in each cultivation test (generally at 10 to 15 o'clock). Growth stages of soybean at that time were slightly varied depending on the fiscal year, cultivation conditions or varieties, but they were generally in a foliar age of about 5-7. The foliar age mentioned herein refers to what number from the bottom an uppermost developed true leaf is when a primary leaf is taken as 1. As a sample leaf, a center compound leaf was collected from 3 compound leaves, which form true leaves of 1 or 2 foliar ages compared to an uppermost developed true leaf. However, when the center compound leaf was significantly damaged due to an insect damage, etc., another compound leaf was collected. The collected leaf was covered with an aluminum foil and immediately frozen in liquid nitrogen to stop a metabolic reaction. The frozen sample was brought back to a laboratory while being kept in a frozen state, and dried by freeze-drying. The dried sample was subjected to an extraction operation described below. In the 2015 and 2016 pot cultivation tests, a sample was collected from each individual, and yield data corresponding to each individual was used. Meanwhile, in the 2017 pot cultivation test, sampling was conducted for one pot, that is as a group of 2 individuals, and an average of 2 individual was used as yield data.

In addition, when leaf sampling was conducted, the number of days after seeding was as follows.

2015 pot test (1): Jul. 25, 2015 (30 days after seeding)
2015 pot test (2): Jul. 29, 2015 (28 days after seeding)
2016 pot test: Aug. 2, 2016 (32 days after seeding)
2017 pot test: Aug. 3, 2017 (30 days after seeding)

A3. Measurement of Final Fruit Yield

All fruits were collected from each individual after the cultivation test, and dried at 80° C. for 2 to 3 days. Such a dried weight (g DW/individual) was used as yield data. As described already in 2-2, average data of 2 individuals (per 1 pot) in the 2017 test was counted as one, and the pot test data in 2015 to 2017 was formed of 125 items in total. The yield data include, as shown in Tables A2a to 2c, the lowest value of 0.9 g DW/individual and the highest value of 42.5 g DW/individual.

TABLE A2a

| Test name | Sample name | Fiscal year | Condition | Variety | Dry fruit weight (g/plant) |
|---|---|---|---|---|---|
| Pot test (1) in 2015 | T1 | 2015 | Nitrogen amount: 3 | Satono hohoemi | 30.6 |
| | T10 | 2016 | Nitrogen amount: 3 | Satono hohoemi | 27.1 |
| | T2 | 2016 | Nitrogen amount: 3 | Satono hohoemi | 28.0 |
| | T3 | 2015 | Nitrogen amount: 3 | Satono hohoemi | 28.4 |
| | T4 | 2015 | Nitrogen amount: 3 | Satono hohoemi | 26.6 |
| | T5 | 2015 | Nitrogen amount: 3 | Satono hohoemi | 29.3 |
| | T6 | 2015 | Nitrogen amount: 3 | Satono hohoemi | 27.0 |
| | T7 | 2015 | Nitrogen amount: 3 | Satono hohoemi | 26.3 |
| | T8 | 2016 | Nitrogen amount: 3 | Satono hohoemi | 27.1 |
| | T9 | 2015 | Nitrogen amount: 3 | Satono hohoemi | 23.8 |
| Pot test (2) in 2015 | N1-1 | 2015 | Nitrogen amount: 1 | Fukuyutaka | 11.0 |
| | N1-2 | 2015 | Nitrogen amount: 1 | Fukuyutaka | 11.3 |
| | N1-3 | 2015 | Nitrogen amount: 1 | Fukuyutaka | 13.0 |
| | N1-4 | 2015 | Nitrogen amount: 1 | Fukuyutaka | 10.3 |
| | N1-6 | 2015 | Nitrogen amount: 1 | Fukuyutaka | 19.4 |

TABLE A2a-continued

| Test name | Sample name | Fiscal year | Condition | Variety | Dry fruit weight (g/plant) |
|---|---|---|---|---|---|
| | N1-6 | 2015 | Nitrogen amount: 1 | Fukuyutaka | 13.9 |
| | N1-7 | 2016 | Nitrogen amount: 1 | Fukuyutaka | 11.8 |
| | N1-8 | 2015 | Nitrogen amount: 1 | Fukuyutaka | 16.3 |
| | N1-9 | 2015 | Nitrogen amount: 1 | Fukuyutaka | 17.7 |
| | N3-1 | 2015 | Nitrogen amount: 3 | Fukuyutaka | 12.8 |
| | N3-10 | 2015 | Nitrogen amount: 3 | Fukuyutaka | 7.5 |
| | N3-2 | 2015 | Nitrogen amount: 3 | Fukuyutaka | 9.4 |
| | N3-3 | 2015 | Nitrogen amount: 3 | Fukuyutaka | 15.2 |
| | N3-4 | 2016 | Nitrogen amount: 3 | Fukuyutaka | 11.8 |
| | N3-5 | 2015 | Nitrogen amount: 3 | Fukuyutaka | 10.1 |
| | N3-6 | 2015 | Nitrogen amount: 3 | Fukuyutaka | 15.8 |
| | N3-7 | 2015 | Nitrogen amount: 3 | Fukuyutaka | 8.3 |
| | N3-8 | 2015 | Nitrogen amount: 3 | Fukuyutaka | 11.2 |
| | N3-9 | 2015 | Nitrogen amount: 3 | Fukuyutaka | 5.9 |
| | N10-1 | 2015 | Nitrogen amount: 10 | Fukuyutaka | 17.1 |
| | N10-10 | 2016 | Nitrogen amount: 10 | Fukuyutaka | 11.0 |
| | N10-2 | 2015 | Nitrogen amount: 10 | Fukuyutaka | 13.5 |
| | N10-3 | 2015 | Nitrogen amount: 10 | Fukuyutaka | 8.3 |
| | N10-4 | 2015 | Nitrogen amount: 10 | Fukuyutaka | 13,3 |
| | N10-5 | 2015 | Nitrogen amount: 10 | Fukuyutaka | 14.6 |
| | N10-6 | 2015 | Nitrogen amount: 10 | Fukuyutaka | 10.8 |
| | N10-7 | 2015 | Nitrogen amount: 10 | Fukuyutaka | 9.8 |
| | N10-8 | 2016 | Nitrogen amount: 10 | Fukuyutaka | 15.3 |
| | N10-9 | 2015 | Nitrogen amount: 10 | Fukuyutaka | 17.0 |

TABLE A2b

| Test name | Sample name | Fiscal year | Variety | Dry fruit weight (g/plant) |
|---|---|---|---|---|
| Pot test in 2016 | KG1 | 2016 | Satono hohoemi | 30.3 |
| | KG2 | 2016 | Satono hohoemi | 33.0 |
| | KG3 | 2016 | Satono hohoemi | 29.8 |
| | KG4 | 2016 | Satono hohoemi | 23.1 |
| | KG5 | 2016 | Satono hohoemi | 26.8 |
| | KG6 | 2016 | Satono hohoemi | 24.9 |
| | KG7 | 2016 | Satono hohoemi | 28.9 |
| | KG8 | 2016 | Satono hohoemi | 28.4 |
| | KG9 | 2016 | Satono hohoemi | 23.0 |
| | KG10 | 2016 | Satono hohoemi | 24.4 |
| | MG1 | 2016 | Satono hohoemi | 29.5 |
| | MG2 | 2016 | Satono hohoemi | 35.4 |
| | MG3 | 2016 | Satono hohoemi | 31.9 |
| | MG4 | 2016 | Satono hohoemi | 32.2 |
| | MG5 | 2016 | Satono hohoemi | 27.0 |
| | MG6 | 2016 | Satono hohoemi | 29.6 |
| | MG7 | 2016 | Satono hohoemi | 26.8 |
| | MG8 | 2016 | Satono hohoemi | 34.9 |
| | MG9 | 2016 | Satono hohoemi | 34.8 |
| | MG10 | 2016 | Satono hohoemi | 35.7 |
| | TC1 | 2016 | Satono hohoemi | 22.9 |
| | TC2 | 2016 | Satono hohoemi | 29.3 |
| | TC3 | 2016 | Satono hohoemi | 22.2 |
| | TC4 | 2016 | Satono hohoemi | 21.9 |
| | TC5 | 2016 | Satono hohoemi | 21.1 |
| | TC6 | 2016 | Satono hohoemi | 25.7 |
| | TC7 | 2016 | Satono hohoemi | 21.9 |
| | TC8 | 2016 | Satono hohoemi | 26.8 |
| | TC9 | 2016 | Satono hohoemi | 28.6 |
| | TC10 | 2016 | Satono hohoemi | 32.1 |
| | TC11 | 2016 | Satono hohoemi | 28.6 |
| | TC12 | 2016 | Satono hohoemi | 25.8 |
| | TC13 | 2016 | Satono hohoemi | 32.9 |
| | TC14 | 2016 | Satono hohoemi | 29.6 |
| | TC15 | 2016 | Satono hohoemi | 16.5 |
| | TC16 | 2016 | Satono hohoemi | 18.7 |
| | WK1 | 2016 | Satono hohoemi | 37.1 |
| | WK2 | 2016 | Satono hohoemi | 29.3 |
| | WK3 | 2016 | Satono hohoemi | 31.9 |
| | WK4 | 2016 | Satono hohoemi | 31.7 |
| | WK5 | 2016 | Satono hohoemi | 16.1 |
| | WK6 | 2016 | Satono hohoemi | 42.5 |
| | WK7 | 2016 | Satono hohoemi | 33.4 |
| | WK8 | 2016 | Satono hohoemi | 27.5 |
| | WK9 | 2016 | Satono hohoemi | 29.0 |
| | WK10 | 2016 | Satono hohoemi | 38.4 |

TABLE A2c

| Test name | Sample name | Fiscal year | Condition | Variety | Dry fruit weight (g/plant) |
|---|---|---|---|---|---|
| Pot test in 2017 | Y1/2_1 | 2017 | 1/2× fertilizer | Yuagari musume | 5.4 |
| | Y1/2_2 | 2017 | 1/2× fertilizer | Yuagari musume | 4.3 |
| | Y1/2_3 | 2017 | 1/2× fertilizer | Yuagari musume | 4.4 |
| | Y1/2_4 | 2017 | 1/2× fertilizer | Yuagari musume | 5.4 |
| | Y1/2_5 | 2017 | 1/2× fertilizer | Yuagari musume | 4.3 |
| | Y1_1 | 2017 | 1× fertilizer | Yuagari musume | 13.2 |
| | Y1_2 | 2017 | 1× fertilizer | Yuagari musume | 14.3 |
| | Y1_3 | 2017 | 1× fertilizer | Yuagari musume | 9.3 |
| | Y1_4 | 2017 | 1× fertilizer | Yuagari musume | 11.1 |
| | Y1_5 | 2017 | 1× fertilizer | Yuagari musume | 12.4 |
| | F1/2_1 | 2017 | 1/2× fertilizer | Fukuyutaka | 5.5 |
| | F1/2_2 | 2017 | 1/2× fertilizer | Fukuyutaka | 7.1 |
| | F1/2_3 | 2017 | 1/2× fertilizer | Fukuyutaka | 9.8 |
| | F1/2_4 | 2017 | 1/2× fertilizer | Fukuyutaka | 7.9 |
| | F1/2_5 | 2017 | 1/2× fertilizer | Fukuyutaka | 5.9 |
| | F1_1 | 2017 | 1× fertilizer | Fukuyutaka | 14.2 |
| | F1_2 | 2017 | 1× fertilizer | Fukuyutaka | 17.1 |
| | F1_3 | 2017 | 1× fertilizer | Fukuyutaka | 17.0 |
| | F1_4 | 2017 | 1× fertilizer | Fukuyutaka | 17.7 |
| | F1_5 | 2017 | 1× fertilizer | Fukuyutaka | 5.1 |
| | S1/2_1 | 2017 | 1/2× fertilizer | Satono hohoemi | 6.1 |

TABLE A2c-continued

| Test name | Sample name | Fiscal year | Condition | Variety | Dry fruit weight (g/plant) |
|---|---|---|---|---|---|
| | S1/2_2 | 2017 | 1/2× fertilizer | Satono hohoemi | 8.0 |
| | S1/2_3 | 2017 | 1/2× fertilizer | Satono hohoemi | 10.3 |
| | S1/2_4 | 2017 | 1/2× fertilizer | Satono hohoemi | 8.7 |
| | S1/2_5 | 2017 | 1/2× fertilizer | Satono hohoemi | 8.7 |
| | S1_1 | 2017 | 1× fertilizer | Satono hohoemi | 15.6 |
| | S1_2 | 2017 | 1× fertilizer | Satono hohoemi | 19.8 |
| | S1_3 | 2017 | 1× fertilizer | Satono hohoemi | 19.2 |
| | S1_4 | 2017 | 1× fertilizer | Satono hohoemi | 18.1 |
| | S1_5 | 2017 | 1× fertilizer | Satono hohoemi | 14.5 |
| | E1/2_1 | 2017 | 1/2× fertilizer | Enrei | 8.3 |
| | E1/2_2 | 2017 | 1/2× fertilizer | Enrei | 7.6 |
| | E1/2_3 | 2017 | 1/2× fertilizer | Enrei | 7.2 |
| | E1/2_4 | 2017 | 1/2× fertilizer | Enrei | 9.6 |
| | E1/2_5 | 2017 | 1/2× fertilizer | Enrei | 0.9 |
| | E1_1 | 2017 | 1× fertilizer | Enrei | 11.4 |
| | E1_2 | 2017 | 1× fertilizer | Enrei | 16.4 |
| | E1_3 | 2017 | 1× fertilizer | Enrei | 15.7 |
| | E1_4 | 2017 | 1× fertilizer | Enrei | 14.8 |
| | E1_5 | 2017 | 1× fertilizer | Enrei | 16.5 |

<Evaluation Using Soybean Metabolites Separated and Detected by LC/MS>

A4. Extraction of components of collected leaves

Freeze-dried leaf samples of 125 plants shown in Tables A2a to 2c were manually ground as much as possible using a spatula. After being ground, 10 mg thereof was weighed and charged into a 2-mL tube (safe lock tube, Eppendorf), one 5 mm-diameter ball made of zirconia was added to the tube, and pulverization was conducted at 25 Hz for 1 minute by a bead pulverizer (MM400, Retsch). As an extraction solvent, used was an 80 v/v % methanol aqueous solution wherein lidocaine (Wako Pure Chemical Industries, Ltd., #120-02671) as internal standard was added to be 500 ng/mL. Then, 1 mL of the prepared extraction solvent was added to the tube after pulverization, and homogenizing extraction was conducted at 20 Hz for 5 minutes by the same bead pulverizer. After the end of extraction, centrifugation was conducted at about 2,000×g for about 30 seconds by a desktop centrifuge (CHIBITAN), filtration was conducted by a 0.45-μm hydrophilic PTFE filter (DISMIC-13HP 0.45 μm syringe filter, ADVANTEC), and an analytical sample was obtained.

A5. Analysis of leaf sample by LC/MS

A sample extracted from a leaf was analyzed by LC/MS analysis using a HPLC system available from Agilent (Infinity 1260 series) as a front and a Q-TOFMS device available from AB SCIEX (Triple TOF4600) as a detector. In separation column for HPLC, used were a core shell column, Capecell core C18 (2.1 mm I.D.×100 mm, particle diameter 2.7 μm); and a guard column (2.1 mm I.D.×5 mm, particle diameter 2.7 μm) available from Shiseido Co., Ltd.; and the column temperature was set to 40° C. An autosampler was kept at 5° C. during analysis. 5 μL of analytical sample was injected. Eluents used herein were A: 0.1 v/v % formic acid aqueous solution and B: 0.1 v/v % acetonitrile formate solution. Gradient elution conditions were: 1 v/v % of B (99 v/v % of A) was kept for 0 to 0.1 minutes; the ratio of the eluent B was increased from 1 v/v % of B to 99.5 v/v % of B between 0.1 and 13 minutes; and 99.5 v/v % of B was kept from 13.01 to 16 minutes. The flow rate was 0.5 mL/min.

As a condition for a mass analysis device, an ionization mode was brought into a positive mode and ESI was used as an ionization method. In this analytical system, while repeating a cycle including scanning ions eluted for 0.1 second by TOFMS, selecting 10 ions having a larger intensity among them, and subjecting each of 10 ions to MS/MS for 0.05 seconds, molecular ion information (accurate mass, m/z) by TOFMS scan and structure information derived from fragments caused by MS/MS scan were obtained. The range of mass measurement for TOFMS was set from 100 to 1,250 m/z and that for MS/MS was set from 50 to 1,250 m/z. Parameters for TOFMS scan were set to GS1=50, GS2=50, CUR=25, TEM=450, ISVF=5,500, DP=80 and CE=10; those for MS/MS scan were set to GS1=50, GS2=50, CUR=25, TEM=450, ISVF=5,500, DP=80, CE=30, CES=15, IRD=30 and IRW=15.

A6. Creation of data matrices

Data processing was conducted as described below. First, MarkerView™ Softwater (AB SCIEX) was used to extract peaks. A peak extraction condition ("peak finding option") was for peaks having a retention time of 0.5 to 16 minutes. In the item "Enhance Peak Finding," Subtraction offset was set to 20 scans, Minimum spectral peak width was set to 5 ppm, Subtraction multi. Factor was set to 1.2, Minimum RT peak width was set to 10 scans, and Noise threshold was set to 5. In the item "More," Assign charge state was set to valid. As a result, information of 12,444 peaks was obtained.

Next, alignment processing was conducted to align samples whose detected peaks were analyzed. Alignment processing conditions ("Alighmment & Filtering") are as follows. In the item "Alignment," Retention time tolerance was set to 0.20 minutes and Mass tolerance was set to 10.0 ppm. Further, in the item "Filtering," Intensity threshold was set to 10, Retention time filtering was set to valid, Remove peaks in was set to less than 3 samples, and Maximum number of peaks was set to 50,000. In item "Internal standards," retention times were corrected by use of a peak of lidocaine.

Next, isotope peaks were removed. Isotope peaks were automatically identified by software at the time of peak extraction and a label "isotopic" was given on a peak list; and therefore, they were sorted by "isotopic" and label-given peaks were removed. As a result, the number of peaks was reduced to 10,112.

Next, peak intensity correction among samples was conducted. In the present analysis, in addition to the sample, a sample called pooled QC prepared by mixing certain amounts of all of the samples was prepared, and analysis of the pooled QC was conducted at a frequency of once in nine times. From all of the QC analysis results, an estimated value on "what peak intensity each would have if QC samples are analyzed at the time when each sample is analyzed" was calculated and the estimated value was used to conduct a correction treatment, so that the sensitivity among samples in the same batch was corrected. For this processing, free software (LOWESS-Normalization-Tool) provided by Riken was used. Finally, 30 measured QC analysis data items were used to calculate a relative standard deviation (RSD) of 10,112 peaks. Peaks having a larger variation, RSD>30% were removed, and finally, data of 431 peaks, that is analytical data of 431 components were obtained. The obtained analytical data is shown in Tables A2a to 3f. This data was hereafter used to make analyses.

TABLE A3a

| Component No. | m/z | Retention time |
|---|---|---|
| 1 | 139.0389 | 3.92 |
| 2 | 141.9592 | 8.84 |
| 3 | 147.0435 | 5.02 |
| 4 | 147.0446 | 3.74 |
| 5 | 149.0234 | 15.09 |
| 6 | 149.0241 | 11.39 |
| 7 | 161.0606 | 13.19 |
| 8 | 163.0398 | 4.66 |
| 9 | 163.1325 | 5.49 |
| 10 | 165.0550 | 3.73 |
| 11 | 170.0974 | 9.73 |
| 12 | 171.1501 | 5.90 |
| 13 | 175.1486 | 5.65 |
| 14 | 177.0551 | 3.87 |
| 15 | 179.0717 | 13.19 |
| 16 | 181.1232 | 7.62 |
| 17 | 181.1237 | 9.60 |
| 18 | 183.1865 | 4.65 |
| 19 | 186.0921 | 7.54 |
| 20 | 189.1278 | 4.55 |
| 21 | 190.0506 | 3.92 |
| 22 | 191.1437 | 6.52 |
| 23 | 191.1439 | 5.92 |
| 24 | 193.0859 | 9.90 |
| 25 | 193.0861 | 10.48 |
| 26 | 193.1597 | 10.50 |
| 27 | 194.1182 | 9.00 |
| 28 | 196.0655 | 3.83 |
| 29 | 196.1127 | 11.83 |
| 30 | 197.1181 | 5.46 |
| 31 | 199.1333 | 7.78 |
| 32 | 199.1818 | 7.44 |
| 33 | 200.2382 | 7.77 |
| 34 | 205.0872 | 11.41 |
| 35 | 205.0983 | 3.48 |
| 36 | 207.0650 | 3.93 |
| 37 | 207.1390 | 4.65 |
| 38 | 209.1171 | 10.84 |
| 39 | 209.1178 | 4.51 |
| 40 | 209.1538 | 5.53 |
| 41 | 209.1545 | 4.60 |
| 42 | 209.1548 | 5.02 |
| 43 | 211.0608 | 3.69 |
| 44 | 213.1503 | 9.61 |
| 45 | 214.2539 | 7.87 |
| 46 | 217.1961 | 8.55 |
| 47 | 219.1754 | 6.65 |
| 48 | 219.1950 | 9.89 |
| 49 | 220.1137 | 10.84 |
| 50 | 221.0456 | 3.69 |
| 51 | 221.6020 | 3.53 |
| 52 | 225.1500 | 4.64 |
| 53 | 225.1972 | 8.07 |
| 54 | 226.0991 | 11.39 |
| 55 | 226.1610 | 11.94 |
| 56 | 226.1812 | 7.12 |
| 57 | 227.1286 | 4.50 |
| 58 | 227.1294 | 6.05 |
| 59 | 228.1954 | 7.78 |
| 60 | 228.2321 | 12.09 |
| 61 | 231.0512 | 6.81 |
| 62 | 233.9842 | 3.89 |
| 63 | 234.0928 | 10.24 |
| 64 | 235.1702 | 10.70 |
| 65 | 239.0562 | 3.69 |
| 66 | 241.1446 | 5.21 |
| 67 | 242.2485 | 11.48 |
| 68 | 243.0667 | 4.55 |
| 69 | 243.1608 | 5.92 |
| 70 | 243.2114 | 12.58 |
| 71 | 245.2281 | 13.29 |
| 72 | 249.0621 | 6.80 |
| 73 | 252.0874 | 4.94 |
| 74 | 252.0882 | 4.51 |
| 75 | 253.2170 | 7.49 |
| 76 | 255.0669 | 6.04 |
| 77 | 256.2649 | 12.76 |
| 78 | 256.2650 | 11.95 |
| 79 | 257.0660 | 3.74 |
| 80 | 257.1908 | 8.66 |

TABLE A3b

| Component No. | m/z | Retention time |
|---|---|---|
| 81 | 259.0827 | 5.89 |
| 82 | 259.2076 | 12.81 |
| 83 | 261.1501 | 15.02 |
| 84 | 261.2233 | 12.62 |
| 85 | 263.2381 | 13.29 |
| 86 | 264.2335 | 6.64 |
| 87 | 265.1440 | 3.96 |
| 88 | 269.0818 | 7.57 |
| 89 | 271.0618 | 6.93 |
| 90 | 271.0619 | 4.54 |
| 91 | 271.2280 | 7.42 |
| 92 | 273.0769 | 5.55 |
| 93 | 274.0541 | 11.48 |
| 94 | 274.0928 | 3.74 |
| 95 | 274.1606 | 12.33 |
| 96 | 275.2020 | 8.66 |
| 97 | 275.2023 | 10.26 |
| 98 | 277.2184 | 9.64 |
| 99 | 277.2186 | 10.75 |
| 100 | 277.2186 | 9.95 |
| 101 | 279.0512 | 6.30 |
| 102 | 279.0515 | 8.46 |
| 103 | 279.0951 | 8.04 |
| 104 | 279.1610 | 11.57 |
| 105 | 279.1611 | 14.98 |
| 106 | 279.2320 | 10.11 |
| 107 | 279.2333 | 11.46 |
| 108 | 279.2340 | 10.52 |
| 109 | 279.2343 | 12.60 |
| 110 | 281.2485 | 13.28 |
| 111 | 282.1376 | 13.05 |
| 112 | 282.2236 | 13.75 |
| 113 | 282.2800 | 13.02 |
| 114 | 284.2960 | 13.94 |
| 115 | 285.1255 | 9.94 |
| 116 | 285.1713 | 12.07 |
| 117 | 285.1718 | 6.80 |
| 118 | 285.6271 | 9.92 |
| 119 | 287.0566 | 7.03 |
| 120 | 287.0567 | 4.76 |
| 121 | 288.2911 | 7.54 |
| 122 | 289.0727 | 4.54 |
| 123 | 289.1228 | 9.96 |
| 124 | 291.0401 | 5.92 |
| 125 | 291.1973 | 13.16 |
| 126 | 291.1975 | 7.70 |
| 127 | 291.2340 | 11.76 |
| 128 | 293.2118 | 9.63 |
| 129 | 293.2130 | 10.26 |
| 130 | 293.2498 | 14.28 |
| 131 | 295.0936 | 4.70 |
| 132 | 295.1037 | 5.90 |
| 133 | 295.1299 | 3.97 |
| 134 | 295.2288 | 10.75 |
| 135 | 297.2436 | 11.53 |
| 136 | 298.0986 | 3.62 |
| 137 | 299.2023 | 12.27 |
| 138 | 301.1424 | 11.41 |
| 139 | 305.0674 | 4.07 |
| 140 | 305.9907 | 3.75 |
| 141 | 307.0128 | 5.93 |
| 142 | 307.0943 | 4.29 |
| 143 | 309.2075 | 7.54 |
| 144 | 309.2228 | 10.39 |
| 145 | 315.0062 | 5.92 |
| 146 | 316.2134 | 4.15 |
| 147 | 316.2865 | 8.21 |
| 148 | 318.2806 | 7.65 |

TABLE A3b-continued

| Component No. | m/z | Retention time |
|---|---|---|
| 149 | 319.1536 | 3.88 |
| 150 | 319.2853 | 12.12 |
| 151 | 320.9916 | 6.78 |
| 152 | 321.0632 | 7.22 |
| 153 | 321.0983 | 5.06 |
| 154 | 321.1463 | 5.01 |
| 155 | 322.2765 | 8.84 |
| 156 | 323.0751 | 3.95 |
| 157 | 323.1290 | 5.55 |
| 158 | 325.1444 | 5.51 |
| 159 | 327.0795 | 10.47 |
| 160 | 327.2336 | 10.40 |

TABLE A3c

| Component No. | m/z | Retention time |
|---|---|---|
| 161 | 327.2340 | 10.73 |
| 162 | 329.1613 | 12.34 |
| 163 | 331.1409 | 5.64 |
| 164 | 333.1528 | 12.59 |
| 165 | 335.1237 | 5.99 |
| 166 | 335.1542 | 12.59 |
| 167 | 335.2595 | 12.89 |
| 168 | 335.2595 | 14.99 |
| 169 | 335.2600 | 9.94 |
| 170 | 336.3128 | 12.11 |
| 171 | 337.0938 | 4.63 |
| 172 | 337.1724 | 5.70 |
| 173 | 338.3440 | 15.10 |
| 174 | 339.0715 | 3.71 |
| 175 | 339.0734 | 7.19 |
| 176 | 341.1385 | 5.50 |
| 177 | 341.1451 | 12.60 |
| 178 | 341.2680 | 12.17 |
| 179 | 342.2139 | 3.61 |
| 180 | 342.3390 | 9.90 |
| 181 | 343.1022 | 3.62 |
| 182 | 343.1042 | 3.92 |
| 183 | 343.2288 | 9.46 |
| 184 | 343.2292 | 9.75 |
| 185 | 344.1358 | 4.14 |
| 186 | 346.1516 | 3.92 |
| 187 | 349.0912 | 4.14 |
| 188 | 349.1485 | 10.75 |
| 189 | 349.2761 | 11.70 |
| 190 | 351.2558 | 9.32 |
| 191 | 352.2528 | 8.39 |
| 192 | 353.2713 | 11.82 |
| 193 | 355.0832 | 8.46 |
| 194 | 355.1027 | 4.02 |
| 195 | 357.1584 | 8.16 |
| 196 | 357.1705 | 10.51 |
| 197 | 358.1656 | 9.23 |
| 198 | 358.9809 | 10.61 |
| 199 | 361.2551 | 11.55 |
| 200 | 362.0177 | 6.81 |
| 201 | 363.2553 | 14.49 |
| 202 | 363.3128 | 12.10 |
| 203 | 364.3237 | 9.15 |
| 204 | 365.3202 | 8.55 |
| 205 | 366.1783 | 5.63 |
| 206 | 366.3393 | 9.59 |
| 207 | 367.0343 | 5.90 |
| 208 | 367.2635 | 12.24 |
| 209 | 367.2652 | 11.77 |
| 210 | 369.0831 | 3.87 |
| 211 | 369.1268 | 12.08 |
| 212 | 371.1876 | 10.38 |
| 213 | 371.1881 | 11.33 |
| 214 | 371.2075 | 5.47 |
| 215 | 372.1673 | 4.12 |
| 216 | 373.0778 | 3.67 |
| 217 | 373.1291 | 5.55 |
| 218 | 374.1088 | 3.73 |

TABLE A3c-continued

| Component No. | m/z | Retention time |
|---|---|---|
| 219 | 374.1459 | 5.06 |
| 220 | 375.2710 | 12.10 |
| 221 | 379.0634 | 3.74 |
| 222 | 380.3389 | 12.11 |
| 223 | 382.2026 | 12.00 |
| 224 | 383.0771 | 6.31 |
| 225 | 383.2574 | 10.80 |
| 226 | 383.2591 | 11.24 |
| 227 | 385.2945 | 12.11 |
| 228 | 387.0938 | 3.84 |
| 229 | 387.1832 | 8.47 |
| 230 | 387.2032 | 4.56 |
| 231 | 388.1627 | 5.55 |
| 232 | 390.1035 | 3.67 |
| 233 | 390.1892 | 12.05 |
| 234 | 391.2862 | 14.98 |
| 235 | 393.2811 | 12.10 |
| 236 | 393.7143 | 6.30 |
| 237 | 394.2089 | 6.74 |
| 238 | 398.2341 | 12.86 |
| 239 | 399.1645 | 6.78 |
| 240 | 399.2520 | 10.98 |

TABLE A3d

| Component No. | m/z | Retention time |
|---|---|---|
| 241 | 401.0882 | 6.31 |
| 242 | 401.0907 | 8.99 |
| 243 | 401.0909 | 8.48 |
| 244 | 401.2869 | 12.48 |
| 245 | 401.7112 | 6.16 |
| 246 | 403.2351 | 12.28 |
| 247 | 404.1215 | 4.21 |
| 248 | 404.2102 | 8.47 |
| 249 | 405.1316 | 5.58 |
| 250 | 405.3534 | 8.56 |
| 251 | 405.3538 | 7.88 |
| 252 | 406.1362 | 3.87 |
| 253 | 406.2078 | 4.47 |
| 254 | 407.3688 | 8.13 |
| 255 | 407.3692 | 8.82 |
| 256 | 409.0757 | 3.87 |
| 257 | 409.2738 | 11.56 |
| 258 | 409.2749 | 11.23 |
| 259 | 410.7059 | 6.48 |
| 260 | 411.0022 | 3.73 |
| 261 | 411.1627 | 4.49 |
| 262 | 412.3808 | 9.25 |
| 263 | 419.1201 | 3.87 |
| 264 | 420.2238 | 6.96 |
| 265 | 423.2245 | 5.91 |
| 266 | 423.2762 | 10.07 |
| 267 | 423.3643 | 8.56 |
| 268 | 423.3644 | 7.83 |
| 269 | 424.3649 | 12.10 |
| 270 | 424.3681 | 7.86 |
| 271 | 425.1943 | 10.51 |
| 272 | 427.1044 | 8.96 |
| 273 | 431.1017 | 6.81 |
| 274 | 432.2476 | 11.69 |
| 275 | 432.2597 | 4.62 |
| 276 | 433.1140 | 5.30 |
| 277 | 433.1149 | 5.61 |
| 278 | 433.1355 | 4.31 |
| 279 | 434.1386 | 4.32 |
| 280 | 434.2406 | 4.50 |
| 281 | 435.1300 | 5.57 |
| 282 | 435.1304 | 4.10 |
| 283 | 436.1466 | 3.86 |
| 284 | 439.1991 | 5.92 |
| 285 | 439.3603 | 8.46 |
| 286 | 440.2333 | 11.67 |
| 287 | 440.2513 | 5.89 |
| 288 | 441.3741 | 8.00 |

TABLE A3d-continued

| Component No. | m/z | Retention time |
|---|---|---|
| 289 | 441.3746 | 8.56 |
| 290 | 442.2570 | 5.93 |
| 291 | 443.1002 | 6.89 |
| 292 | 443.1020 | 7.22 |
| 293 | 445.2077 | 5.90 |
| 294 | 448.1949 | 3.88 |
| 295 | 449.1093 | 5.46 |
| 296 | 449.1101 | 4.95 |
| 297 | 454.2944 | 10.19 |
| 298 | 455.1197 | 4.30 |
| 299 | 457.2091 | 5.91 |
| 300 | 457.2096 | 4.83 |
| 301 | 461.1784 | 5.96 |
| 302 | 466.2667 | 6.23 |
| 303 | 468.2829 | 5.95 |
| 304 | 468.3930 | 12.08 |
| 305 | 469.1831 | 5.21 |
| 306 | 471.2180 | 11.03 |
| 307 | 471.2243 | 6.25 |
| 308 | 473.1087 | 4.54 |
| 309 | 473.2048 | 5.00 |
| 310 | 474.1748 | 3.65 |
| 311 | 477.1435 | 5.93 |
| 312 | 478.1385 | 7.19 |
| 313 | 479.1907 | 5.83 |
| 314 | 482.3270 | 11.35 |
| 315 | 483.0931 | 7.19 |
| 316 | 484.2764 | 5.90 |
| 317 | 489.0813 | 4.51 |
| 318 | 489.2158 | 8.84 |
| 319 | 489.3604 | 12.07 |
| 320 | 492.2465 | 5.01 |

TABLE A3e

| Component No. | m/z | Retention time |
|---|---|---|
| 321 | 495.2516 | 12.87 |
| 322 | 495.2983 | 8.29 |
| 323 | 496.3441 | 10.26 |
| 324 | 497.3151 | 9.93 |
| 325 | 499.2284 | 8.05 |
| 326 | 501.7425 | 8.86 |
| 327 | 503.1948 | 5.56 |
| 328 | 503.2243 | 7.98 |
| 329 | 511.1280 | 5.88 |
| 330 | 511.3803 | 7.94 |
| 331 | 511.7557 | 7.99 |
| 332 | 512.2363 | 10.80 |
| 333 | 512.2555 | 12.18 |
| 334 | 513.2753 | 10.68 |
| 335 | 514.0452 | 8.48 |
| 336 | 514.7519 | 7.44 |
| 337 | 517.1378 | 6.45 |
| 338 | 517.3932 | 12.04 |
| 339 | 519.1171 | 5.94 |
| 340 | 519.2090 | 5.59 |
| 341 | 519.7403 | 8.03 |
| 342 | 520.1200 | 5.81 |
| 343 | 520.3438 | 9.88 |
| 344 | 521.2610 | 10.68 |
| 345 | 523.1272 | 8.48 |
| 346 | 524.3749 | 11.40 |
| 347 | 525.3656 | 5.63 |
| 348 | 529.3922 | 11.70 |
| 349 | 529.3922 | 13.38 |
| 350 | 535.2828 | 8.59 |
| 351 | 541.3908 | 12.92 |
| 352 | 545.3872 | 12.07 |
| 353 | 547.1474 | 6.41 |
| 354 | 549.3956 | 8.56 |
| 355 | 550.2466 | 7.89 |
| 356 | 551.2617 | 7.94 |
| 357 | 551.4265 | 14.59 |
| 358 | 562.7721 | 7.95 |

TABLE A3e-continued

| Component No. | m/z | Retention time |
|---|---|---|
| 359 | 563.3983 | 12.07 |
| 360 | 566.1687 | 8.96 |
| 361 | 567.4059 | 8.60 |
| 362 | 568.4282 | 14.59 |
| 363 | 577.3607 | 7.08 |
| 364 | 589.4859 | 14.12 |
| 365 | 593.2836 | 13.61 |
| 366 | 595.1687 | 5.32 |
| 367 | 595.3716 | 7.02 |
| 368 | 599.3987 | 8.52 |
| 369 | 599.3990 | 7.99 |
| 370 | 599.4149 | 13.19 |
| 371 | 607.2588 | 12.42 |
| 372 | 607.2968 | 14.67 |
| 373 | 608.3000 | 14.69 |
| 374 | 609.4550 | 12.00 |
| 375 | 611.1640 | 4.98 |
| 376 | 611.4690 | 14.01 |
| 377 | 611.4711 | 12.91 |
| 378 | 612.4753 | 14.02 |
| 379 | 613.4849 | 15.68 |
| 380 | 613.4871 | 14.88 |
| 381 | 614.4900 | 14.89 |
| 382 | 617.4082 | 8.58 |
| 383 | 617.4263 | 13.19 |
| 384 | 618.0719 | 8.48 |
| 385 | 621.2735 | 13.66 |
| 386 | 623.3030 | 6.58 |
| 387 | 627.4672 | 11.70 |
| 388 | 636.4255 | 12.87 |
| 389 | 638.4423 | 12.20 |
| 390 | 660.4261 | 12.32 |
| 391 | 666.3033 | 6.72 |
| 392 | 673.3398 | 5.71 |
| 393 | 686.4532 | 12.06 |
| 394 | 691.4073 | 12.02 |
| 395 | 741.2290 | 4.95 |
| 396 | 742.4794 | 12.07 |
| 397 | 743.4423 | 8.54 |
| 398 | 747.4319 | 12.05 |
| 399 | 748.4819 | 12.79 |
| 400 | 758.2248 | 4.76 |

TABLE A3f

| Component No. | m/z | Retention time |
|---|---|---|
| 401 | 759.2281 | 4.73 |
| 402 | 771.5090 | 12.02 |
| 403 | 773.2175 | 4.52 |
| 404 | 773.5266 | 12.91 |
| 405 | 773.5271 | 14.02 |
| 406 | 786.4227 | 6.30 |
| 407 | 796.5558 | 13.57 |
| 408 | 806.5469 | 14.21 |
| 409 | 808.5582 | 13.99 |
| 410 | 811.5014 | 14.18 |
| 411 | 813.5185 | 14.01 |
| 412 | 820.4071 | 6.50 |
| 413 | 824.5537 | 13.91 |
| 414 | 824.5603 | 13.35 |
| 415 | 829.5146 | 13.32 |
| 416 | 840.5490 | 13.23 |
| 417 | 842.5683 | 11.69 |
| 418 | 847.5255 | 11.66 |
| 419 | 923.5063 | 8.86 |
| 420 | 923.5066 | 8.53 |
| 421 | 943.5349 | 8.06 |
| 422 | 945.5359 | 8.02 |
| 423 | 969.5500 | 10.88 |
| 424 | 970.6150 | 12.94 |
| 425 | 973.5566 | 13.16 |
| 426 | 975.5749 | 12.91 |
| 427 | 986.6112 | 12.96 |
| 428 | 1013.5361 | 7.96 |

TABLE A3f-continued

| Component No. | m/z | Retention time |
|---|---|---|
| 429 | 1069.5653 | 8.57 |
| 430 | 1073.5610 | 7.88 |
| 431 | 1155.5683 | 8.75 |

A7. Correlation analysis

Correlation analysis was made using analytical data of 431 components and corresponding yield data in collected 125 leaves, that is matrix data of 125×432. A simple correlation coefficient between analytical data of each component and yield data, r, and a p value by test of no correlation were calculated. Results are shown in Tables A4a to A4f. With respect to "Component No." in the tables, a smaller number is conveniently given to a component having a smaller mass number when 431 components are listed in order of mass. In addition, analytical results include information on a retention time together with mass information. JP-A-2016-57219 indicates that use of an accurate mass number with 4 digits or more after the decimal point enables comparison and analysis of mass analysis data among a plurality of samples for mass analysis regardless of the retention time. Thus, information on a retention time is removed and accurate mass information alone is described.

TABLE A4a

| Component No. | m/z | Correlation r with yield | p | Component No. | m/z | Correlation r with yield | p |
|---|---|---|---|---|---|---|---|
| 1 | 139.0389 | −0.050 | 0.579 | 41 | 209.1545 | 0.746 | 0.000 |
| 2 | 141.9592 | −0.173 | 0.054 | 42 | 209.1548 | 0.645 | 0.000 |
| 3 | 147.0435 | 0.097 | 0.282 | 43 | 211.0608 | −0.319 | 0.000 |
| 4 | 147.0446 | −0.396 | 0.000 | 44 | 213.1503 | 0.524 | 0.000 |
| 5 | 149.0234 | −0.167 | 0.063 | 45 | 214.2539 | −0.143 | 0.111 |
| 6 | 149.0241 | −0.289 | 0.001 | 46 | 217.1961 | −0.254 | 0.004 |
| 7 | 161.0606 | −0.480 | 0.000 | 47 | 219.1754 | −0.559 | 0.000 |
| 8 | 163.0398 | 0.200 | 0.025 | 48 | 219.1950 | −0.558 | 0.000 |
| 9 | 163.1325 | −0.030 | 0.744 | 49 | 220.1137 | 0.069 | 0.441 |
| 10 | 165.0550 | −0.388 | 0.000 | 50 | 221.0456 | −0.322 | 0.000 |
| 11 | 170.0974 | −0.049 | 0.590 | 51 | 221.6020 | 0.697 | 0.000 |
| 12 | 171.1501 | −0.219 | 0.014 | 52 | 225.1500 | 0.649 | 0.000 |
| 13 | 175.1486 | 0.514 | 0.000 | 53 | 225.1972 | −0.228 | 0.010 |
| 14 | 177.0551 | −0.706 | 0.000 | 54 | 226.0991 | −0.595 | 0.000 |
| 15 | 179.0717 | −0.458 | 0.000 | 55 | 226.1610 | 0.338 | 0.000 |
| 16 | 181.1232 | −0.374 | 0.000 | 56 | 226.1812 | 0.189 | 0.034 |
| 17 | 181.1237 | 0.541 | 0.000 | 57 | 227.1286 | −0.569 | 0.000 |
| 18 | 183.1865 | 0.195 | 0.029 | 58 | 227.1294 | −0.624 | 0.000 |
| 19 | 186.0921 | −0.187 | 0.037 | 59 | 228.1954 | 0.281 | 0.001 |
| 20 | 189.1278 | 0.539 | 0.000 | 60 | 228.2321 | −0.017 | 0.849 |
| 21 | 190.0506 | 0.533 | 0.000 | 61 | 231.0512 | 0.188 | 0.035 |
| 22 | 191.1437 | −0.659 | 0.000 | 62 | 233.9842 | −0.054 | 0.546 |
| 23 | 191.1439 | 0.713 | 0.000 | 63 | 234.0928 | −0.101 | 0.265 |
| 24 | 193.0859 | −0.228 | 0.011 | 64 | 235.1702 | −0.262 | 0.003 |
| 25 | 193.0861 | −0.188 | 0.035 | 65 | 239.0562 | −0.300 | 0.001 |
| 26 | 193.1597 | −0.435 | 0.000 | 66 | 241.1446 | −0.331 | 0.000 |
| 27 | 194.1182 | 0.300 | 0.001 | 67 | 242.2485 | 0.067 | 0.456 |
| 28 | 195.0655 | −0.619 | 0.000 | 68 | 243.0667 | −0.702 | 0.000 |
| 29 | 196.1127 | −0.440 | 0.000 | 69 | 243.1608 | 0.149 | 0.097 |
| 30 | 197.1181 | −0.297 | 0.001 | 70 | 243.2114 | −0.349 | 0.000 |
| 31 | 199.1333 | −0.032 | 0.724 | 71 | 245.2281 | −0.616 | 0.000 |
| 32 | 199.1818 | 0.309 | 0.000 | 72 | 249.0621 | 0.159 | 0.077 |
| 33 | 200.2382 | −0.096 | 0.285 | 73 | 252.0874 | −0.538 | 0.000 |
| 34 | 205.0872 | −0.362 | 0.000 | 74 | 252.0882 | −0.269 | 0.002 |
| 35 | 205.0983 | −0.604 | 0.000 | 75 | 253.2170 | −0.489 | 0.000 |
| 36 | 207.0650 | −0.677 | 0.000 | 76 | 255.0669 | −0.333 | 0.000 |
| 37 | 207.1390 | 0.675 | 0.000 | 77 | 256.2649 | −0.088 | 0.330 |
| 38 | 209.1171 | 0.056 | 0.536 | 78 | 256.2650 | 0.011 | 0.902 |
| 39 | 209.1178 | −0.525 | 0.000 | 79 | 257.0660 | −0.347 | 0.000 |
| 40 | 209.1538 | 0.464 | 0.000 | 80 | 257.1908 | −0.567 | 0.000 |

TABLE A4b

| Component No. | m/z | Correlation r with yield | p | Component No. | m/z | Correlation r with yield | p |
|---|---|---|---|---|---|---|---|
| 81 | 259.0827 | 0.216 | 0.016 | 121 | 288.2911 | −0.024 | 0.786 |
| 82 | 259.2076 | −0.507 | 0.000 | 122 | 289.0727 | −0.686 | 0.000 |
| 83 | 261.1501 | −0.030 | 0.737 | 123 | 289.1228 | 0.131 | 0.146 |
| 84 | 261.2233 | −0.466 | 0.000 | 124 | 291.0401 | 0.344 | 0.000 |
| 85 | 263.2381 | −0.616 | 0.000 | 125 | 291.1973 | −0.545 | 0.000 |
| 86 | 264.2335 | −0.550 | 0.000 | 126 | 291.1975 | −0.125 | 0.165 |
| 87 | 265.1440 | 0.290 | 0.001 | 127 | 291.2340 | −0.475 | 0.000 |
| 88 | 269.0818 | −0.205 | 0.022 | 128 | 293.2118 | −0.331 | 0.000 |
| 89 | 271.0618 | −0.456 | 0.000 | 129 | 293.2130 | −0.450 | 0.000 |
| 90 | 271.0619 | −0.691 | 0.000 | 130 | 293.2498 | −0.322 | 0.000 |

TABLE A4b-continued

| Component No. | m/z | Correlation r with yield | p | Component No. | m/z | Correlation r with yield | p |
| --- | --- | --- | --- | --- | --- | --- | --- |
| 91 | 271.2280 | −0.516 | 0.000 | 131 | 295.0936 | 0.611 | 0.000 |
| 92 | 273.0769 | −0.380 | 0.000 | 132 | 295.1037 | 0.174 | 0.052 |
| 93 | 274.0541 | 0.140 | 0.121 | 133 | 295.1299 | −0.361 | 0.000 |
| 94 | 274.0928 | −0.353 | 0.000 | 134 | 295.2288 | −0.603 | 0.000 |
| 95 | 274.1606 | 0.395 | 0.000 | 135 | 297.2436 | −0.593 | 0.000 |
| 96 | 275.2020 | −0.629 | 0.000 | 136 | 298.0986 | 0.435 | 0.000 |
| 97 | 275.2023 | −0.458 | 0.000 | 137 | 299.2023 | 0.546 | 0.000 |
| 98 | 277.2184 | −0.556 | 0.000 | 138 | 301.1424 | 0.002 | 0.981 |
| 99 | 277.2186 | −0.583 | 0.000 | 139 | 305.0674 | −0.643 | 0.000 |
| 100 | 277.2186 | −0.517 | 0.000 | 140 | 305.9907 | −0.180 | 0.044 |
| 101 | 279.0512 | −0.365 | 0.000 | 141 | 307.0128 | 0.306 | 0.001 |
| 102 | 279.0515 | 0.326 | 0.000 | 142 | 307.0943 | −0.539 | 0.000 |
| 103 | 279.0951 | −0.424 | 0.000 | 143 | 309.2075 | −0.395 | 0.000 |
| 104 | 279.1610 | −0.235 | 0.008 | 144 | 309.2228 | −0.400 | 0.000 |
| 105 | 279.1611 | −0.047 | 0.601 | 145 | 315.0062 | 0.149 | 0.098 |
| 106 | 279.2320 | −0.144 | 0.109 | 146 | 316.2134 | −0.082 | 0.365 |
| 107 | 279.2333 | −0.605 | 0.000 | 147 | 316.2865 | −0.408 | 0.000 |
| 108 | 279.2340 | −0.603 | 0.000 | 148 | 318.2806 | −0.298 | 0.001 |
| 109 | 279.2343 | −0.476 | 0.000 | 149 | 319.1536 | −0.764 | 0.000 |
| 110 | 281.2485 | −0.593 | 0.000 | 150 | 319.2853 | −0.519 | 0.000 |
| 111 | 282.1376 | 0.160 | 0.075 | 151 | 320.9916 | −0.035 | 0.699 |
| 112 | 282.2236 | 0.405 | 0.000 | 152 | 321.0632 | −0.084 | 0.352 |
| 113 | 282.2800 | −0.051 | 0.576 | 153 | 321.0983 | −0.528 | 0.000 |
| 114 | 284.2960 | −0.065 | 0.474 | 154 | 321.1463 | 0.093 | 0.304 |
| 115 | 285.1255 | 0.119 | 0.187 | 155 | 322.2765 | −0.178 | 0.047 |
| 116 | 285.1713 | 0.480 | 0.000 | 156 | 323.0751 | −0.072 | 0.422 |
| 117 | 285.1718 | 0.179 | 0.046 | 157 | 323.1290 | 0.558 | 0.000 |
| 118 | 285.6271 | 0.021 | 0.816 | 158 | 325.1444 | 0.504 | 0.000 |
| 119 | 287.0566 | −0.441 | 0.000 | 159 | 327.0795 | −0.650 | 0.000 |
| 120 | 287.0567 | −0.409 | 0.000 | 160 | 327.2336 | −0.576 | 0.000 |

TABLE A4c

| Component No. | m/z | Correlation r with yield | p | Component No. | m/z | Correlation r with yield | p |
| --- | --- | --- | --- | --- | --- | --- | --- |
| 161 | 327.2340 | −0.565 | 0.000 | 201 | 363.2553 | −0.061 | 0.501 |
| 162 | 329.1613 | −0.279 | 0.002 | 202 | 363.3128 | −0.569 | 0.000 |
| 163 | 331.1409 | −0.132 | 0.141 | 203 | 364.3237 | −0.311 | 0.000 |
| 164 | 333.1528 | −0.493 | 0.000 | 204 | 365.3202 | −0.405 | 0.000 |
| 165 | 335.1237 | 0.493 | 0.000 | 205 | 366.1783 | −0.268 | 0.002 |
| 166 | 335.1542 | −0.480 | 0.000 | 206 | 366.3393 | −0.231 | 0.010 |
| 167 | 335.2595 | −0.150 | 0.094 | 207 | 367.0343 | 0.249 | 0.005 |
| 168 | 335.2595 | 0.109 | 0.227 | 208 | 367.2635 | −0.593 | 0.000 |
| 169 | 335.2600 | 0.028 | 0.757 | 209 | 367.2652 | −0.599 | 0.000 |
| 170 | 336.3128 | −0.411 | 0.000 | 210 | 369.0831 | −0.362 | 0.000 |
| 171 | 337.0938 | −0.531 | 0.000 | 211 | 369.1268 | 0.242 | 0.006 |
| 172 | 337.1724 | 0.455 | 0.000 | 212 | 371.1876 | −0.337 | 0.000 |
| 173 | 338.3440 | 0.181 | 0.043 | 213 | 371.1881 | −0.080 | 0.374 |
| 174 | 339.0715 | −0.540 | 0.000 | 214 | 371.2075 | 0.700 | 0.000 |
| 175 | 339.0734 | −0.085 | 0.344 | 215 | 372.1673 | −0.552 | 0.000 |
| 176 | 341.1385 | 0.566 | 0.000 | 216 | 373.0778 | 0.306 | 0.001 |
| 177 | 341.1451 | 0.102 | 0.257 | 217 | 373.1291 | −0.558 | 0.000 |
| 178 | 341.2680 | −0.181 | 0.043 | 218 | 374.1088 | −0.568 | 0.000 |
| 179 | 342.2139 | 0.622 | 0.000 | 219 | 374.1459 | −0.270 | 0.002 |
| 180 | 342.3390 | −0.235 | 0.008 | 220 | 375.2710 | −0.479 | 0.000 |
| 181 | 343.1022 | −0.581 | 0.000 | 221 | 379.0634 | −0.490 | 0.000 |
| 182 | 343.1042 | −0.579 | 0.000 | 222 | 380.3389 | −0.492 | 0.000 |
| 183 | 343.2288 | −0.170 | 0.058 | 223 | 382.2026 | 0.502 | 0.000 |
| 184 | 343.2292 | −0.058 | 0.519 | 224 | 383.0771 | −0.394 | 0.000 |
| 185 | 344.1358 | −0.499 | 0.000 | 225 | 383.2574 | −0.170 | 0.058 |
| 186 | 346.1516 | −0.046 | 0.612 | 226 | 383.2591 | 0.021 | 0.820 |
| 187 | 349.0912 | −0.170 | 0.058 | 227 | 385.2945 | −0.052 | 0.566 |
| 188 | 349.1485 | −0.563 | 0.000 | 228 | 387.0938 | −0.637 | 0.000 |
| 189 | 349.2761 | −0.321 | 0.000 | 229 | 387.1832 | 0.075 | 0.408 |
| 190 | 351.2558 | −0.400 | 0.000 | 230 | 387.2032 | 0.672 | 0.000 |
| 191 | 352.2528 | −0.002 | 0.984 | 231 | 388.1627 | −0.002 | 0.987 |
| 192 | 353.2713 | −0.450 | 0.000 | 232 | 390.1035 | −0.438 | 0.000 |
| 193 | 355.0832 | 0.303 | 0.001 | 233 | 390.1892 | 0.488 | 0.000 |
| 194 | 355.1027 | 0.414 | 0.000 | 234 | 391.2862 | −0.096 | 0.286 |
| 195 | 357.1584 | 0.414 | 0.000 | 235 | 393.2811 | −0.707 | 0.000 |
| 196 | 357.1705 | −0.335 | 0.000 | 236 | 393.7143 | 0.362 | 0.000 |
| 197 | 358.1656 | −0.471 | 0.000 | 237 | 394.2089 | −0.006 | 0.950 |

TABLE A4c-continued

| Component No. | m/z | Correlation r with yield | p | Component No. | m/z | Correlation r with yield | p |
|---|---|---|---|---|---|---|---|
| 198 | 358.9809 | 0.170 | 0.058 | 238 | 398.2341 | −0.310 | 0.000 |
| 199 | 361.2551 | −0.110 | 0.223 | 239 | 399.1645 | −0.132 | 0.143 |
| 200 | 362.0177 | 0.044 | 0.627 | 240 | 399.2520 | −0.482 | 0.000 |

TABLE A4d

| Component No. | m/z | Correlation r with yield | p | Component No. | m/z | Correlation r with yield | p |
|---|---|---|---|---|---|---|---|
| 241 | 401.0882 | −0.353 | 0.000 | 281 | 435.1300 | −0.413 | 0.000 |
| 242 | 401.0907 | 0.201 | 0.024 | 282 | 435.1304 | −0.614 | 0.000 |
| 243 | 401.0909 | 0.476 | 0.000 | 283 | 436.1466 | −0.587 | 0.000 |
| 244 | 401.2869 | 0.587 | 0.000 | 284 | 439.1991 | 0.710 | 0.000 |
| 245 | 401.7112 | 0.513 | 0.000 | 285 | 439.3603 | −0.498 | 0.000 |
| 246 | 403.2351 | −0.513 | 0.000 | 286 | 440.2333 | 0.304 | 0.001 |
| 247 | 404.1215 | −0.669 | 0.000 | 287 | 440.2513 | 0.054 | 0.552 |
| 248 | 404.2102 | 0.066 | 0.465 | 288 | 441.3741 | −0.644 | 0.000 |
| 249 | 405.1316 | 0.728 | 0.000 | 289 | 441.3746 | −0.311 | 0.000 |
| 250 | 405.3534 | −0.378 | 0.000 | 290 | 442.2570 | −0.005 | 0.958 |
| 251 | 405.3538 | −0.560 | 0.000 | 291 | 443.1002 | 0.078 | 0.387 |
| 252 | 406.1362 | −0.662 | 0.000 | 292 | 443.1020 | 0.002 | 0.982 |
| 253 | 406.2078 | −0.635 | 0.000 | 293 | 445.2077 | 0.120 | 0.184 |
| 254 | 407.3688 | −0.389 | 0.000 | 294 | 448.1949 | 0.568 | 0.000 |
| 255 | 407.3692 | −0.050 | 0.580 | 295 | 449.1093 | −0.393 | 0.000 |
| 256 | 409.0757 | −0.374 | 0.000 | 296 | 449.1101 | −0.538 | 0.000 |
| 257 | 409.2738 | −0.182 | 0.042 | 297 | 454.2944 | −0.305 | 0.001 |
| 258 | 409.2749 | −0.143 | 0.112 | 298 | 455.1197 | −0.684 | 0.000 |
| 259 | 410.7059 | 0.368 | 0.000 | 299 | 457.2091 | 0.592 | 0.000 |
| 260 | 411.0022 | −0.010 | 0.909 | 300 | 457.2096 | 0.415 | 0.000 |
| 261 | 411.1627 | −0.546 | 0.000 | 301 | 461.1784 | 0.094 | 0.299 |
| 262 | 412.3808 | 0.287 | 0.001 | 302 | 466.2667 | −0.439 | 0.000 |
| 263 | 419.1201 | −0.489 | 0.000 | 303 | 468.2829 | 0.311 | 0.000 |
| 264 | 420.2238 | −0.581 | 0.000 | 304 | 468.3930 | −0.135 | 0.133 |
| 265 | 423.2245 | 0.204 | 0.022 | 305 | 469.1831 | 0.740 | 0.000 |
| 266 | 423.2762 | −0.375 | 0.000 | 306 | 471.2180 | 0.473 | 0.000 |
| 267 | 423.3643 | −0.380 | 0.000 | 307 | 471.2243 | −0.394 | 0.000 |
| 268 | 423.3644 | −0.654 | 0.000 | 308 | 473.1087 | −0.777 | 0.000 |
| 269 | 424.3649 | −0.371 | 0.000 | 309 | 473.2048 | 0.489 | 0.000 |
| 270 | 424.3681 | −0.362 | 0.000 | 310 | 474.1748 | −0.628 | 0.000 |
| 271 | 425.1943 | 0.113 | 0.211 | 311 | 477.1435 | 0.162 | 0.071 |
| 272 | 427.1044 | 0.147 | 0.101 | 312 | 478.1385 | −0.139 | 0.122 |
| 273 | 431.1017 | 0.139 | 0.122 | 313 | 479.1907 | 0.686 | 0.000 |
| 274 | 432.2476 | 0.288 | 0.001 | 314 | 482.3270 | −0.357 | 0.000 |
| 275 | 432.2597 | 0.663 | 0.000 | 315 | 483.0931 | −0.248 | 0.005 |
| 276 | 433.1140 | −0.354 | 0.000 | 316 | 484.2764 | 0.265 | 0.003 |
| 277 | 433.1149 | −0.380 | 0.000 | 317 | 489.0813 | −0.725 | 0.000 |
| 278 | 433.1355 | −0.647 | 0.000 | 318 | 489.2158 | 0.180 | 0.045 |
| 279 | 434.1386 | −0.571 | 0.000 | 319 | 489.3604 | 0.195 | 0.029 |
| 280 | 434.2406 | −0.588 | 0.000 | 320 | 492.2465 | 0.343 | 0.000 |

TABLE A4e

| Component No. | m/z | Correlation r with yield | p | Component No. | m/z | Correlation r with yield | p |
|---|---|---|---|---|---|---|---|
| 321 | 495.2516 | −0.063 | 0.483 | 361 | 567.4059 | −0.192 | 0.032 |
| 322 | 495.2983 | 0.394 | 0.000 | 362 | 568.4282 | 0.009 | 0.918 |
| 323 | 496.3441 | −0.187 | 0.037 | 363 | 577.3607 | 0.665 | 0.000 |
| 324 | 497.3151 | 0.054 | 0.553 | 364 | 589.4859 | −0.274 | 0.002 |
| 325 | 499.2284 | −0.588 | 0.000 | 365 | 593.2836 | −0.505 | 0.000 |
| 326 | 501.7425 | 0.311 | 0.000 | 366 | 595.1687 | −0.449 | 0.000 |
| 327 | 503.1948 | 0.521 | 0.000 | 367 | 595.3716 | 0.602 | 0.000 |
| 328 | 503.2243 | −0.464 | 0.000 | 368 | 599.3987 | −0.290 | 0.001 |
| 329 | 511.1280 | 0.643 | 0.000 | 369 | 599.3990 | −0.592 | 0.000 |
| 330 | 511.3803 | −0.520 | 0.000 | 370 | 599.4149 | 0.626 | 0.000 |
| 331 | 511.7557 | −0.441 | 0.000 | 371 | 607.2588 | −0.463 | 0.000 |
| 332 | 512.2363 | −0.485 | 0.000 | 372 | 607.2968 | −0.318 | 0.000 |
| 333 | 512.2555 | −0.013 | 0.887 | 373 | 608.3000 | −0.209 | 0.019 |
| 334 | 513.2753 | −0.023 | 0.801 | 374 | 609.4550 | 0.042 | 0.641 |
| 335 | 514.0452 | 0.179 | 0.045 | 375 | 611.1640 | −0.105 | 0.245 |
| 336 | 514.7519 | 0.289 | 0.001 | 376 | 611.4690 | 0.146 | 0.104 |
| 337 | 517.1378 | −0.050 | 0.577 | 377 | 611.4711 | −0.187 | 0.037 |
| 338 | 517.3932 | 0.269 | 0.002 | 378 | 612.4753 | 0.105 | 0.245 |
| 339 | 519.1171 | 0.143 | 0.111 | 379 | 613.4849 | 0.178 | 0.047 |
| 340 | 519.2090 | −0.271 | 0.002 | 380 | 613.4871 | 0.001 | 0.994 |
| 341 | 519.7403 | −0.539 | 0.000 | 381 | 614.4900 | −0.094 | 0.295 |
| 342 | 520.1200 | 0.239 | 0.007 | 382 | 617.4082 | −0.091 | 0.315 |
| 343 | 520.3438 | −0.088 | 0.328 | 383 | 617.4263 | 0.504 | 0.000 |
| 344 | 521.2610 | 0.069 | 0.444 | 384 | 618.0719 | 0.561 | 0.000 |
| 345 | 523.1272 | 0.509 | 0.000 | 385 | 621.2735 | 0.452 | 0.000 |
| 346 | 524.3749 | −0.220 | 0.014 | 386 | 623.3030 | 0.113 | 0.211 |
| 347 | 525.3656 | 0.690 | 0.000 | 387 | 627.4672 | 0.235 | 0.008 |
| 348 | 529.3922 | 0.235 | 0.008 | 388 | 636.4255 | 0.487 | 0.000 |
| 349 | 529.3922 | 0.142 | 0.113 | 389 | 638.4423 | 0.604 | 0.000 |
| 350 | 535.2828 | −0.305 | 0.001 | 390 | 660.4261 | 0.502 | 0.000 |
| 351 | 541.3908 | 0.199 | 0.026 | 391 | 666.3033 | −0.297 | 0.001 |
| 352 | 545.3872 | 0.483 | 0.000 | 392 | 673.3398 | 0.361 | 0.000 |
| 353 | 547.1474 | 0.533 | 0.000 | 393 | 686.4532 | 0.131 | 0.146 |
| 354 | 549.3956 | −0.194 | 0.030 | 394 | 691.4073 | 0.232 | 0.009 |
| 355 | 550.2466 | −0.569 | 0.000 | 395 | 741.2290 | −0.653 | 0.000 |
| 356 | 551.2617 | −0.556 | 0.000 | 396 | 742.4794 | 0.474 | 0.000 |
| 357 | 551.4265 | 0.256 | 0.004 | 397 | 743.4423 | −0.163 | 0.070 |
| 358 | 562.7721 | −0.436 | 0.000 | 398 | 747.4319 | 0.488 | 0.000 |
| 359 | 563.3983 | 0.478 | 0.000 | 399 | 748.4819 | 0.433 | 0.000 |
| 360 | 566.1687 | 0.373 | 0.000 | 400 | 758.2248 | −0.044 | 0.628 |

TABLE A4f

| Component No. | m/z | Correlation r with yield | p |
|---|---|---|---|
| 401 | 759.2281 | −0.048 | 0.594 |
| 402 | 771.5090 | 0.045 | 0.619 |
| 403 | 773.2175 | −0.387 | 0.000 |
| 404 | 773.5266 | −0.189 | 0.035 |
| 405 | 773.5271 | 0.169 | 0.059 |
| 406 | 786.4227 | 0.265 | 0.003 |
| 407 | 796.5558 | 0.152 | 0.091 |
| 408 | 806.5469 | 0.294 | 0.001 |
| 409 | 808.5582 | 0.187 | 0.037 |
| 410 | 811.5014 | 0.200 | 0.025 |
| 411 | 813.5185 | 0.149 | 0.098 |
| 412 | 820.4071 | 0.315 | 0.000 |
| 413 | 824.5537 | 0.078 | 0.390 |
| 414 | 824.5603 | 0.155 | 0.084 |
| 415 | 829.5145 | 0.111 | 0.218 |
| 416 | 840.5490 | 0.041 | 0.651 |
| 417 | 842.5683 | 0.160 | 0.074 |
| 418 | 847.5255 | 0.202 | 0.024 |
| 419 | 923.5063 | −0.014 | 0.877 |
| 420 | 923.5066 | −0.466 | 0.000 |
| 421 | 943.5349 | −0.723 | 0.000 |
| 422 | 945.5359 | −0.711 | 0.000 |
| 423 | 969.5500 | −0.596 | 0.000 |
| 424 | 970.6150 | −0.207 | 0.021 |
| 425 | 973.5566 | −0.141 | 0.118 |
| 426 | 975.5749 | −0.112 | 0.215 |
| 427 | 986.6112 | −0.249 | 0.005 |
| 428 | 1013.5361 | −0.663 | 0.000 |

TABLE A4f-continued

| Component No. | m/z | Correlation r with yield | p |
|---|---|---|---|
| 429 | 1069.5653 | −0.482 | 0.000 |
| 430 | 1073.5610 | −0.369 | 0.000 |
| 431 | 1155.5683 | −0.546 | 0.000 |

Results obtained by the correlation analysis show that a component having a certain correlation coefficient has a significant correlation with a yield. It was found that there were 118 components having an absolute value of a correlation coefficient, |r|>0.51 and 28 components having |r|>0.66.

A8. Construction/evaluation of model

For construction of a yield prediction model using analytical data of 2 or more components, a multivariate analysis method was used, and SIMCA ver.14 (Umetrics) was used as an analysis tool. For a prediction model, regression analysis was made using, as explanatory variable, a peak area value of corrected analytical data of a component having each accurate mass; and as an objective variable, a yield value. The regression analysis was made by an OPLS method, which is an improved version of PLS method.

A method for evaluating a prediction model is to make a determination mainly by use of two indexes. One is $R^2$ representing prediction accuracy, the other is $Q^2$ representing the predictability. $R^2$ is the square of a correlation coefficient between actual measured values of data used for the prediction model construction and predicted values calculated by the model; and $R^2$ closer to 1 indicates a higher prediction accuracy. Meanwhile, $Q^2$ is a result of the cross validation, and it expresses a square of a correlation coefficient between the actual measured values and the predicted values as a result of repeatedly-conducted model validation. From the viewpoint of prediction, if a model has $Q^2>0.50$, the model has a preferable predictability (Triba, M. N. et al., Mol. BioSyst. 2015, 11, 13-19). Thus, $Q^2>0.50$ was used as a criterion for model evaluation. Note that since $R^2$ is always larger than $Q^2$, $Q^2>0.50$ simultaneously satisfies $R^2>0.50$.

A8-1. Construction/evaluation of model using data of all of the 431 components

An OPLS model for predicting a yield was constructed from all of 125 data matrices each having peak area values of analytical data of 431 components per one data item and a yield value. At the time of the construction, a peak area value of analytical data of each component and yield data were converted by auto scaling to have an average of 0 and a variance of 1. As a result of the model construction, it had prediction accuracy of $R^2=0.87$ and predictability of $Q^2=0.78$. Results are shown in FIG. 1A. This prediction model shows that use of a component composition contained in a leaf after about 1 month of cultivation allows construction of a model having a high prediction performance, enabling an earlier yield prediction.

A8-2. Calculation of VIP values

In the model constructed in 8-1, a degree of contribution to model performance, which is given to each component and is called as a VIP (Variable Importance in the Projection) value, is given. The higher the VIP value, the greater the contribution to the model, and the VIP value also correlates with an absolute value of correlation coefficient. Lists of VIP values are shown in Tables A5a to A5f TABLE A5a

| Component No. | m/z | VIP value | VIP value rank | Component No. | m/z | VIP value | VIP value rank |
|---|---|---|---|---|---|---|---|
| 149 | 319.1536 | 1.90 | 1 | 52 | 225.1500 | 1.56 | 41 |
| 308 | 473.1087 | 1.89 | 2 | 208 | 367.2635 | 1.54 | 42 |
| 235 | 393.2811 | 1.83 | 3 | 370 | 599.4149 | 1.54 | 43 |
| 41 | 209.1545 | 1.80 | 4 | 35 | 205.0983 | 1.53 | 44 |
| 421 | 943.5349 | 1.78 | 5 | 159 | 327.0795 | 1.53 | 45 |
| 317 | 489.0813 | 1.77 | 6 | 329 | 511.1280 | 1.52 | 46 |
| 305 | 469.1831 | 1.77 | 7 | 423 | 969.5500 | 1.52 | 47 |
| 14 | 177.0551 | 1.75 | 8 | 134 | 295.2288 | 1.52 | 48 |
| 422 | 945.5359 | 1.75 | 9 | 28 | 195.0655 | 1.51 | 49 |
| 68 | 243.0667 | 1.73 | 10 | 282 | 435.1304 | 1.51 | 50 |
| 249 | 405.1316 | 1.72 | 11 | 107 | 279.2333 | 1.51 | 51 |
| 51 | 221.6020 | 1.70 | 12 | 54 | 226.0991 | 1.50 | 52 |
| 90 | 271.0619 | 1.70 | 13 | 280 | 434.2406 | 1.49 | 53 |
| 23 | 191.1439 | 1.69 | 14 | 71 | 245.2281 | 1.49 | 54 |
| 214 | 371.2075 | 1.69 | 15 | 108 | 279.2340 | 1.49 | 55 |
| 284 | 439.1991 | 1.69 | 16 | 264 | 420.2238 | 1.49 | 56 |
| 122 | 189.0727 | 1.69 | 17 | 279 | 434.1386 | 1.49 | 57 |
| 36 | 207.0650 | 1.67 | 18 | 135 | 297.2436 | 1.49 | 58 |
| 313 | 479.1907 | 1.67 | 19 | 85 | 263.2381 | 1.49 | 59 |
| 347 | 525.3656 | 1.66 | 20 | 209 | 367.2652 | 1.48 | 60 |
| 298 | 455.1197 | 1.65 | 21 | 283 | 436.1466 | 1.47 | 61 |
| 22 | 191.1437 | 1.65 | 22 | 99 | 277.2186 | 1.47 | 62 |
| 268 | 423.3644 | 1.64 | 23 | 355 | 550.2466 | 1.46 | 63 |
| 247 | 404.1215 | 1.64 | 24 | 217 | 373.1291 | 1.46 | 64 |
| 278 | 433.1355 | 1.63 | 25 | 179 | 342.2139 | 1.45 | 65 |
| 428 | 1013.5361 | 1.62 | 26 | 160 | 327.2336 | 1.45 | 66 |
| 252 | 406.1362 | 1.62 | 27 | 369 | 599.3990 | 1.44 | 67 |
| 58 | 227.1294 | 1.61 | 28 | 110 | 281.2485 | 1.44 | 68 |
| 230 | 387.2032 | 1.60 | 29 | 161 | 327.2340 | 1.44 | 69 |
| 37 | 207.1390 | 1.59 | 30 | 98 | 277.2184 | 1.43 | 70 |
| 96 | 275.2020 | 1.59 | 31 | 244 | 401.2869 | 1.43 | 71 |
| 288 | 441.3741 | 1.59 | 32 | 131 | 295.0936 | 1.43 | 72 |
| 139 | 305.0674 | 1.59 | 33 | 299 | 457.2091 | 1.42 | 73 |
| 363 | 577.3607 | 1.59 | 34 | 188 | 349.1485 | 1.41 | 74 |
| 275 | 432.2597 | 1.59 | 35 | 389 | 638.4423 | 1.41 | 75 |
| 395 | 741.2290 | 1.58 | 36 | 27 | 227.1286 | 1.41 | 76 |
| 42 | 209.1548 | 1.58 | 37 | 356 | 551.2617 | 1.41 | 77 |
| 253 | 406.2078 | 1.57 | 38 | 367 | 595.3716 | 1.41 | 78 |
| 310 | 474.1748 | 1.57 | 39 | 215 | 372.1673 | 1.40 | 79 |
| 228 | 387.0938 | 1.57 | 40 | 251 | 405.3538 | 1.40 | 80 |

TABLE A5b

| Component No. | m/z | VIP value | VIP value rank | Component No. | m/z | VIP value | VIP value rank |
|---|---|---|---|---|---|---|---|
| 181 | 343.1022 | 1.39 | 81 | 390 | 660.4261 | 1.24 | 121 |
| 325 | 499.2284 | 1.39 | 82 | 353 | 547.1474 | 1.24 | 122 |
| 80 | 257.1908 | 1.39 | 83 | 383 | 617.4263 | 1.24 | 123 |
| 218 | 374.1088 | 1.39 | 84 | 294 | 448.1949 | 1.24 | 124 |
| 202 | 363.3128 | 1.38 | 85 | 157 | 323.1290 | 1.23 | 125 |
| 17 | 181.1237 | 1.38 | 86 | 233 | 390.1892 | 1.23 | 126 |
| 182 | 343.1042 | 1.37 | 87 | 13 | 175.1486 | 1.22 | 127 |
| 384 | 618.0719 | 1.34 | 88 | 127 | 291.2340 | 1.22 | 128 |
| 44 | 213.1503 | 1.34 | 89 | 388 | 636.4255 | 1.22 | 129 |
| 296 | 449.1101 | 1.34 | 90 | 398 | 747.4319 | 1.22 | 130 |
| 137 | 299.2023 | 1.34 | 91 | 221 | 379.0634 | 1.22 | 131 |
| 174 | 339.0715 | 1.34 | 92 | 352 | 545.3872 | 1.21 | 132 |
| 431 | 1155.5683 | 1.33 | 93 | 345 | 523.1272 | 1.21 | 133 |
| 125 | 291.1973 | 1.33 | 94 | 116 | 285.1713 | 1.20 | 134 |
| 48 | 219.1950 | 1.33 | 95 | 359 | 563.3983 | 1.20 | 135 |
| 176 | 341.1385 | 1.32 | 96 | 222 | 380.3389 | 1.20 | 136 |
| 171 | 337.0938 | 1.32 | 97 | 97 | 275.2023 | 1.20 | 137 |
| 100 | 277.2186 | 1.32 | 98 | 306 | 471.2180 | 1.20 | 138 |
| 21 | 190.0506 | 1.32 | 99 | 197 | 358.1656 | 1.19 | 139 |
| 261 | 411.1627 | 1.32 | 100 | 309 | 473.2048 | 1.19 | 140 |
| 330 | 511.3803 | 1.31 | 101 | 396 | 742.4794 | 1.19 | 141 |
| 246 | 403.2351 | 1.31 | 102 | 164 | 333.1528 | 1.18 | 142 |
| 39 | 209.1178 | 1.30 | 103 | 129 | 293.2130 | 1.18 | 143 |
| 86 | 264.2335 | 1.30 | 104 | 192 | 353.2713 | 1.18 | 144 |
| 73 | 252.0874 | 1.30 | 105 | 332 | 512.2363 | 1.17 | 145 |
| 185 | 344.1358 | 1.29 | 106 | 91 | 271.2280 | 1.17 | 146 |

TABLE A5b-continued

| Component No. | m/z | VIP value | VIP value rank | Component No. | m/z | VIP value | VIP value rank |
|---|---|---|---|---|---|---|---|
| 47 | 219.1754 | 1.29 | 107 | 166 | 335.1542 | 1.16 | 147 |
| 341 | 519.7403 | 1.29 | 108 | 40 | 209.1538 | 1.16 | 148 |
| 20 | 189.1278 | 1.29 | 109 | 327 | 503.1948 | 1.16 | 149 |
| 150 | 319.2853 | 1.28 | 110 | 7 | 161.0606 | 1.15 | 150 |
| 220 | 375.2710 | 1.28 | 111 | 429 | 1069.5653 | 1.15 | 151 |
| 142 | 307.0943 | 1.28 | 112 | 358 | 562.7721 | 1.14 | 152 |
| 153 | 321.0983 | 1.27 | 113 | 109 | 279.2343 | 1.14 | 153 |
| 240 | 399.2520 | 1.27 | 114 | 243 | 401.0909 | 1.13 | 154 |
| 82 | 259.2076 | 1.27 | 115 | 371 | 607.2588 | 1.13 | 155 |
| 223 | 382.2026 | 1.26 | 116 | 420 | 923.5066 | 1.13 | 156 |
| 263 | 419.1201 | 1.25 | 117 | 29 | 196.1127 | 1.13 | 157 |
| 245 | 401.7112 | 1.25 | 118 | 165 | 335.1237 | 1.12 | 158 |
| 365 | 593.2836 | 1.25 | 119 | 84 | 261.2233 | 1.12 | 159 |
| 285 | 439.3603 | 1.25 | 120 | 15 | 179.0717 | 1.12 | 160 |

TABLE A5c

| Component No. | m/z | VIP value | VIP value rank | Component No. | m/z | VIP value | VIP value rank |
|---|---|---|---|---|---|---|---|
| 75 | 253.2170 | 1.11 | 161 | 266 | 423.2762 | 0.92 | 201 |
| 328 | 503.2243 | 1.11 | 162 | 259 | 410.7059 | 0.92 | 202 |
| 195 | 357.1584 | 1.11 | 163 | 92 | 273.0769 | 0.91 | 203 |
| 89 | 271.0618 | 1.11 | 164 | 267 | 423.3643 | 0.91 | 204 |
| 366 | 595.1687 | 1.10 | 165 | 204 | 365.3202 | 0.91 | 205 |
| 302 | 466.2667 | 1.10 | 166 | 124 | 291.0401 | 0.91 | 206 |
| 190 | 351.2558 | 1.10 | 167 | 277 | 433.1149 | 0.91 | 207 |
| 26 | 193.1597 | 1.09 | 168 | 101 | 279.0512 | 0.91 | 208 |
| 119 | 287.0566 | 1.09 | 169 | 236 | 393.7143 | 0.90 | 209 |
| 399 | 748.4819 | 1.08 | 170 | 250 | 405.3534 | 0.90 | 210 |
| 136 | 298.0986 | 1.08 | 171 | 133 | 295.1299 | 0.88 | 211 |
| 158 | 325.1444 | 1.08 | 172 | 241 | 401.0882 | 0.88 | 212 |
| 331 | 511.7557 | 1.07 | 173 | 360 | 566.1687 | 0.87 | 213 |
| 385 | 621.2735 | 1.07 | 174 | 320 | 492.2465 | 0.87 | 214 |
| 144 | 309.2228 | 1.07 | 175 | 94 | 274.0928 | 0.87 | 215 |
| 172 | 337.1724 | 1.06 | 176 | 238 | 398.2341 | 0.86 | 216 |
| 300 | 457.2096 | 1.06 | 177 | 70 | 243.2114 | 0.86 | 217 |
| 232 | 390.1035 | 1.05 | 178 | 141 | 307.0128 | 0.85 | 218 |
| 322 | 495.2983 | 1.05 | 179 | 34 | 205.0872 | 0.85 | 219 |
| 112 | 282.2236 | 1.04 | 180 | 392 | 673.3398 | 0.85 | 220 |
| 120 | 287.0567 | 1.04 | 181 | 269 | 424.3649 | 0.85 | 221 |
| 103 | 279.0951 | 1.04 | 182 | 372 | 607.2968 | 0.85 | 222 |
| 147 | 316.2865 | 1.03 | 183 | 55 | 226.1610 | 0.85 | 223 |
| 295 | 449.1093 | 1.01 | 184 | 79 | 257.0660 | 0.85 | 224 |
| 95 | 274.1606 | 1.01 | 185 | 189 | 349.2761 | 0.84 | 225 |
| 4 | 147.0446 | 1.01 | 186 | 76 | 255.0669 | 0.82 | 226 |
| 281 | 435.1300 | 1.01 | 187 | 276 | 433.1140 | 0.82 | 227 |
| 143 | 309.2075 | 0.98 | 188 | 326 | 501.7425 | 0.82 | 228 |
| 10 | 165.0550 | 0.98 | 189 | 196 | 357.1705 | 0.82 | 229 |
| 270 | 424.3681 | 0.97 | 190 | 74 | 252.0882 | 0.81 | 230 |
| 224 | 383.0771 | 0.97 | 191 | 32 | 199.1818 | 0.81 | 231 |
| 403 | 773.2175 | 0.97 | 192 | 303 | 468.2829 | 0.81 | 232 |
| 256 | 409.0757 | 0.96 | 193 | 212 | 371.1876 | 0.81 | 233 |
| 170 | 336.3128 | 0.96 | 194 | 412 | 820.4071 | 0.80 | 234 |
| 307 | 471.2243 | 0.95 | 195 | 50 | 221.0456 | 0.78 | 235 |
| 194 | 355.1027 | 0.95 | 196 | 148 | 318.2806 | 0.78 | 236 |
| 430 | 1073.5610 | 0.94 | 197 | 102 | 279.0515 | 0.78 | 237 |
| 210 | 369.0831 | 0.93 | 198 | 43 | 211.0608 | 0.77 | 238 |
| 16 | 181.1232 | 0.92 | 199 | 27 | 194.1182 | 0.76 | 239 |
| 254 | 407.3688 | 0.92 | 200 | 340 | 519.2090 | 0.76 | 240 |

TABLE A5d

| Component No. | m/z | VIP value | VIP value rank | Component No. | m/z | VIP value | VIP value rank |
|---|---|---|---|---|---|---|---|
| 130 | 293.2498 | 0.76 | 241 | 46 | 217.1961 | 0.55 | 281 |
| 286 | 440.2333 | 0.75 | 242 | 265 | 423.2245 | 0.55 | 282 |
| 128 | 293.2118 | 0.75 | 243 | 424 | 970.6150 | 0.55 | 283 |
| 314 | 482.3270 | 0.75 | 244 | 394 | 691.4073 | 0.55 | 284 |
| 427 | 986.6112 | 0.74 | 245 | 53 | 225.1972 | 0.54 | 285 |
| 364 | 589.4859 | 0.74 | 246 | 18 | 183.1865 | 0.54 | 286 |
| 408 | 806.5469 | 0.74 | 247 | 25 | 193.0861 | 0.53 | 287 |
| 289 | 441.3746 | 0.74 | 248 | 180 | 342.3390 | 0.53 | 288 |
| 391 | 666.3033 | 0.74 | 249 | 140 | 305.9907 | 0.53 | 289 |
| 65 | 239.0562 | 0.73 | 250 | 132 | 295.1037 | 0.53 | 290 |
| 162 | 329.1613 | 0.73 | 251 | 354 | 549.3956 | 0.52 | 291 |
| 316 | 484.2764 | 0.73 | 252 | 206 | 366.3393 | 0.52 | 292 |
| 30 | 197.1181 | 0.73 | 253 | 318 | 489.2158 | 0.52 | 293 |
| 193 | 355.0832 | 0.72 | 254 | 64 | 235.1702 | 0.52 | 294 |
| 274 | 432.2476 | 0.72 | 255 | 117 | 285.1718 | 0.51 | 295 |
| 216 | 373.0778 | 0.71 | 256 | 104 | 279.1610 | 0.51 | 296 |
| 203 | 364.3237 | 0.71 | 257 | 418 | 847.5255 | 0.50 | 297 |
| 66 | 241.1446 | 0.70 | 258 | 88 | 269.0818 | 0.50 | 298 |
| 350 | 535.2828 | 0.70 | 259 | 61 | 231.0512 | 0.50 | 299 |
| 59 | 228.1954 | 0.70 | 260 | 404 | 773.5266 | 0.50 | 300 |
| 336 | 514.7519 | 0.70 | 261 | 377 | 611.4711 | 0.49 | 301 |
| 207 | 367.0343 | 0.69 | 262 | 311 | 477.1435 | 0.49 | 302 |
| 368 | 599.3987 | 0.69 | 263 | 8 | 163.0398 | 0.49 | 303 |
| 87 | 265.1440 | 0.68 | 264 | 410 | 811.5014 | 0.49 | 304 |
| 219 | 374.1459 | 0.68 | 265 | 361 | 567.4059 | 0.48 | 305 |
| 406 | 786.4227 | 0.67 | 266 | 351 | 541.3908 | 0.47 | 306 |
| 357 | 551.4265 | 0.66 | 267 | 72 | 249.0621 | 0.47 | 307 |
| 338 | 517.3932 | 0.65 | 268 | 409 | 808.5582 | 0.47 | 308 |
| 6 | 149.0241 | 0.64 | 269 | 242 | 401.0907 | 0.47 | 309 |
| 297 | 454.2944 | 0.63 | 270 | 69 | 243.1608 | 0.47 | 310 |
| 205 | 366.1783 | 0.60 | 271 | 257 | 409.2738 | 0.46 | 311 |
| 387 | 627.4672 | 0.59 | 272 | 319 | 489.3604 | 0.46 | 312 |
| 348 | 529.3922 | 0.58 | 273 | 145 | 315.0062 | 0.46 | 313 |
| 262 | 412.3808 | 0.58 | 274 | 12 | 171.1501 | 0.45 | 314 |
| 56 | 226.1812 | 0.58 | 275 | 346 | 524.3749 | 0.45 | 315 |
| 373 | 608.3000 | 0.57 | 276 | 379 | 613.4849 | 0.44 | 316 |
| 315 | 483.0931 | 0.56 | 277 | 198 | 358.9809 | 0.44 | 317 |
| 81 | 259.0827 | 0.56 | 278 | 225 | 383.2574 | 0.44 | 318 |
| 24 | 193.0859 | 0.56 | 279 | 111 | 282.1376 | 0.44 | 319 |
| 342 | 520.1200 | 0.56 | 280 | 405 | 773.5271 | 0.43 | 320 |

TABLE A5e

| Component No. | m/z | VIP value | VIP value rank | Component No. | m/z | VIP value | VIP value rank |
|---|---|---|---|---|---|---|---|
| 273 | 431.1017 | 0.43 | 321 | 386 | 623.3030 | 0.29 | 361 |
| 115 | 285.1255 | 0.43 | 322 | 199 | 361.2551 | 0.29 | 362 |
| 167 | 335.2595 | 0.42 | 323 | 163 | 331.1409 | 0.28 | 363 |
| 173 | 338.3440 | 0.42 | 324 | 378 | 612.4753 | 0.28 | 364 |
| 187 | 349.0912 | 0.42 | 325 | 126 | 291.1975 | 0.27 | 365 |
| 411 | 813.5185 | 0.42 | 326 | 304 | 468.3930 | 0.26 | 366 |
| 2 | 141.9592 | 0.42 | 327 | 239 | 399.1645 | 0.25 | 367 |
| 397 | 743.4423 | 0.42 | 328 | 229 | 387.1832 | 0.25 | 368 |
| 5 | 149.0234 | 0.41 | 329 | 213 | 371.1881 | 0.24 | 369 |
| 155 | 322.2765 | 0.41 | 330 | 33 | 200.2382 | 0.24 | 370 |
| 407 | 796.5558 | 0.41 | 331 | 287 | 440.2513 | 0.23 | 371 |
| 211 | 369.1268 | 0.40 | 332 | 248 | 404.2102 | 0.22 | 372 |
| 417 | 842.5683 | 0.40 | 333 | 154 | 321.1463 | 0.21 | 373 |
| 335 | 514.0452 | 0.40 | 334 | 324 | 497.3151 | 0.21 | 374 |
| 183 | 343.2288 | 0.39 | 335 | 156 | 323.0751 | 0.21 | 375 |
| 414 | 824.5603 | 0.39 | 336 | 291 | 443.1002 | 0.20 | 376 |
| 106 | 279.2320 | 0.39 | 337 | 200 | 362.0177 | 0.20 | 377 |
| 293 | 445.2077 | 0.38 | 338 | 63 | 234.0928 | 0.20 | 378 |
| 178 | 341.2680 | 0.38 | 339 | 321 | 495.2516 | 0.20 | 379 |
| 323 | 496.3441 | 0.38 | 340 | 3 | 147.0435 | 0.20 | 380 |
| 19 | 186.0921 | 0.38 | 341 | 49 | 220.1137 | 0.20 | 381 |
| 376 | 611.4690 | 0.37 | 342 | 186 | 346.1516 | 0.18 | 382 |
| 258 | 409.2749 | 0.37 | 343 | 234 | 391.2862 | 0.17 | 383 |
| 93 | 274.0541 | 0.36 | 344 | 168 | 335.2595 | 0.17 | 384 |
| 272 | 427.1044 | 0.36 | 345 | 105 | 279.1611 | 0.17 | 385 |
| 123 | 289.1228 | 0.36 | 346 | 175 | 339.0734 | 0.16 | 386 |
| 349 | 529.3922 | 0.36 | 347 | 62 | 233.9842 | 0.16 | 387 |
| 301 | 461.1784 | 0.35 | 348 | 67 | 242.2485 | 0.15 | 388 |
| 382 | 617.4082 | 0.34 | 349 | 152 | 321.0632 | 0.15 | 389 |

TABLE A5e-continued

| Component No. | m/z | VIP value | VIP value rank | Component No. | m/z | VIP value | VIP value rank |
|---|---|---|---|---|---|---|---|
| 425 | 973.5566 | 0.33 | 350 | 77 | 256.2649 | 0.15 | 390 |
| 339 | 519.1171 | 0.32 | 351 | 333 | 512.2555 | 0.14 | 391 |
| 393 | 686.4532 | 0.32 | 352 | 402 | 771.5090 | 0.14 | 392 |
| 271 | 425.1943 | 0.31 | 353 | 413 | 824.5537 | 0.14 | 393 |
| 45 | 214.2539 | 0.31 | 354 | 337 | 517.1378 | 0.13 | 394 |
| 426 | 975.5749 | 0.31 | 355 | 1 | 139.0389 | 0.13 | 395 |
| 177 | 341.1451 | 0.30 | 356 | 60 | 228.2321 | 0.13 | 396 |
| 312 | 478.1385 | 0.30 | 357 | 374 | 609.4550 | 0.13 | 397 |
| 415 | 829.5145 | 0.30 | 358 | 184 | 343.2292 | 0.13 | 398 |
| 381 | 614.4900 | 0.30 | 359 | 343 | 520.3438 | 0.12 | 399 |
| 375 | 611.1640 | 0.29 | 360 | 114 | 284.2960 | 0.12 | 400 |

TABLE A5f

| Component No. | m/z | VIP value | VIP value rank |
|---|---|---|---|
| 400 | 758.2248 | 0.12 | 401 |
| 416 | 840.5490 | 0.12 | 402 |
| 118 | 285.6271 | 0.12 | 403 |
| 38 | 209.1171 | 0.11 | 404 |
| 344 | 521.2610 | 0.11 | 405 |
| 290 | 442.2570 | 0.10 | 406 |
| 334 | 513.2753 | 0.10 | 407 |
| 9 | 163.1325 | 0.10 | 408 |
| 121 | 288.2911 | 0.10 | 409 |
| 201 | 363.2553 | 0.09 | 410 |
| 169 | 335.2600 | 0.09 | 411 |
| 227 | 385.2945 | 0.09 | 412 |
| 31 | 199.1333 | 0.08 | 413 |
| 237 | 394.2089 | 0.08 | 414 |
| 146 | 316.2134 | 0.08 | 415 |
| 113 | 282.2800 | 0.08 | 416 |
| 260 | 411.0022 | 0.08 | 417 |
| 401 | 759.2281 | 0.07 | 418 |
| 78 | 256.2650 | 0.07 | 419 |
| 151 | 320.9916 | 0.06 | 420 |
| 191 | 352.2528 | 0.05 | 421 |
| 362 | 568.4282 | 0.05 | 422 |
| 380 | 613.4871 | 0.05 | 423 |
| 11 | 170.0974 | 0.03 | 424 |
| 292 | 443.1020 | 0.03 | 425 |
| 419 | 923.5063 | 0.03 | 426 |
| 231 | 388.1627 | 0.02 | 427 |
| 226 | 383.2591 | 0.02 | 428 |
| 83 | 261.1501 | 0.01 | 429 |
| 138 | 301.1424 | 0.01 | 430 |
| 255 | 407.3692 | 0.01 | 431 |

A8-3. Machine learning model

A prediction model can be constructed not only by the OPLS method but also by various methods. As another example, a prediction model was constructed using machine learning. Machine learning is one of research subjects in artificial intelligence, that is, AI, and currently, applications to various fields are being developed.

Using analytical data of 97 components having higher VIP values calculated from the model constructed in the above 8-1, using all of the data items, a model was constructed by machine learning. As an analysis tool, Visual Mining Studio (hereinafter, referred to as VMS, NTT DATA Mathematical System Inc.) was used.

A8-3-1. Model construction using all of the 125 data items

All of 125 data matrices each having peak area values of analytical data of 97 components having 97th and higher VIP values per one data item and a yield value were incorporated into VMS as learning data. For model construction, an optimum model was searched for from 4 kinds including decision tree, random forest, neural network and support vector machine by a Model Optimizer function. In calculation of a model, parameters of each model were optimized and cross validation was carried out, so that a model causing no over-training is constructed. As a result, a random forest was selected for the model. A model having a higher accuracy was constructed, wherein the square ($R^2$) of correlation between actual measured values and predicted values was 0.92. Results are shown in FIG. 1B.

A8-3-2. Model construction using a half of data and prediction validation by the remaining half All of 125 data matrices each having peak area values of analytical data of 97 components with 97th and higher VIP values per one data item and a yield value were randomly divided into 2 groups; and the one group of 63 data matrices was used to construct a model by VMS and the remaining 62 data matrices were used to conduct prediction validation. Model construction was conducted by Model Optimizer in the same manner as in 8-3-1, and neural network was selected for a model. The square of correlation between actual measured values and predicted values in the 63 data matrices used for the model was 0.83, and the square of correlation between actual measured values and predicted values in the 62 data matrices not used for the model was 0.58. The accuracy of the predicted values in the validation data was lower than that of the learning data, though indicating that a certain level of prediction was possible. Results are shown in FIG. 1C.

A8-4. Model construction using VIP values as indexes (model using analytical data of 2 or more components)

Based on the ranking of VIP values (Tables A5a to A5f), which are a degree of contribution of each component to the model constructed in A8-1, models were constructed by using a plurality of components. A criterion for model performance was conveniently set to $Q^2>0.50$, though it is not particularly limited thereto.

A8-4-1. Model using analytical data of components having lower VIP values

Analytical data of all of the components having 11th and lower VIP values, analytical data of all of the components having 21st and lower VIP values, analytical data of all of the components having 31st and lower VIP values; . . . and analytical data of all of the components having 351st and lower VIP values were used to construct respective OPLS models. As a result, those satisfying $Q^2>0.5$ were models using analytical data of all of the components having 11th and lower VIP values to analytical data of all of the components having 251st and lower VIP values; and though analytical data of all of the components having 261st and lower VIP values was used, $Q^2>0.50$ was not satisfied (FIG. 1D).

A8-4-2. Model using analytical data of 2 components among components having 10th and higher VIP values OPLS models were constructed for a combination of any 2 components (45 combinations) among analytical data of components having 10th and higher VIP values. As a result, it was found that all of the models satisfied $Q^2>0.50$. This shows that as long as 2 metabolites having 10th and higher VIP values are included, a model having a certain level of predictability can be constructed (FIG. 1E).

A8-4-3. Model using analytical data of 2 consecutive components based on the VIP value Analytical data of components having: 1st and 2nd highest VIP values; 11th and 12th highest VIP values; 21st and 22nd highest VIP values; . . . and 201st and 202nd highest VIP values was used to construct respective OPLS models. As a result, the model using analytical data of 2 components having 31st and 32nd was the first model that did not satisfy $Q^2>0.50$; and with components having further lower VIP values, $Q^2$ was apt to decrease. This shows that use of analytical data of any 2 components among components having about 30th or higher VIP values generally satisfies the criterion for $Q^2$ while use of analytical data of only 2 components having about 30th or lower VIP values does not satisfy the criterion (FIG. 1F).

A8-4-4. Model using analytical data of 3 consecutive components based on the VIP value Analytical data of components having: 1st, 2nd and 3rd highest VIP values; 11th, 12th and 13th highest VIP values; 21st, 22nd and 23rd highest VIP values; . . . and 221st, 222nd and 223rd highest VIP values was used to construct respective OPLS models. As a result, the model using analytical data of 3 components having 71st, 72nd and 73rd was the first model that did not satisfy $Q^2>0.50$; with components having further lower VIP values, $Q^2$ was apt to decrease. This suggests that use of analytical data of any 3 components among components having about 70th or higher VIP values should generally satisfy the criterion for $Q^2$ while use of analytical data of only 3 components having about 70th or lower VIP values should not satisfy the criterion (FIG. 1G).

A8-4-5. Model using analytical data of 4 consecutive components based on the VIP value Analytical data of components having 1st, 2nd, 3rd and 4th highest VIP values; 11th, 12th, 13th and 14th highest VIP values; 21st, 22nd, 23rd and 24th highest VIP values; . . . and 221st, 22nd, 223rd and 224th highest VIP values was used to construct respective OPLS models. As a result, the model using analytical data of 4 components having 101st, 102nd, 103rd and 104th highest VIP values was the first model that did not satisfy $Q^2>0.50$; with components having further lower VIP values, $Q^2$ was apt to decrease. This suggests that use of analytical data of any 4 components among components having about 100th or higher VIP values should generally satisfy the criterion for $Q^2$ while use of analytical data of only 4 components having about 100th or lower VIP values should not satisfy the criterion (FIG. 1H).

A8-4-6. Model using analytical data of 5 consecutive components based on the VIP value Analytical data of components having 1st to 5th highest VIP values; 11th to 15th highest VIP values; 21st to 25th highest VIP values; . . . and 251st to 255th highest VIP values was used to construct respective OPLS models. As a result, the model using analytical data of 5 components having 101st to 105th highest VIP values was the first model that did not satisfy $Q^2>0.50$; with components having further lower VIP values, $Q^2$ was apt to decrease. This suggests that use of analytical data of any 5 components among components having about 100th or higher VIP values should generally satisfy the criterion for $Q^2$ while use of analytical data of only 5 components having about 100th or lower VIP values should not satisfy the criterion (FIG. 1I).

A8-4-7. Model using analytical data of 6 consecutive components based on the VIP value Analytical data of components having 1st to 6th highest VIP values; 11th to 16th highest VIP values; 21st to 26th highest VIP values; . . . and 281st to 286th highest VIP values was used to construct respective OPLS models. As a result, the model using analytical data of 6 components having 131st to 136th highest VIP values was the first model that did not satisfy $Q^2>0.50$; with components having further lower VIP values, $Q^2$ was apt to decrease. This suggests that use of analytical data any 6 components among components having about 130th or higher VIP values should generally satisfy the criterion for $Q^2$ while use of analytical data of only 6 components having about 130th or lower VIP values should not satisfy the criterion (FIG. 1J).

A8-4-8. Model using analytical data of 7 consecutive components based on the VIP value Analytical data of components having 1st to 7th highest VIP values; 11th to 17th highest VIP values; 21st to 27th highest VIP values; . . . and 281st to 287 highest VIP values was used to construct respective OPLS modes. As a result, the model using analytical data of 7 components having 141st to 147th highest VIP values was the first model that did not satisfy $Q^2>0.50$; with components having further lower VIP values, $Q^2$ was apt to decrease. This suggests that use of analytical data any 7 components among components having about 140th or higher VIP values should generally satisfy the criterion for $Q^2$ while use of analytical data of only 7 components having about 140th or lower VIP values should not satisfy the criterion (FIG. 1K).

A8-4-9. Model using analytical data of 8 consecutive components based on the VIP value Analytical data of components having 1st to 8th highest VIP values; 11th to 18th highest VIP values; 21st to 28th highest VIP values; . . . and 281st to 288th highest VIP values was used to construct respective OPLS modes. As a result, the model using analytical data of 8 components having 141st to 148th highest VIP values was the first model that did not satisfy $Q^2>0.50$; with components having further lower VIP values, $Q^2$ was apt to decrease. This suggests that use of analytical data of any 8 components among components having about 140th or higher VIP values should generally satisfy the criterion for $Q^2$ while use of analytical data of only 8 components having about 140th or lower VIP values should not satisfy the criterion (FIG. 1L).

A8-4-10. Model using analytical data of 9 consecutive components based on the VIP value Analytical data of components having 1st to 9th highest VIP values; 11th to 19th highest VIP values; 21st to 29th highest VIP values; . . . and 281st to 289th highest VIP values was used to construct respective OPLS modes. As a result, the model using analytical data of 9 components having 141st to 149th highest VIP values was the first model that did not satisfy $Q^2>0.50$; with components having further lower VIP values, $Q^2$ was apt to decrease. This suggests that use of analytical data any 9 components among components having about 140th or higher VIP values should generally satisfy the criterion for $Q^2$ while use of analytical data of only 9 components having about 140th or lower VIP values should not satisfy the criterion (FIG. 1M).

A8-4-11. Model using analytical data of 10 consecutive components based on the VIP value Analytical data of components having 1st to 10th highest VIP values; 11th to 20th highest VIP values; 21 to 30th highest VIP values; . . . and 281st to 290th highest VIP values was used to construct respective OPLS models. As a result, the model using analytical data of 10 components having 161st to 170th highest VIP values was the first model that did not satisfy $Q^2>0.50$; with components having further lower VIP values, $Q^2$ was apt to decrease.

Figures 1M, 1N:
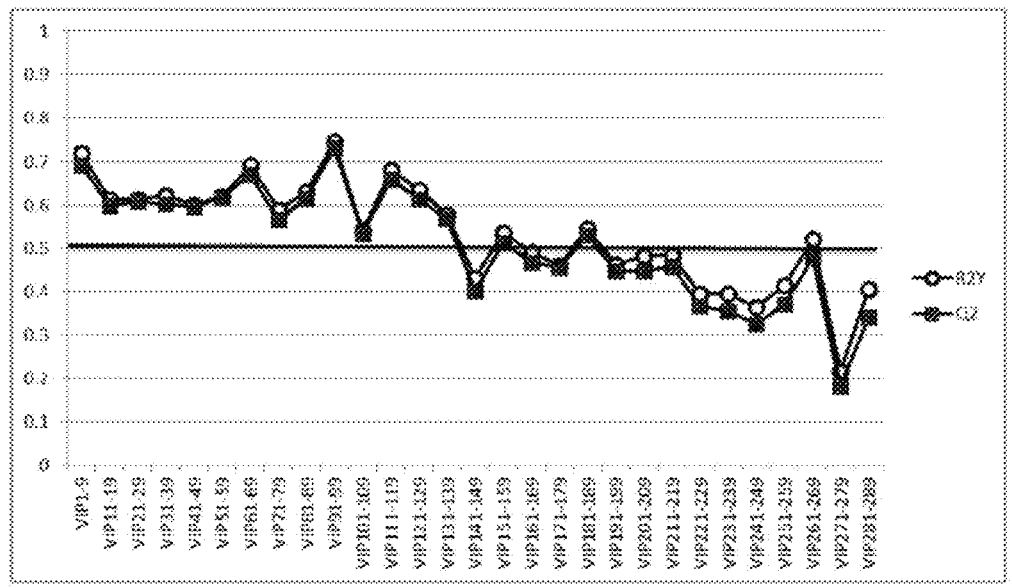
FIG. 1M shows $R^2$ values (indicated as R2Y in the figure) and $Q^2$ values (indicated as Q2 in the figure) of respective models constructed by the OPLS method using analytical data of components having: 1st to 9th highest VIP values; 11th to 19th highest VIP values; 21st to 29th highest VIP values; . . . and 281st to 289th highest VIP values in the model of FIG. 1A.
FIG. 1N shows $R^2$ values (indicated as R2Y in the figure) and $Q^2$ values (indicated as Q2 in the figure) of respective models constructed by the OPLS method using analytical data of components having: 1st to 10th highest VIP values; 11th to 20th highest VIP values; 21st to 30th highest VIP values; . . . and 281st to 290th highest VIP values in the model of FIG. 1A.
Figure 1O:
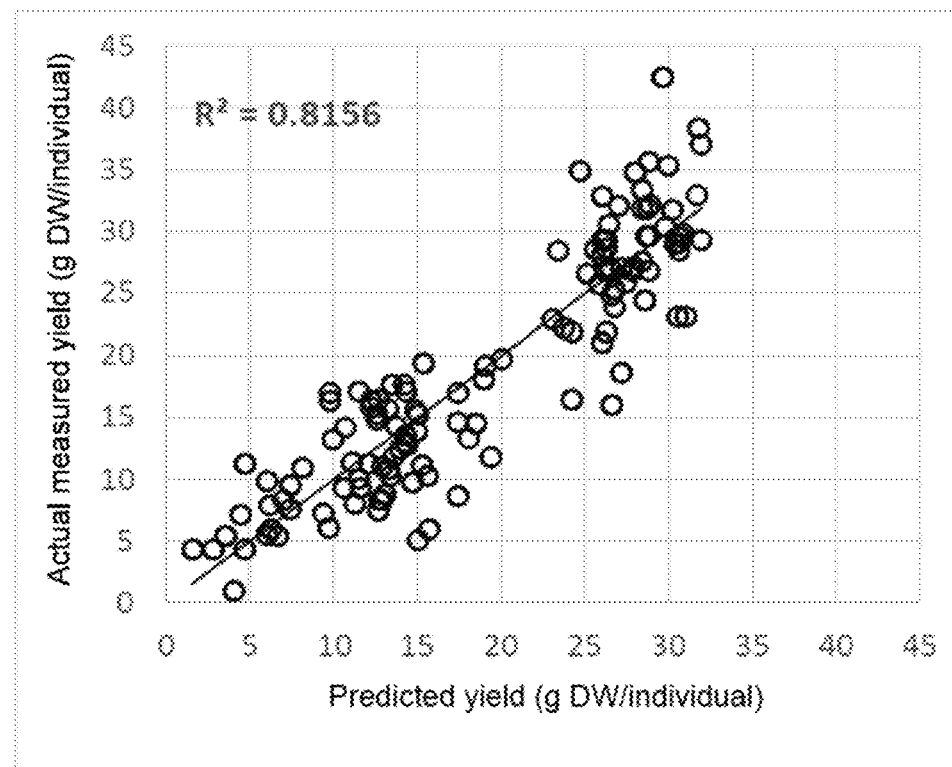
FIG. 1O shows a relation between predicted values and actual measured values of yields for an OPLS model (model A) constructed using analytical data of 100 components per one data item.

This suggests that use of analytical data of any 10 components among components having about 160th or higher VIP values should generally satisfy the criterion for $Q^2$ while use of analytical data of only 10 components having about 160th or lower VIP values should not satisfy the criterion (FIG. 1N).

A8-5. Construction/evaluation of prediction model using analytical data of 100 components Among peaks of all of the 431 components of the Tables A3a to f, peak data of 301 components was selected with consideration of a peak shape, an average detection intensity among samples or the like. With respect to these peaks of the 301 components, correction was made by calculating each peak area relative value to a peak area of lidocaine, which was added as internal standard, instead of correction on a peak intensity by the above-described pooled QC. The corrected data was used to construct a model by use of the above-described analysis tool SIMCA in the same manner as the method described in the above 8-1. That is, from all of the 125 data matrices each having peak area values of analytical data of 301 components per one data item and a yield value, an OPLS model of predicting a yield was constructed. VIP values of the constructed model were calculated (a list of VIP values is shown in Tables A6a to 6d), and a model was further constructed using analytical data of higher-order 100 components. This allowed construction of a highly accurate model having a prediction accuracy of $R^2=0.82$ and predictability of $Q^2=0.78$ (hereinafter, referred to as "prediction model A). Results are shown in FIG. 1O.

TABLE A6a

| Component No. | m/z | VIP value | VIP value rank | Component No. | m/z | VIP value | VIP value rank |
|---|---|---|---|---|---|---|---|
| 317 | 489.0813 | 1.77055 | 1 | 331 | 511.7557 | 1.40838 | 41 |
| 149 | 319.1636 | 1.76906 | 2 | 279 | 434.1386 | 1.40675 | 42 |
| 422 | 945.5359 | 1.70454 | 3 | 58 | 227.1294 | 1.40649 | 43 |
| 421 | 943.5349 | 1.69064 | 4 | 320 | 492.2465 | 1.39914 | 44 |
| 305 | 469.1831 | 1.67396 | 5 | 390 | 660.4261 | 1.39592 | 45 |
| 356 | 551.2617 | 1.64739 | 6 | 108 | 279.234 | 1.39388 | 46 |
| 328 | 503.2243 | 1.63791 | 7 | 35 | 205.0983 | 1.39265 | 47 |
| 284 | 439.1991 | 1.63616 | 8 | 44 | 213.1503 | 1.39211 | 48 |
| 68 | 243.0667 | 1.61512 | 9 | 327 | 503.1948 | 1.3918 | 49 |
| 90 | 271.0619 | 1.61188 | 10 | 245 | 401.7112 | 1.37705 | 50 |
| 355 | 550.2466 | 1.59955 | 11 | 15 | 179.0717 | 1.36853 | 51 |
| 23 | 191.1439 | 1.5905 | 12 | 381 | 614.49 | 1.36683 | 52 |
| 389 | 638.4423 | 1.58347 | 13 | 131 | 295.0936 | 1.3656 | 53 |
| 122 | 289.0727 | 1.57819 | 14 | 431 | 1155.568 | 1.36172 | 54 |
| 37 | 207.139 | 1.56538 | 15 | 313 | 479.1907 | 1.35277 | 55 |
| 308 | 473.1087 | 1.56512 | 16 | 278 | 433.1355 | 1.34884 | 56 |
| 179 | 342.2139 | 1.55816 | 17 | 388 | 636.4255 | 1.34789 | 57 |
| 329 | 511.128 | 1.55761 | 18 | 233 | 390.1892 | 1.33887 | 58 |
| 428 | 1013.536 | 1.54261 | 19 | 39 | 209.1178 | 1.32997 | 59 |
| 51 | 221.602 | 1.5421 | 20 | 252 | 406.1362 | 1.32913 | 60 |
| 304 | 468.393 | 1.53562 | 21 | 158 | 325.1444 | 1.32794 | 61 |
| 325 | 499.2284 | 1.52765 | 22 | 362 | 568.4282 | 1.31211 | 62 |
| 358 | 562.7721 | 1.52442 | 23 | 17 | 181.1237 | 1.30854 | 63 |
| 42 | 209.1548 | 1.52428 | 24 | 294 | 448.1949 | 1.30421 | 64 |
| 310 | 474.1748 | 1.51861 | 25 | 73 | 252.0874 | 1.30002 | 65 |
| 93 | 274.0541 | 1.51626 | 26 | 385 | 621.2735 | 1.29533 | 66 |
| 20 | 189.1278 | 1.4956 | 27 | 261 | 411.1627 | 1.29416 | 67 |
| 367 | 595.3716 | 1.49373 | 28 | 71 | 245.2281 | 1.29336 | 68 |
| 299 | 457.2091 | 1.49328 | 29 | 57 | 227.1286 | 1.28804 | 69 |
| 363 | 577.3607 | 1.48994 | 30 | 7 | 161.0606 | 1.28302 | 70 |
| 139 | 305.0674 | 1.48563 | 31 | 208 | 367.2635 | 1.28092 | 71 |
| 395 | 741.229 | 1.47979 | 32 | 282 | 435.1304 | 1.27221 | 72 |
| 214 | 371.2075 | 1.45872 | 33 | 330 | 511.3803 | 1.27084 | 73 |
| 309 | 473.2048 | 1.45222 | 34 | 176 | 341.1385 | 1.25939 | 74 |
| 54 | 226.0991 | 1.4461 | 35 | 161 | 327.234 | 1.25935 | 75 |
| 22 | 191.1437 | 1.43968 | 36 | 359 | 563.3983 | 1.24934 | 76 |
| 399 | 748.4819 | 1.43323 | 37 | 165 | 335.1237 | 1.24653 | 77 |
| 298 | 455.1197 | 1.42462 | 38 | 187 | 349.0912 | 1.24407 | 78 |
| 316 | 484.2764 | 1.42231 | 39 | 396 | 742.4794 | 1.24158 | 79 |
| 357 | 551.4265 | 1.42047 | 40 | 353 | 547.1474 | 1.2402 | 80 |

TABLE A6b

| Component No. | m/z | VIP value | VIP value rank | Component No. | m/z | VIP value | VIP value rank |
|---|---|---|---|---|---|---|---|
| 318 | 489.2158 | 1.23872 | 81 | 236 | 393.7143 | 1.05976 | 121 |
| 380 | 613.4871 | 1.23025 | 82 | 371 | 607.2588 | 1.05679 | 122 |
| 352 | 545.3872 | 1.22961 | 83 | 110 | 281.2485 | 1.05572 | 123 |
| 157 | 323.129 | 1.2246 | 84 | 408 | 806.5469 | 1.04926 | 124 |
| 223 | 382.2026 | 1.21882 | 85 | 212 | 371.1876 | 1.03839 | 125 |
| 116 | 285.1713 | 1.20675 | 86 | 121 | 288.2911 | 1.02782 | 126 |
| 153 | 321.0983 | 1.20427 | 87 | 398 | 747.4319 | 1.01872 | 127 |
| 237 | 394.2089 | 1.20007 | 88 | 29 | 196.1127 | 1.01759 | 128 |
| 80 | 257.1908 | 1.19501 | 89 | 213 | 371.1881 | 1.00613 | 129 |
| 227 | 385.2945 | 1.193 | 90 | 231 | 388.1627 | 1.00361 | 130 |
| 85 | 263.2381 | 1.17462 | 91 | 194 | 355.1027 | 1.00203 | 131 |
| 253 | 406.2078 | 1.16788 | 92 | 192 | 353.2713 | 1.00066 | 132 |
| 283 | 436.1466 | 1.16421 | 93 | 45 | 214.2539 | 0.996429 | 133 |
| 171 | 337.0938 | 1.16401 | 94 | 406 | 786.4227 | 0.993686 | 134 |
| 300 | 457.2096 | 1.1627 | 95 | 70 | 243.2114 | 0.988679 | 135 |
| 160 | 327.2336 | 1.16134 | 96 | 303 | 468.2829 | 0.984387 | 136 |
| 392 | 673.3398 | 1.15953 | 97 | 48 | 219.195 | 0.976457 | 137 |
| 21 | 190.0506 | 1.15321 | 98 | 142 | 307.0943 | 0.969991 | 138 |
| 95 | 274.1606 | 1.14921 | 99 | 276 | 433.114 | 0.967822 | 139 |
| 86 | 264.2335 | 1.14791 | 100 | 196 | 357.1705 | 0.967732 | 140 |
| 59 | 228.1954 | 1.14714 | 101 | 84 | 261.2233 | 0.964973 | 141 |
| 209 | 367.2652 | 1.14642 | 102 | 5 | 149.0234 | 0.961008 | 142 |
| 263 | 419.1201 | 1.14323 | 103 | 336 | 514.7519 | 0.945884 | 143 |
| 178 | 341.268 | 1.13934 | 104 | 246 | 403.2351 | 0.944937 | 144 |
| 269 | 424.3649 | 1.12209 | 105 | 235 | 393.2811 | 0.944355 | 145 |
| 172 | 337.1724 | 1.11567 | 106 | 277 | 433.1149 | 0.931854 | 146 |
| 138 | 301.1424 | 1.10943 | 107 | 92 | 273.0769 | 0.93107 | 147 |
| 33 | 200.2382 | 1.10224 | 108 | 372 | 607.2968 | 0.92652 | 148 |
| 412 | 820.4071 | 1.10051 | 109 | 342 | 520.12 | 0.924086 | 149 |
| 430 | 1073.561 | 1.09923 | 110 | 89 | 271.0618 | 0.921277 | 150 |
| 365 | 593.2836 | 1.09073 | 111 | 125 | 291.1973 | 0.919886 | 151 |
| 112 | 282.2236 | 1.0815 | 112 | 109 | 279.2343 | 0.91176 | 152 |
| 259 | 410.7059 | 1.07244 | 113 | 373 | 608.3 | 0.908935 | 153 |
| 271 | 425.1943 | 1.07154 | 114 | 26 | 193.1597 | 0.907314 | 154 |
| 195 | 357.1584 | 1.07151 | 115 | 403 | 773.2175 | 0.905793 | 155 |
| 91 | 271.228 | 1.07042 | 116 | 394 | 691.4073 | 0.905058 | 156 |
| 307 | 471.2243 | 1.06979 | 117 | 248 | 404.2102 | 0.899535 | 157 |
| 75 | 253.217 | 1.06608 | 118 | 285 | 439.3603 | 0.891931 | 158 |
| 286 | 440.2333 | 1.06604 | 119 | 147 | 316.2865 | 0.890769 | 159 |
| 322 | 495.2983 | 1.0656 | 120 | 38 | 209.1171 | 0.888068 | 160 |

TABLE A6c

| Component No. | m/z | VIP value | VIP value rank | Component No. | m/z | VIP value | VIP value rank |
|---|---|---|---|---|---|---|---|
| 55 | 226.161 | 0.884296 | 161 | 203 | 364.3237 | 0.677051 | 201 |
| 265 | 423.2245 | 0.881572 | 162 | 32 | 199.1818 | 0.673091 | 202 |
| 133 | 295.1299 | 0.869424 | 163 | 50 | 221.0456 | 0.672443 | 203 |
| 82 | 259.2076 | 0.856204 | 164 | 397 | 743.4423 | 0.662675 | 204 |
| 191 | 352.2528 | 0.854544 | 165 | 79 | 257.066 | 0.661677 | 205 |
| 386 | 623.303 | 0.854311 | 166 | 405 | 773.5271 | 0.657607 | 206 |
| 311 | 477.1435 | 0.850395 | 167 | 314 | 482.327 | 0.653121 | 207 |
| 351 | 541.3908 | 0.847708 | 168 | 94 | 274.0928 | 0.651551 | 208 |
| 273 | 431.1017 | 0.833449 | 169 | 43 | 211.0608 | 0.648665 | 209 |
| 12 | 171.1501 | 0.8323 | 170 | 146 | 316.2134 | 0.646683 | 210 |
| 262 | 412.3808 | 0.831045 | 171 | 376 | 611.469 | 0.645035 | 211 |
| 361 | 567.4059 | 0.824971 | 172 | 173 | 338.344 | 0.637182 | 212 |
| 53 | 225.1972 | 0.816703 | 173 | 65 | 239.0562 | 0.634986 | 213 |
| 409 | 808.5582 | 0.809804 | 174 | 64 | 235.1702 | 0.63422 | 214 |
| 136 | 298.0986 | 0.807649 | 175 | 69 | 243.1608 | 0.628617 | 215 |
| 274 | 432.2476 | 0.804418 | 176 | 81 | 259.0827 | 0.627587 | 216 |
| 103 | 279.0951 | 0.803928 | 177 | 6 | 149.0241 | 0.624768 | 217 |
| 238 | 398.2341 | 0.791282 | 178 | 417 | 842.5683 | 0.622632 | 218 |
| 229 | 387.1832 | 0.788363 | 179 | 47 | 219.1754 | 0.606305 | 219 |
| 315 | 483.0931 | 0.787775 | 180 | 128 | 293.2118 | 0.588285 | 220 |
| 144 | 309.2228 | 0.767233 | 181 | 215 | 372.1673 | 0.5841 | 221 |
| 177 | 341.1451 | 0.766103 | 182 | 30 | 197.1181 | 0.577257 | 222 |
| 207 | 367.0343 | 0.76456 | 183 | 419 | 923.5063 | 0.576356 | 223 |
| 105 | 279.1611 | 0.761907 | 184 | 354 | 549.3956 | 0.573379 | 224 |

TABLE A6c-continued

| Component No. | m/z | VIP value | VIP value rank | Component No. | m/z | VIP value | VIP value rank |
|---|---|---|---|---|---|---|---|
| 170 | 336.3128 | 0.761828 | 185 | 219 | 374.1459 | 0.570291 | 225 |
| 164 | 333.1528 | 0.760895 | 186 | 418 | 847.5255 | 0.565151 | 226 |
| 202 | 363.3128 | 0.758377 | 187 | 239 | 399.1645 | 0.563033 | 227 |
| 114 | 284.296 | 0.745895 | 188 | 145 | 315.0062 | 0.560278 | 228 |
| 16 | 181.1232 | 0.737536 | 189 | 420 | 923.5066 | 0.548696 | 229 |
| 287 | 440.2513 | 0.737014 | 190 | 87 | 265.144 | 0.547992 | 230 |
| 31 | 199.1333 | 0.734274 | 191 | 206 | 366.3393 | 0.539717 | 231 |
| 290 | 442.257 | 0.733246 | 192 | 297 | 454.2944 | 0.532544 | 232 |
| 220 | 375.271 | 0.722014 | 193 | 156 | 323.0751 | 0.531867 | 233 |
| 141 | 307.0128 | 0.713671 | 194 | 344 | 521.261 | 0.528796 | 234 |
| 27 | 194.1182 | 0.709646 | 195 | 326 | 501.7425 | 0.527237 | 235 |
| 159 | 327.0795 | 0.705695 | 196 | 414 | 824.5603 | 0.521261 | 236 |
| 76 | 255.0669 | 0.698076 | 197 | 180 | 342.339 | 0.513379 | 237 |
| 378 | 612.4753 | 0.684438 | 198 | 74 | 252.0882 | 0.513152 | 238 |
| 281 | 435.13 | 0.680551 | 199 | 186 | 346.1516 | 0.507754 | 239 |
| 132 | 295.1037 | 0.679001 | 200 | 393 | 686.4532 | 0.49992 | 240 |

TABLE A6d

| Component No. | m/z | VIP value | VIP value rank |
|---|---|---|---|
| 83 | 261.1501 | 0.497705 | 241 |
| 368 | 599.3987 | 0.455464 | 242 |
| 18 | 183.1865 | 0.454951 | 243 |
| 88 | 269.0818 | 0.453859 | 244 |
| 204 | 365.3202 | 0.451164 | 245 |
| 56 | 226.1812 | 0.450397 | 246 |
| 77 | 256.2649 | 0.44927 | 247 |
| 250 | 405.3534 | 0.448152 | 248 |
| 429 | 1069.565 | 0.442556 | 249 |
| 267 | 423.3643 | 0.44082 | 250 |
| 148 | 318.2806 | 0.439758 | 251 |
| 46 | 217.1961 | 0.427265 | 252 |
| 155 | 322.2765 | 0.420276 | 253 |
| 49 | 220.1137 | 0.41552 | 254 |
| 154 | 321.1463 | 0.414149 | 255 |
| 234 | 391.2862 | 0.409847 | 256 |
| 291 | 443.1002 | 0.40394 | 257 |
| 425 | 973.5566 | 0.390978 | 258 |
| 162 | 329.1613 | 0.384949 | 259 |
| 413 | 824.5537 | 0.384499 | 260 |
| 24 | 193.0859 | 0.369959 | 261 |
| 19 | 186.0921 | 0.361964 | 262 |
| 222 | 380.3389 | 0.340051 | 263 |
| 34 | 205.0872 | 0.320487 | 264 |
| 427 | 986.6112 | 0.318209 | 265 |
| 301 | 461.1784 | 0.31096 | 266 |
| 185 | 344.1358 | 0.30138 | 267 |
| 124 | 291.0401 | 0.301296 | 268 |
| 280 | 434.2406 | 0.300994 | 269 |
| 189 | 349.2761 | 0.28029 | 270 |
| 201 | 363.2553 | 0.0200006 | 301 |
| 375 | 611.164 | 0.264823 | 271 |
| 410 | 811.5014 | 0.259975 | 272 |
| 166 | 335.1542 | 0.254451 | 273 |
| 400 | 758.2248 | 0.244137 | 274 |
| 130 | 293.2498 | 0.238807 | 275 |
| 205 | 366.1783 | 0.212837 | 276 |
| 62 | 233.9842 | 0.212352 | 277 |
| 292 | 443.102 | 0.209713 | 278 |
| 302 | 466.2667 | 0.198848 | 279 |
| 346 | 524.3749 | 0.1896 | 280 |
| 401 | 759.2281 | 0.183927 | 281 |
| 264 | 420.2238 | 0.176272 | 282 |
| 312 | 478.1385 | 0.172508 | 283 |
| 1 | 139.0389 | 0.165085 | 284 |
| 340 | 519.209 | 0.162482 | 285 |
| 258 | 409.2749 | 0.158523 | 286 |
| 377 | 611.4711 | 0.156535 | 287 |
| 337 | 517.1378 | 0.128874 | 288 |
| 240 | 399.252 | 0.122332 | 289 |

TABLE A6d-continued

| Component No. | m/z | VIP value | VIP value rank |
|---|---|---|---|
| 150 | 319.2853 | 0.113021 | 290 |
| 104 | 279.161 | 0.103241 | 291 |
| 404 | 773.5266 | 0.0857699 | 292 |
| 293 | 445.2077 | 0.0846976 | 293 |
| 323 | 496.3441 | 0.0835826 | 294 |
| 11 | 170.0974 | 0.0818955 | 295 |
| 163 | 331.1409 | 0.0603233 | 296 |
| 175 | 339.0734 | 0.0504581 | 297 |
| 391 | 666.3033 | 0.047684 | 298 |
| 63 | 234.0928 | 0.0401202 | 299 |
| 411 | 813.5185 | 0.0334327 | 300 |

A9. Selection of optimum fertilizers or materials for each farm field

A9-1. Method for selecting materials

On Mar. 8, 2019, a soil was collected from a farm field (field converted from paddy field, 3 crops per 2 years of paddy rice-barley-soybean) where soybeans were planned to be produced for evaluation. On Mar. 18, 2019, 1 g of BestMatch (Yuagari musume-excluvise 600, Kaneko Seeds Co., Ltd.) was added as a common base fertilizer to 10 L of the collected farm field soil (equivalent to 20 kg/10 assuming that a mixed soil had a depth of 20 cm, the same amount as that to be applied to a farm field). Then, test plots 1 to 10 were prepared, wherein the following 6 material as selected candidates were used alone or a combination thereof; a recommended amount of each material was added and well mixed; and then, 1 L of each soil was put into 8 poly-pots. Soybean seeds (variety: Satono hohoemi, a product of Yamagata Prefecture in 2018, seed size: 8.5 mm or more) were planted in each poly-pot; 2 pots were placed on one vat; and then, cultivation was started on an indoor cultivation shelf (under a fluorescent lamp). Note that water was appropriately supplied to all the vats under the same condition.

On April 17 or after 4 weeks from seeding, leaves were sampled in the same manner as in the method described in the above 2. Leaves sampled from 2 individuals of each vat were mixed as one sample, extraction and analysis described in the above 4 and 5 were conducted, and component data of each sample were obtained. Note that the following materials were used as candidate materials to be selected. Further, details on test plots are shown in Table A7.

MIX compost (Kawaguchi Hiryo Kabushiki Kaisha)

Natural saponin cake (Saitama Noko-kiryo Hanbai Kabushiki Kaisha)

Soybean oil cake (The Nisshin 011110 Group, Ltd.)

Sandy fused magnesium phosphate (Akagi Bussan Kabushiki Kaisha)

Micronutrient 8 (Aminoru Kagaku Kenkyu-sho)

Ammonium sulfate (Akagi Engei)

TABLE A7

| Test plot | 1 | 2 | 3 | 4 | 5 | 6 | 7 | 8 | 9 | 10 |
|---|---|---|---|---|---|---|---|---|---|---|
| Best match (exclusive for Yuagari musume, 600) | 1 | 1 | 1 | 1 | 1 | 1 | 1 | 3 | 1 | 1 |
| MIX compost | 0 | 900 | 0 | 0 | 0 | 0 | 0 | 0 | 900 | 0 |
| Natural saponin cake | 0 | 0 | 5 | 0 | 0 | 0 | 0 | 0 | 5 | 5 |
| Soybean oil cake | 0 | 0 | 0 | 10 | 0 | 0 | 0 | 0 | 10 | 0 |
| Sandy fused magnesium phosphate fertilizer | 0 | 0 | 0 | 0 | 4 | 0 | 0 | 0 | 4 | 4 |

TABLE A7-continued

| Test plot | 1 | 2 | 3 | 4 | 5 | 6 | 7 | 8 | 9 | 10 |
|---|---|---|---|---|---|---|---|---|---|---|
| Micronutrient 8 | 0 | 0 | 0 | 0 | 0 | 3 | 0 | 0 | 3 | 3 |
| Ammonium sulfate | 0 | 0 | 0 | 0 | 0 | 0 | 0.5 | 0 | 0.5 | 0 |

Figures indicate added amounts (unit: g/10 L)

Figure 1P:
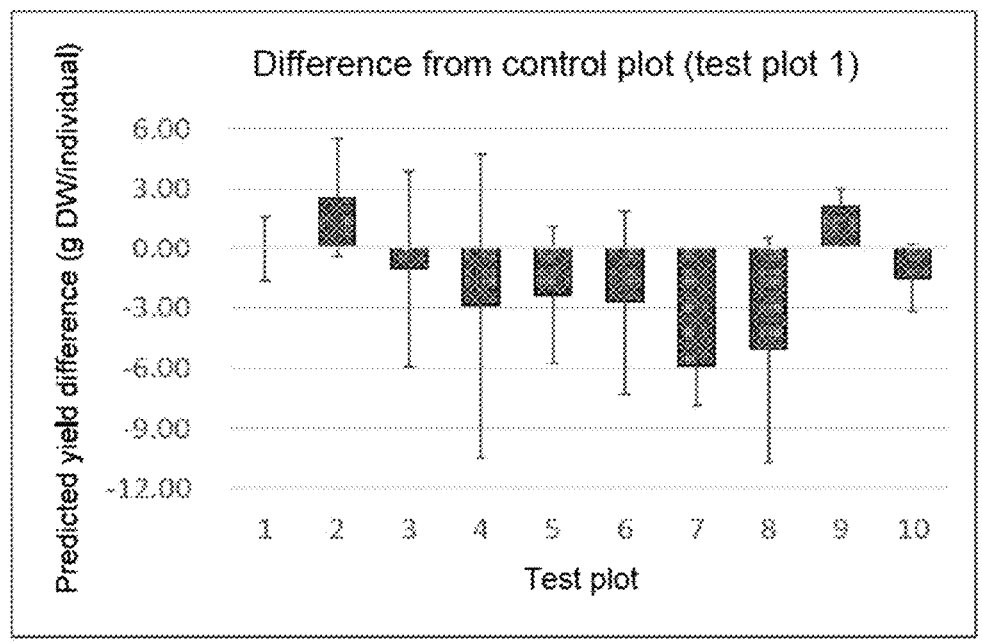
FIG. 1P shows results of yield prediction of test plots 1 to 10 using model A (differences from test plot 1).

Obtained component data was incorporated into the above-described model A, and results of yield prediction are shown in FIG. 1P. In FIG. 1P, data of n=4 was used for each test plot, and predicted yield differences from test plot 1 (control plot) are expressed by average ±standard deviation. In test plots 2 (MIX compost alone) and 9 (MIX compost mixed with other agents), to both of which MIX compost was applied, a higher yield compared to control plot was predicted. Thus, MIX compost, which was common to test plots 2 and 9, was selected as a material to be used in farm field cultivation.

Figure 1Q:
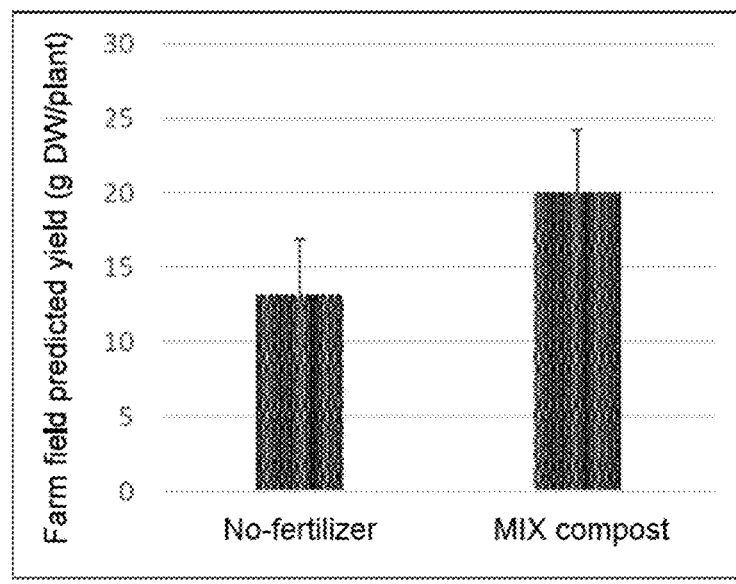
FIG. 1Q shows a farm field predicted yield using model A in a MIX compost application plot.

A9-2. Confirmation of predicted values and results of actual measured yields in farm field tests With respect to the selected material (MIX compost), a yield evaluation test in a farm field was conducted in the same year in the farm field where soybeans were planned to be produced for evaluation. The material was applied in 3 locations (3 replications) in the farm field before the day of seeding, June 25. Further, 3 replications were also set to a non-applied plot, which would be a comparative control. A test plot area for 1 location was 2 m², and the material was applied in the same amount as in the indoor cultivation test in accordance with the area. After 1 month from the seeding or July 26, leaves were sampled; yield prediction was conducted in the same manner as in the selection test; and it was examined whether the yield predictability in the farm field test was the same as that of the indoor test. With respect to leaf sampling, 2 samples sampled from mixed leaves of 5 individuals in each replication, 6 samples in total from 3 replications, were obtained. Results thereof are shown in FIG. 1Q. FIG. 1Q shows values of average ±standard deviation of predicted yields using data of n=6 in a non-applied plot and a MIX compost plot.

In the farm field test, the predicted yield in the MIX compost plot was significantly increased (p<0.05, Student's t-test) compared to the non-applied plot, and the same result as the selection test was confirmed.

After leaf sampling, cultivation was continued, and harvesting was conducted on November 12. The method described in the above-described 3 was used to obtain yield data. A yield value of each of the non-applied plot and the MIX compost plot was calculated from values of 26 plants obtained by removing 2 plants with 2 largest yields and 2 plants with 2 smallest yields from a total of 30 plants, which were formed by harvesting 10 individuals from each replication.

Figure 1R:
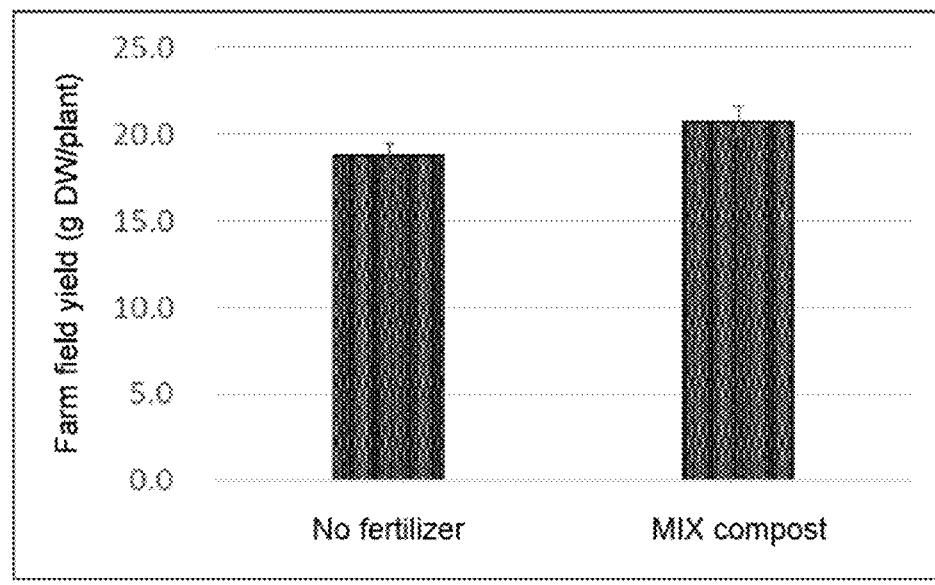
FIG. 1R shows a farm field yield in a MIX compost application.

Results thereof are shown in FIG. 1R. FIG. 1R shows values of average ±standard deviation of actual measured yields using data of n=26 in each of the non-applied plot and the MIX compost plot.

The non-applied plot had 18.7 g DW/plant while the MIX compost plot had 20.7 g DW/plant, so that 10.7% increase was observed.

The above results show that a material suitable for a farm field in that year can be selected during a short period before farm field cultivation by use of the present yield prediction model; and application of the material enables a yield increase in the farm field cultivation.

A10. Study on whether a yield is predictable at 2 and 8 weeks after seeding

In the above, a yield prediction was conducted about 1 month after seeding. Hereafter, the yield predictability at an earlier stage (2 weeks after seeding) or a later stage (8 weeks after seeding) was studied.

This test was conducted by pot cultivation in a glass house in Kanagawa Prefecture from March 2019. As a pot, 30 ⅕₀₀₀a Wagner pots were used; a domestic farm field soil was used as a soil; and 4 L of the soil was put into each pot. The total of 30 pots was divided into 3 groups of 10 pots for 3 test plots A, B and C having different fertilizer amounts from one another, and cultivation was carried out. As the fertilizer, Magamp K (HYPONeX Japan Co., Ltd.) was used, and it was applied in an amount of 10 g/pot in test plot A, 5 g/pot in test plot B, and 20 g/pot in test plot C before seeding. As soybean seeds, Enrei was used, and planted on March 14. Note that 2 seeds were planted in 1 pot, and during a cotyledon period, plants were thinned out to leave one plant/pot. Leaf sampling was conducted in the same manner as in the method described in the above 2 on April 1, 2 weeks after seeding, and May 9, 8 weeks after seeding; and extraction and analysis described in the above 4 and 5 were conducted; and component data of each sample was obtained. Finally, harvesting was conducted on June 27, and yield data for each plant was obtained by the method described in the above 3. Note that watering was conducted appropriately after seeding until harvesting.

Figure 1S:
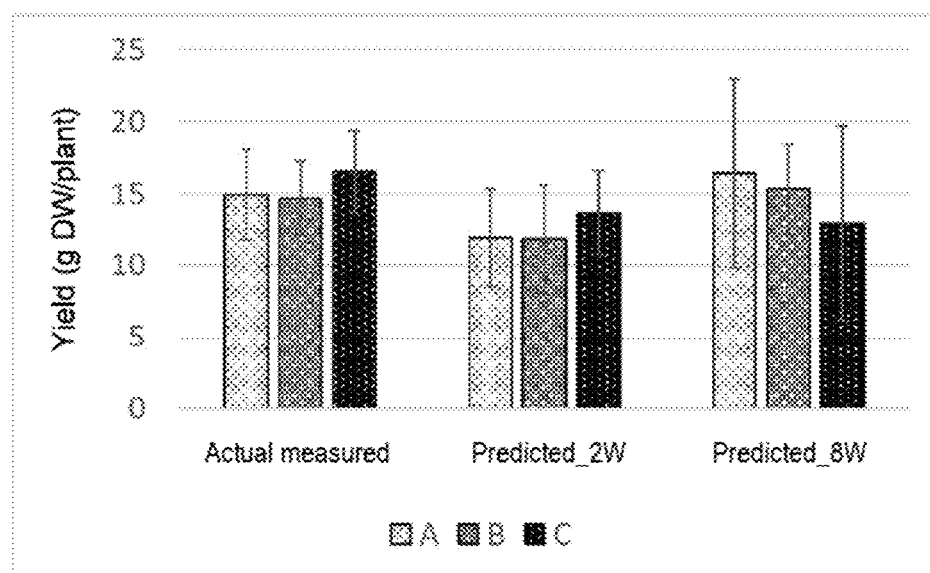
FIG. 1S shows a comparison between predicted yields by use of model A at 2 weeks and 8 weeks after seeding, and actual measured yields.

Leaves sampled at 2 weeks and 8 weeks after seeding were used to make a comparison between a predicted yield of each test plot calculated by use of model A, and an actual yield measured at the time of harvesting. Results thereof are shown in FIG. 1S. FIG. 1S shows values of average ±standard deviation of predicted yields and actual measured yields using data of n=10 in the test plots A to C.

The predicted yields at 2 weeks after seeding reflects a difference from the actual measured yield in each test plot, and this indicates that the yielding ability can be evaluated at 2 weeks after seeding. Meanwhile, results at 8 weeks after seeding fail to reflect a difference from the actual measured yield in each test plot though the sampling timing was much closer to the harvesting timing.

These results show that the present yield prediction method is featured by enabling a prediction with much higher accuracy at an initial stage of growth such as 2 to 4 weeks after seeding.

A11. Construction of a yield prediction model using farm field data

A11-1. Outline of each firm field test

A11-1-1. Farm field test in 2015

Cultivation was conducted in a producer's farm field (field converted from paddy field, 3 crops per 2 years of paddy rice-barley-soybean) in Tochigi Prefecture. Fertilization before seeding was conducted so as to have a ratio of nitrogen:phosphoric acid:potassium of 2.4:8:8 (Kg/10a), and further, 40 kg of calcium silicate fertilizer was added per 10 a. As a variety, Satono hohoemi was used. On Jun. 15, 2015, seeding was conducted. Leaf sampling was conducted as described below, and harvesting was conducted on November 1 (138 days after seeding). 9 or 10 individuals for yield prediction were collected from 3 locations in the farm field, so that the total number of individuals was 29.

A11-1-2. Farm field test (1) in 2016

Cultivation was conducted in Miyagi Prefecture. Fertilization before seeding was conducted so as to have a ratio of nitrogen:phosphoric acid:potassium of 1.5:1.5:1.5 (Kg/10 a). As a variety, Enrei was used. On Jun. 10, 2016, seeding was conducted. Leaf sampling was conducted as described below, and harvesting was conducted around the middle of November. The farm field was divided into 2 plots, A and B, based on the appearance of soil; and 12 individuals for yield prediction were collected from each of the plots A and B, so that the total number of individuals was 24.

A11-1-3. Farm field test (2) in 2016

Cultivation was conducted in a producer's farm field (field converted from paddy field, 3 crops per 2 years of paddy rice-barley-soybean, however, the farm field was different from that of the Farm field test in 2015.) in Tochigi Prefecture. Fertilization before seeding was conducted in the same manner as in 2015. As a variety, Satono hohoemi was used. On Jun. 7, 2016, seeding was conducted. Leaf sampling was conducted as described below, and harvesting was conducted around the late of November (from about 160 to 170 days after seeding). A total of 30 individual for yield prediction, that is 10 individuals from each of 3 locations in the farm field, were planned to be collected, but many green stem disorders occurred in the 2016 farm field and only 8 individuals (of 30 individuals) were harvested for yield prediction.

A11-1-4. Farm field test in 2017

Cultivation was conducted in 3 farm fields of producers (T, YS and YM) in Tochigi Prefecture. Fertilization before seeding was conducted in the same manner as in the past. As a variety, Satono hohoemi was used. Seeding was conducted in Field T on Jun. 27, 2017, in Field YM on June 29, and in Field YS on July V. Leaf sampling was conducted as described below, and harvesting was conducted in Field T on November 28, in Field YM on November 2, and in Field YS on November 2. 5 individuals for yield prediction were collected from each of 5 locations in the farm field, and the 5 individuals were put together as one sample. That is, 15 samples (of 75 individuals) in total, which were formed by 5 samples (25 individuals) of each field, were collected. With respect to the cropping system of each field, Field T was of 3 crops per 2 years of paddy rice-barley-soybean; field YM was of 4 crops per 3 years of paddy rice-paddy rice-barley-soybean, and Field YS was of monoculture of paddy rice for 10 years or longer.

A11-2. Leaf sampling

Leaf sampling was conducted in the same manner as in the method described in the above 2. The number of days from seeding when sampling was conducted in each farm field test, and the schedule are as follows.

2015 farm filed test: Jul. 15, 2015 (30 days after seeding)
2016 farm field test (1): Jul. 21, 2016 (41 days after seeding)
2016 farm field test (2): Jul. 6, 2016 (29 days after seeding)
2017 farm field test Field T: Jul. 28, 2017 (31 days after seeding)
2017 farm field test Field YM: Jul. 31, 2017 (32 days after seeding)
2017 farm field test Field YS: Aug. 7, 2017 (31 days after seeding)

A11-3. Construction of prediction model

With respect to 76 leaf samples in total obtained in farm field tests conducted in from 2015 to 2017, extraction and analysis described in the above 4 and 5 were conducted, and analytical data of each sample was obtained. The analysis described in the above 6 was made on these data items, and analytical data of 431 components of each sample was obtained in the same manner as for the data of the pot test. As an actual measured yield value used for prediction model construction, an average of each farm field (note that the 2016 farm field test (1) was divided into plots A and B) was used. An average yield value of each farm field is shown in Table A8, in which a minimum was 10.27 g DW/individual and a maximum was 27.66 g DW/individual.

TABLE A8

| Test name | Another name of test plot/ farm field | Number of samples | Variety | Average yield (g DW/plant) |
|---|---|---|---|---|
| 2015 Farm field test | None | 29 | Satono hohoemi | 20.39 |
| 2016 Farm field test (1 | Plot A | 12 | Enrei | 21.64 |
| | Plot B | 12 | Enrei | 16.04 |
| 2016 Farm field test (2) | None | 8 | Satono hohoemi | 10.27 |
| 2017 Farm field test | T | 5 | Satono hohoemi | 27.66 |
| | YM | 5 | Satono hohoemi | 23.98 |
| | YS | 5 | Satono hohoemi | 27.26 |

Figure 1T:
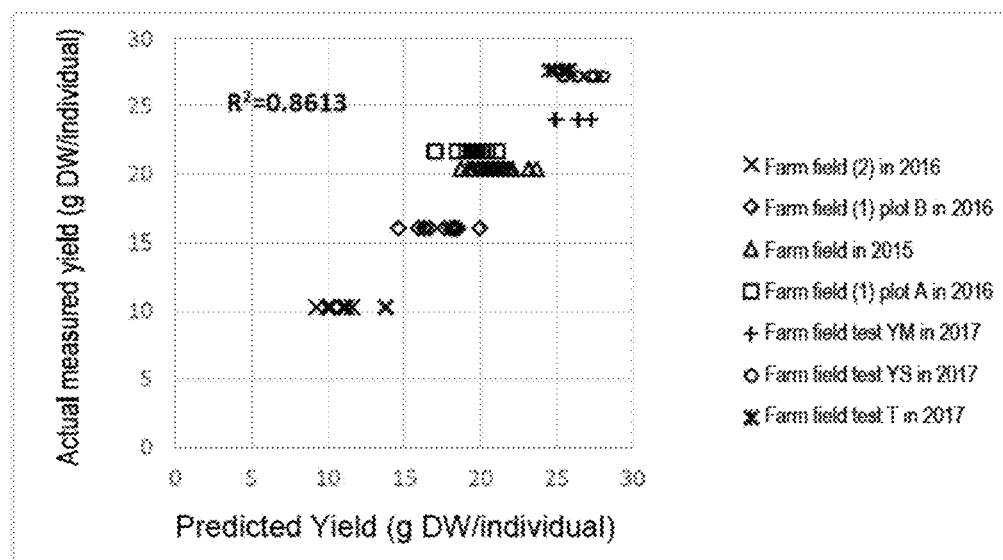
FIG. 1T shows a relation between predicted value of yields for the OPLS model constructed using farm field data (analytical data of 431 components per one data item), and actual measured value of yields.

From these results, an OPLS model for predicting a yield of each farm field was constructed using the above-described analysis tool, SIMCA. As a result of model construction, the model had prediction accuracy of $R^2=0.86$ and predictability of $Q^2=0.76e$. Results are shown in FIG. 1T.

This prediction model indicates that: use of a component composition contained in a leaf at about 1 month cultivation enables construction of a model having a high prediction performance by using samples collected from a farm field, making it possible to predict a yield at an early stage.

<Evaluation using 9 components of 2-hydroxypyridine, choline, citric acid, glyceric acid, glycine, L-pyroglutamic acid, malonic acid, sucrose and threitol>

B1. Extraction of components of collected leaves

Freeze-dried leaf samples of 125 plants shown in Tables A2a to 2c were manually ground as much as possible using a spatula. After being ground, 10 mg thereof was weighed and charged into a 2-mL tube (safe lock tube, Eppendorf), one 5 mm-diameter ball made of zirconia was added to the tube, and pulverization was conducted at 25 Hz for 1 minute by a bead pulverizer (MM400, Retsch). To the resultant product, 1 mL of solvent mixture of methanol (HPLC grade, Kanto Chemical Co., Inc.), pure water (milliQ, Merk Millipore) and chloroform (special grade, Kanto Chemical Co., Inc.) (5:2:2, v/v/v) was added, and extraction was conducted at 37° C. for 30 minutes. After extraction, centrifugation was conducted at about 2,000×g for 5 minutes by a desktop centrifuge (CHIBITAN) to separate from solid matters. After centrifugal separation, 600 μL of a supernatant was dispensed into a 1.5-mL tube, and 300 μL of pure water was added thereto. After mixing by use of a vortex mixer, centrifugal separation was conducted again for 5 minutes. 400 μL of a supernatant after centrifugation was dispensed into another 1.5-mL tube. As a QC sample used for quality collation of data and correction of a retention time, 200 μL, separately from 400 μL, was put together from each sample after centrifugal separation, and 400 μl was dispensed into another 1.5-mL tube. Methanol remaining in each sample was concentrated for 10 minutes by SpeedVac (SC-210A, Thermo Scientific). After concentration, the remaining water was frozen with liquid nitrogen, and freeze-drying was conducted overnight.

B2. Derivatization

To the extracts obtained in B1, 5 μL of a pyridine solution of myristic acid-$d_{27}$ (Cambridge Isotope Laboratories) (50

μg/mL) was added as an internal standard (for collating with a library described below). Further, as another internal standard (peak intensity correction among samples), 5 μL of a pyridine solution of ribitol (Tokyo Chemical Industry Co., Ltd.) (50 μg/mL) was added. Further, 100 μL of a pyridine solution of methoxyamine hydrochloride (20 mg/mL) was added, and incubation was conducted at 37° C. for 90 minutes (first derivatization "methoximating"). After incubation, a desktop centrifuge was used to separate from insoluble matters, and then, 50 μL of a supernatant was dispensed into a vial bottle. Next, using an auto dispenser installed on an auto sampler (Agilent 7693) of a GC system, second derivatization was conducted. Programming was made so that 50 μL of N-methyl-N-(trimethylsilyl) trifluoroacetamide (MSTFA: Thermo Scientific) was automatically added to a vial containing the pyridine solution methoximated before analysis; incubation was conducted at 37° C. for 30 minutes in a heating portion (second derivatization "silylation"), and then, GC-MS analysis was made. Note that pyridine used as a solvent was dehydrated pyridine (Kanto Chemical Co., Inc.).

B3. GC-MS analysis

1 μL of analytical sample obtained in B2 was injected into GC-MS in a split mode (10:1, v/v). A GC-MS device used herein was a combination of an Agilent 7890B GC system (Agilent), a single quadrupole analyzer Agilent 5977B GC/MSD (Agilent) and an Agilent 7693A auto sampler (Agilent). This system was used with attachment of a fused silica capillary column with 40 m×0.25 mm I.D. (ZORBAX DB5-MS+10 m Duragard Capillary Column, 122-5532G, Agilent), wherein a 10-m guard column with a film thickness of 0.25 μm was incorporated into a 30-m analytical column. The injection temperature was 250° C., and the flow rate of helium gas passing through the column was set to 0.7 mL/min. The column temperature was kept isothermal at 60° C. for 1 minute; then, increase to 325° C. at 10° C./min., and then, kept isothermal for 10 minutes. The temperatures of the conveyance line and the ion source were 300° C. and 230° C., respectively. Ions were generated by (70.0 kV) electron impact (EI), then, 2.7 times of scan was conducted per second over the mass range from 50 to 600 m/z, and data was recorded. An acceleration voltage was activated after 5.9-minute solvent delay.

Note that a QC sample was inserted every 5 to 6 analyses of analytical samples of the samples.

B4. Creation of data matrices

The data obtained by GC-MS was converted into a netCDF file format, and data matrices were created by MetAlign (Wageningen Univ.), which is peak detection and alignment software. Correction of a retention time of each peak and a peak intensity among samples was carried out by using, as an index, ribitol, which was separately added as an internal standard.

Finally, data matrices were created in a csv format. Yield values of each soybean sample were integrated thereinto, and used for data analysis.

B5. Peak identification

With respect to the analytical data obtained by GC-MS analysis, peak identification was conducted using Fiehn metabolomics RTL library from Agilent (hereinafter, Fiehn library) while taking, as a criterion, a retention time of myristic acid d27 added as an internal standard substance. The criterion for peak identification was that an error of a retention time was within 0.05 minutes from a metabolite candidate having a spectrum concordance rate of 70% or more in accordance with the Fiehn library.

B6. Search for candidate components correlating with yield

A candidate component that correlates with a yield was searched for by use of the 2016 data. Using 20 samples shown in Table B1, an analysis was made using matrix data of peaks derived from components in leaves and yield data corresponding to each sample. Peaks derived from possibly the same components were put in order by the retention time, and overlapping was removed; and then, a correlation analysis between peak data derived from each component and yields was made.

TABLE B1

| Sample name | Fiscal year | Variety | Dry fruit weight (g/individual) |
| --- | --- | --- | --- |
| KG2 | 2016 | Satono hohoemi | 32.97 |
| KG4 | 2016 | Satono hohoemi | 23.1 |
| KG6 | 2016 | Satono hohoemi | 24.87 |
| KG8 | 2016 | Satono hohoemi | 28.42 |
| MG2 | 2016 | Satono hohoemi | 35.39 |
| MG4 | 2016 | Satono hohoemi | 32.21 |
| MG5 | 2016 | Satono hohoemi | 26.97 |
| MG6 | 2016 | Satono hohoemi | 29.61 |
| MG7 | 2016 | Satono hohoemi | 26.8 |
| MG9 | 2016 | Satono hohoemi | 34.75 |
| TC1 | 2016 | Satono hohoemi | 22.87 |
| TC4 | 2016 | Satono hohoemi | 21.94 |
| TC5 | 2016 | Satono hohoemi | 21.06 |
| TC12 | 2016 | Satono hohoemi | 25.77 |
| TC15 | 2016 | Satono hohoemi | 16.52 |
| WK1 | 2016 | Satono hohoemi | 37.08 |
| WK3 | 2016 | Satono hohoemi | 31.91 |
| WK4 | 2016 | Satono hohoemi | 31.74 |
| WK6 | 2016 | Satono hohoemi | 42.53 |
| WK9 | 2016 | Satono hohoemi | 29 |

In the correlation analysis between each peak data and a yield, a simple correlation coefficient r and a p value by test of no correlation were calculated. In addition, peak information derived from each component (retention time and mass information) was collated with the Fiehn library, and thereby, as candidate components identified as being correlated with a yield, 9 components were selected, that is 2-hydroxypyridine, choline, citric acid, glyceric acid, glycine, L-pyroglutamic acid, malonic acid, sucrose and threitol. The selected 9 components were used to analyze all of the 125 samples from 2015 to 2017, which include the remaining samples.

First, all analytical data was used to conduct a correlation analysis between a relative amount of each component and a yield.

In the existing art, there have been reported studies wherein indexes in the growth process of soybeans were used to analyze the correlation with a yield. For example, Non-Patent Literature ("Yield elements and growth index based on high-yielding cases of soybean "ENREI" in heavy soil areas," Niigata Agricultural Research Institute) discloses that the length of a main stem at 40 days after seeding correlates with a yield and its correlation coefficient r is 0.51. In addition, Non-Patent Literature 6 ("Establishment of high-yielding cropping system of soybean in barley-planted area by improvement of the physicochemical property of soil," Fukui Agricultural Experiment Station and Fukui Prefectural University) discloses that the nodule activity at 50 to 60 days after seeding correlates with a yield and its correlation coefficient is 0.63. Further, another previous report ("Analytical Studies of Growth Patten in High Yielding Soybean from the Viewpoint of Dry Matter Production and Nitrogen Assimilation," Fukui Agricultural Experiment Station) discloses that the dry weight of an aboveground part at 60 to 70 days after seeding correlates with a yield and its correlation coefficient is 0.66. These findings show that evaluation on a specific index at the above-described some days after seeding enables a certain level of yield prediction. However, the prediction timing in the present art, that is about 30 days after seeding, is earlier than any of the prior art, and therefore, it can be said that a component-derived peak having at least an absolute value of correlation coefficient larger than 0.51 is a more excellent yield prediction index than the prior art.

As a result of the analysis, the correlations between the 9 components and yields are those as shown in Table B2; and 4 components, that is 2-hydroxypyridine, glycine, L-pyroglutamic acid and sucrose, are found as a compound, whose absolute value of correlation coefficient exceeds 0.51.

TABLE B2

| Component | Correlation r with yield | p |
|---|---|---|
| 2-hydroxypyridine | −0.52 | 0.000 |
| Choline | 0.01 | 0.945 |
| Citric acid | −0.38 | 0.000 |
| Glyceric acid | −0.10 | 0.288 |
| Glycine | −0.58 | 0.000 |
| L-pyroglutamic acid | −0.57 | 0.000 |
| Malonic acid | 0.41 | 0.000 |
| Sucrose | 0.57 | 0.000 |
| Threitol | −0.23 | 0.011 |

B7. Construction/evaluation of model

For construction of a yield prediction model using analytical data of 2 or more components, a multivariate analysis method was used, and SIMCA ver.14 (Umetrics) was used as an analysis tool. For a prediction model, regression analysis was made using, as explanatory variable, a peak area value of analytical data of each component, and as an objective variable, a yield value. The regression analysis was made by an OPLS method, which is an improved version of PLS method.

A method for evaluating a prediction model is to make a determination mainly by use of two indexes. One is $R^2$ representing prediction accuracy, and the other is $Q^2$ representing the predictability. $R^2$ is a square of a correlation coefficient between actual measured values of data used for the prediction model construction and predicted values calculated by the model; and $R^2$ closer to 1 indicates a higher prediction accuracy. Meanwhile, $Q^2$ is a result of the cross validation, and it expresses a square of a correlation coefficient between the actual measured values and the predicted values as a result of repeatedly-conducted model validation. From the viewpoint of prediction, if a model has at least $Q^2>0.50$, the model has a preferable predictability (Triba, M. N. et al., Mol. BioSyst. 2015, 11, 13-19). Thus, $Q^2>0.50$ was used as a criterion for model evaluation. Note that since $R^2$ is always larger than $Q^2$, $Q^2>0.50$ simultaneously satisfies $R^2>0.50$.

B8-1. Construction/evaluation of a model using all the data

An OPLS model for predicting a yield was constructed from all of 125 data matrices each having relative values of 9 components per one data item and a yield value. At the time of the construction, a component-derived peak and yield data were converted by auto scaling to have an average of 0 and a variance 1. As a result of the model construction, it had prediction accuracy of $R^2=0.56$ and predictability of $Q^2=0.55$. Results are shown in FIG. 2A. This model satisfied $Q^2>0.50$, which was set as a criterion for the prediction performance of a model. This prediction model shows that use of a component composition contained in a leaf after about 1 month of cultivation allows construction of a model having a certain level of prediction performance, enabling a yield prediction at an early stage.

B8-2. Calculation of VIP values

In the model constructed in B8-1, there is provided a degree of contribution to model performance, which is given to each component-derived peak and is called as a VIP (Variable Importance in the Projection) value. A larger VIP value have a larger degree of contribution to the model, and a VIP value also correlates with an absolute value of correlation coefficient. A list of VIP values is shown in Table B3.

TABLE B3

| Component | VIP value | VIP value rank |
|---|---|---|
| L-pyroglutamic acid | 1.44 | 1 |
| Glycine | 1.35 | 2 |
| 2-hydroxypyridine | 1.24 | 3 |
| Sucrose | 1.20 | 4 |
| Malonic acid | 0.98 | 5 |
| Citric acid | 0.92 | 6 |
| Threitol | 0.50 | 7 |
| Glyceric acid | 0.26 | 8 |
| Choline | 0.11 | 9 |

B8-3. Model construction using VIP values as indexes (model using peak information of 2 or more components)

Based on the ranking of VIP values (B8-2), which are a degree of contribution of each component-derived peak to the model constructed in B8-1, models were constructed by using a plurality of components. A criterion for model performance was conveniently set to $Q^2>0.50$, though it is not particularly limited thereto.

B8-3-1. Model using peaks derived from components having lower VIP values

Data of all components having 1st or lower VIP values, 2nd or lower VIP values, 3rd or lower VIP values, 4th or lower VIP values, 5th or lower VIP values and 6th or lower VIP values was used to construct respective OPLS models. As a result, those satisfying $Q^2>0.50$ were models using data of all of the components having 1st or lower VIP values to 3rd or lower VIP values. It was found that use of all data of the components having 4th or lower VIP values does not satisfy $Q^2>0.50$ (FIG. 2B).

B8-3-2. Model using data of a plurality of components having higher-VIP values

Data of a plurality of components having higher VIP values, that is, 1st and 2nd VIP values, 1st to 3rd VIP values and 1st to 4th VIP values was used to construct OPLS models. As a result, it was found 3 components having higher VIP values did not satisfy $Q^2>0.50$, while 4 components having higher VIP values satisfied $Q^2>0.50$. This suggests that in the case of model construction, data of at least 4 among 9 components should be used (FIG. 2C).

That is, it is determined that among models constructed using data of any 4 or more components selected from the group consisting of data of 9 components, a model satisfying $Q^2>0.50$ has the predictability. Specifically, examples thereof include the following models.

1) Model using data of 4 consecutive components having higher VIP values

Data of components having 1st to 4th highest VIP values, 2nd to 5th highest VIP values, 3rd to 6th highest VIP values, 4th to 7th highest VIP values, 5th to 8th highest VIP values and 6th to 9th highest VIP values was used to construct respective OPLS models. As a result, the model using data of components having 4th to 7th highest VIP values was the first model that did not satisfy $Q^2>0.50$; with components having further lower VIP values, $Q^2$ was apt to decrease. This suggests that use of data of any 4 components among components having 6th or higher VIP values should generally satisfy the criterion for $Q^2$ while use of data of only any 4 components selected from the group consisting of those having 4th or lower VIP values should not satisfy the criterion (FIG. 2D).

2) Model using data of 5 consecutive components having higher VIP values

Data of components having 1st to 5th highest VIP values, 2nd to 6th highest VIP values, 3rd to 7th highest VIP values, 4th to 8th highest VIP values and 5th to 9th highest VIP values was used to construct respective OPLS models. As a result, the model using data of components having 4th to 8th highest VIP values was the first model that did not satisfy $Q^2>0.50$; with components having further lower VIP values, $Q^2$ was apt to decrease. This suggests that use of data of any 5 components among components having 7th or higher VIP values should generally satisfy the criterion for $Q^2$ while use of data of only any 5 components selected from those having 4th or lower VIP values should not satisfy the criterion (FIG. 2E).

3) Model using data of 6 consecutive components having higher VIP values

Data of components having 1st to 6th highest VIP values, 2nd to 7th highest VIP values, 3rd to 8th highest VIP values and 4th to 9th highest VIP values was used to construct respective OPLS models. As a result, the model using data of components having 4th to 9th highest VIP values was the first model that did not satisfy $Q^2>0.50$. From the above, it has been found that use of data of any 6 components among components having 8th or higher VIP values generally satisfies the criterion for $Q^2$ while use of data of only any 6 components selected from 4th and lower VIP values, that is all of components having 4th and lower VIP values did not satisfy the criterion (FIGS. 2F and 2B).

4) Model using data of 7 consecutive components having higher VIP values

Data of components having 1st to 7th highest VIP values, 2nd to 8th highest VIP values and 3rd to 9th highest VIP value was used to construct respective OPLS models. As a result, all of the models satisfied $Q^2>0.50$. From the above, it has been found that use of data of any 7 components or more among the 9 components generally satisfies the criterion for $Q^2$ (FIG. 2G).

The invention claimed is:

1. A method, the method comprising:
choosing a plurality of components of a soybean plant;
acquiring first analytical data of each of the plurality of chosen components of a leaf sample collected from a plurality of first soybean plants;
constructing, by a processor, a first yield prediction model in a form of a machine learning model using the first analytical data of each of the plurality of chosen components of the leaf sample collected from the plurality of first soybean plants;
calculating a variable importance in projection (VIP) value for each of the plurality of chosen components of the leaf sample collected from the plurality of first soybean plants with respect to the first yield prediction model;
selecting a subset of the plurality of chosen components of the leaf sample collected from the plurality of first soybean plants based upon the VIP values, the subset of the plurality of chosen components of the leaf sample collected from the plurality of first soybean plants including fewer components than the plurality of chosen components;
constructing, by the processor, a second yield prediction model in a form of a machine learning model using the first analytical data of each of the components in the subset of the plurality of chosen components which includes fewer components than the plurality of chosen components;
acquiring second analytical data of the components of the subset of the plurality of chosen components which includes fewer components than the plurality of chosen components from a leaf sample collected from a second soybean plant from a field;
predicting a soybean yield using the second analytical data and the second yield prediction model, which was constructed using the first analytical data of each of the components in the subset of the plurality of chosen components which includes fewer components than the plurality of chosen components;
selecting a material for the field from which the second soybean plant came based upon the predicted soybean yield;
comparing an actual soybean yield of the second soybean plant and the predicted soybean yield; and
optimizing the second yield prediction model based upon a result of the comparison of the actual soybean yield and the predicted soybean yield.

2. The method according to claim 1, wherein the first analytical data is corrected by a pooled QC method.

3. The method according to claim 1, wherein the first analytical data is corrected by an internal standard substance.

4. The method according to claim 1, wherein the plurality of chosen components of the leaf sample collected from the plurality of first soybean plants used for constructing the first yield prediction model are at least two components selected from the group consisting of components having an accurate mass (m/z), provided by mass analysis, of 139 to 1,156.

5. The method according to claim 1, wherein the plurality of chosen components of the leaf sample collected from the plurality of first soybean plants used for constructing the first yield prediction model are at least two components selected from the group consisting of components described in the following Tables A1a to 1c, defined by an accurate mass (m/z) provided by mass analysis:

TABLE A1a

| Component No. | m/z | Component No. | m/z |
| --- | --- | --- | --- |
| 1 | 139.0389 | 81 | 259.0827 |
| 2 | 141.9592 | 82 | 259.2076 |
| 3 | 147.0435 | 83 | 261.1501 |
| 4 | 147.0446 | 84 | 261.2233 |
| 5 | 149.0234 | 85 | 263.2381 |
| 6 | 149.0241 | 86 | 264.2335 |
| 7 | 161.0606 | 87 | 265.1440 |
| 8 | 163.0398 | 88 | 269.0818 |
| 9 | 163.1325 | 89 | 271.0618 |
| 10 | 165.0550 | 90 | 271.0619 |
| 11 | 170.0974 | 91 | 271.2280 |
| 12 | 171.1501 | 92 | 273.0769 |
| 13 | 175.1486 | 93 | 274.0541 |
| 14 | 177.0551 | 94 | 274.0928 |
| 15 | 179.0717 | 95 | 274.1606 |
| 16 | 181.1232 | 96 | 275.2020 |
| 17 | 181.1237 | 97 | 275.2023 |

TABLE A1a-continued

| Component No. | m/z | Component No. | m/z |
|---|---|---|---|
| 18 | 183.1865 | 98 | 277.2184 |
| 19 | 186.0921 | 99 | 277.2186 |
| 20 | 189.1278 | 100 | 277.2186 |
| 21 | 190.0506 | 101 | 279.0512 |
| 22 | 191.1437 | 102 | 279.0515 |
| 23 | 191.1439 | 103 | 279.0951 |
| 24 | 193.0859 | 104 | 279.1610 |
| 25 | 193.0861 | 105 | 279.1611 |
| 26 | 193.1597 | 106 | 279.2320 |
| 27 | 194.1182 | 107 | 279.2333 |
| 28 | 195.0655 | 108 | 279.2340 |
| 29 | 196.1127 | 109 | 279.2343 |
| 30 | 197.1181 | 110 | 281.2485 |
| 31 | 199.1333 | 111 | 282.1376 |
| 32 | 199.1818 | 112 | 282.2236 |
| 33 | 200.2382 | 113 | 282.2800 |
| 34 | 205.0872 | 114 | 284.2960 |
| 35 | 205.0983 | 115 | 285.1255 |
| 36 | 207.0650 | 116 | 285.1713 |
| 37 | 207.1390 | 117 | 285.1718 |
| 38 | 209.1171 | 118 | 285.6271 |
| 39 | 209.1178 | 119 | 287.0566 |
| 40 | 209.1538 | 120 | 287.0567 |
| 41 | 209.1545 | 121 | 288.2911 |
| 42 | 209.1548 | 122 | 289.0727 |
| 43 | 211.0608 | 123 | 289.1228 |
| 44 | 213.1503 | 124 | 291.0401 |
| 45 | 214.2539 | 125 | 291.1973 |
| 46 | 217.1961 | 126 | 291.1975 |
| 47 | 219.1754 | 127 | 291.2340 |
| 48 | 219.1950 | 128 | 293.2118 |
| 49 | 220.1137 | 129 | 293.2130 |
| 50 | 221.0456 | 130 | 293.2498 |
| 51 | 221.6020 | 131 | 295.0936 |
| 52 | 225.1500 | 132 | 295.1037 |
| 53 | 225.1972 | 133 | 295.1299 |
| 54 | 226.0991 | 134 | 295.2288 |
| 55 | 226.1610 | 135 | 297.2436 |
| 56 | 226.1812 | 136 | 298.0986 |
| 57 | 227.1286 | 137 | 299.2023 |
| 58 | 227.1294 | 138 | 301.1424 |
| 59 | 228.1954 | 139 | 305.0674 |
| 60 | 228.2321 | 140 | 305.9907 |
| 61 | 231.0512 | 141 | 307.0128 |
| 62 | 233.9842 | 142 | 307.0943 |
| 63 | 234.0928 | 143 | 309.2075 |
| 64 | 235.1702 | 144 | 309.2228 |
| 65 | 239.0562 | 145 | 315.0062 |
| 66 | 241.1446 | 146 | 316.2134 |
| 67 | 242.2485 | 147 | 316.2865 |
| 68 | 243.0667 | 148 | 318.2806 |
| 69 | 243.1608 | 149 | 319.1536 |
| 70 | 243.2114 | 150 | 319.2853 |
| 71 | 245.2281 | 151 | 320.9916 |
| 72 | 249.0621 | 152 | 321.0632 |
| 73 | 252.0874 | 153 | 321.0983 |
| 74 | 252.0882 | 154 | 321.1463 |
| 75 | 253.2170 | 155 | 322.2765 |
| 76 | 255.0669 | 156 | 323.0751 |
| 77 | 256.2649 | 157 | 323.1290 |
| 78 | 256.2650 | 158 | 325.1444 |
| 79 | 257.0660 | 159 | 327.0795 |
| 80 | 257.1908 | 160 | 327.2336, |

TABLE A1b

| Component No. | m/z | Component No. | m/z |
|---|---|---|---|
| 161 | 327.2340 | 241 | 401.0882 |
| 162 | 329.1613 | 242 | 401.0907 |
| 163 | 331.1409 | 243 | 401.0909 |
| 164 | 333.1528 | 244 | 401.2869 |
| 165 | 335.1237 | 245 | 401.7112 |

TABLE A1b-continued

| Component No. | m/z | Component No. | m/z |
|---|---|---|---|
| 166 | 335.1542 | 246 | 403.2351 |
| 167 | 335.2595 | 247 | 404.1215 |
| 168 | 335.2595 | 248 | 404.2102 |
| 169 | 335.2600 | 249 | 405.1316 |
| 170 | 336.3128 | 250 | 405.3534 |
| 171 | 337.0938 | 251 | 405.3538 |
| 172 | 337.1724 | 252 | 406.1362 |
| 173 | 338.3440 | 253 | 406.2078 |
| 174 | 339.0715 | 254 | 407.3688 |
| 175 | 339.0734 | 255 | 407.3692 |
| 176 | 341.1385 | 256 | 409.0757 |
| 177 | 341.1451 | 257 | 409.2738 |
| 178 | 341.2680 | 258 | 409.2749 |
| 179 | 342.2139 | 259 | 410.7059 |
| 180 | 342.3390 | 260 | 411.0022 |
| 181 | 343.1022 | 261 | 411.1627 |
| 182 | 343.1042 | 262 | 412.3808 |
| 183 | 343.2288 | 263 | 419.1201 |
| 184 | 343.2292 | 264 | 420.2238 |
| 185 | 344.1358 | 265 | 423.2245 |
| 186 | 346.1516 | 266 | 423.2762 |
| 187 | 349.0912 | 267 | 423.3643 |
| 188 | 349.1485 | 268 | 423.3644 |
| 189 | 349.2761 | 269 | 424.3649 |
| 190 | 351.2558 | 270 | 424.3681 |
| 191 | 352.2528 | 271 | 425.1943 |
| 192 | 353.2713 | 272 | 427.1044 |
| 193 | 355.0832 | 273 | 431.1017 |
| 194 | 355.1027 | 274 | 432.2476 |
| 195 | 357.1584 | 275 | 432.2597 |
| 196 | 357.1705 | 276 | 433.1140 |
| 197 | 358.1656 | 277 | 433.1149 |
| 198 | 358.9809 | 278 | 433.1355 |
| 199 | 361.2551 | 279 | 434.1386 |
| 200 | 362.0177 | 280 | 434.2406 |
| 201 | 363.2553 | 281 | 435.1300 |
| 202 | 363.3128 | 282 | 435.1304 |
| 203 | 364.3237 | 283 | 436.1466 |
| 204 | 365.3202 | 284 | 439.1991 |
| 205 | 366.1783 | 285 | 439.3603 |
| 206 | 366.3393 | 286 | 440.2333 |
| 207 | 367.0343 | 287 | 440.2513 |
| 208 | 367.2635 | 288 | 441.3741 |
| 209 | 367.2652 | 289 | 441.3746 |
| 210 | 369.0831 | 290 | 442.2570 |
| 211 | 369.1268 | 291 | 443.1002 |
| 212 | 371.1876 | 292 | 443.1020 |
| 213 | 371.1881 | 293 | 445.2077 |
| 214 | 371.2075 | 294 | 448.1949 |
| 215 | 372.1673 | 295 | 449.1093 |
| 216 | 373.0778 | 296 | 449.1101 |
| 217 | 373.1291 | 297 | 454.2944 |
| 218 | 374.1088 | 298 | 455.1197 |
| 219 | 374.1459 | 299 | 457.2091 |
| 220 | 375.2710 | 300 | 457.2096 |
| 221 | 379.0634 | 301 | 461.1784 |
| 222 | 380.3389 | 302 | 466.2667 |
| 223 | 382.2026 | 303 | 468.2829 |
| 224 | 383.0771 | 304 | 468.3930 |
| 225 | 383.2574 | 305 | 469.1831 |
| 226 | 383.2591 | 306 | 471.2180 |
| 227 | 385.2945 | 307 | 471.2243 |
| 228 | 387.0938 | 308 | 473.1087 |
| 229 | 387.1832 | 309 | 473.2048 |
| 230 | 387.2032 | 310 | 474.1748 |
| 231 | 388.1627 | 311 | 477.1435 |
| 232 | 390.1035 | 312 | 478.1385 |
| 233 | 390.1892 | 313 | 479.1907 |
| 234 | 391.2862 | 314 | 482.3270 |
| 235 | 393.2811 | 315 | 483.0931 |
| 236 | 393.7143 | 316 | 484.2764 |
| 237 | 394.2089 | 317 | 489.0813 |
| 238 | 398.2341 | 318 | 489.2158 |
| 239 | 399.1645 | 319 | 489.3604 |
| 240 | 399.2520 | 320 | 492.2465 | and

TABLE A1c

| Component No. | m/z |
|---|---|
| 321 | 495.2516 |
| 322 | 495.2983 |
| 323 | 496.3441 |
| 324 | 497.3151 |
| 325 | 499.2284 |
| 326 | 501.7425 |
| 327 | 503.1948 |
| 328 | 503.2243 |
| 329 | 511.1280 |
| 330 | 511.3803 |
| 331 | 511.7557 |
| 332 | 512.2363 |
| 333 | 512.2555 |
| 334 | 513.2753 |
| 335 | 514.0452 |
| 336 | 514.7519 |
| 337 | 517.1378 |
| 338 | 517.3932 |
| 339 | 519.1171 |
| 340 | 519.2090 |
| 341 | 519.7403 |
| 342 | 520.1200 |
| 343 | 520.3438 |
| 344 | 521.2610 |
| 345 | 523.1272 |
| 346 | 524.3749 |
| 347 | 525.3656 |
| 348 | 529.3922 |
| 349 | 529.3922 |
| 350 | 535.2828 |
| 351 | 541.3908 |
| 352 | 545.3872 |
| 353 | 547.1474 |
| 354 | 549.3956 |
| 355 | 550.2466 |
| 356 | 551.2617 |
| 357 | 551.4265 |
| 358 | 562.7721 |
| 359 | 563.3983 |
| 360 | 566.1687 |
| 361 | 567.4059 |
| 362 | 568.4282 |
| 363 | 577.3607 |
| 364 | 589.4859 |
| 365 | 593.2836 |
| 366 | 595.1687 |
| 367 | 595.3716 |
| 368 | 599.3987 |
| 369 | 599.3990 |
| 370 | 599.4149 |
| 371 | 607.2588 |
| 372 | 607.2968 |
| 373 | 608.3000 |
| 374 | 609.4550 |
| 375 | 611.1640 |
| 376 | 611.4690 |
| 377 | 611.4711 |
| 378 | 612.4753 |
| 379 | 613.4849 |
| 380 | 613.4871 |
| 381 | 614.4900 |
| 382 | 617.4082 |
| 383 | 617.4263 |
| 384 | 618.0719 |
| 385 | 621.2735 |
| 386 | 623.3030 |
| 387 | 627.4672 |
| 388 | 636.4255 |
| 389 | 638.4423 |
| 390 | 660.4261 |
| 391 | 666.3033 |
| 392 | 673.3398 |
| 393 | 686.4532 |
| 394 | 691.4073 |
| 395 | 741.2290 |

TABLE A1c-continued

| Component No. | m/z |
|---|---|
| 396 | 742.4794 |
| 397 | 743.4423 |
| 398 | 747.4319 |
| 399 | 748.4819 |
| 400 | 758.2248 |
| 401 | 759.2281 |
| 402 | 771.5090 |
| 403 | 773.2175 |
| 404 | 773.5266 |
| 405 | 773.5271 |
| 406 | 786.4227 |
| 407 | 796.5558 |
| 408 | 806.5469 |
| 409 | 808.5582 |
| 410 | 811.5014 |
| 411 | 813.5185 |
| 412 | 820.4071 |
| 413 | 824.5537 |
| 414 | 824.5603 |
| 415 | 829.5145 |
| 416 | 840.5490 |
| 417 | 842.5683 |
| 418 | 847.5255 |
| 419 | 923.5063 |
| 420 | 923.5066 |
| 421 | 943.5349 |
| 422 | 945.5359 |
| 423 | 969.5500 |
| 424 | 970.6150 |
| 425 | 973.5566 |
| 426 | 975.5749 |
| 427 | 986.6112 |
| 428 | 1013.5361 |
| 429 | 1069.5653 |
| 430 | 1073.5610 |
| 431 | 1155.5683. |

6. The method according to claim 5, wherein the subset of the plurality of chosen components which includes fewer components than the plurality of chosen components used for constructing the second yield prediction model are one or more component selected from the group consisting of component Nos. 13, 14, 17, 20, 21, 22, 23, 28, 35, 36, 37, 39, 41, 42, 44, 47, 48, 51, 52, 54, 57, 58, 68, 71, 73, 80, 85, 86, 90, 91, 96, 98, 99, 100, 107, 108, 110, 122, 125, 131, 134, 135, 137, 139, 142, 149, 150, 153, 157, 159, 160, 161, 171, 174, 176, 179, 181, 182, 188, 202, 208, 209, 214, 215, 217, 218, 228, 230, 235, 244, 245, 246, 247, 249, 251, 252, 253, 261, 264, 268, 275, 278, 279, 280, 282, 283, 284, 288, 294, 296, 298, 299, 305, 308, 310, 313, 317, 325, 327, 329, 330, 341, 347, 353, 355, 356, 363, 367, 369, 370, 384, 389, 395, 421, 422, 423, 428, and 431 described in the Tables A1a to 1c.

7. The method according to claim 5, wherein the subset of the plurality of chosen components which includes fewer components than the plurality of chosen components used for constructing the second yield prediction model are one or more component selected from the group consisting of component Nos. 14, 22, 23, 36, 37, 41, 42, 51, 52, 68, 90, 122, 139, 149, 159, 214, 228, 230, 235, 247, 249, 252, 253, 268, 275, 278, 284, 288, 298, 305, 308, 313, 317, 329, 347, 363, 395, 421, 422, and 428 described in the Tables A1a to 1c.

8. The method according to claim 5, wherein the subset of the plurality of chosen components which includes fewer components than the plurality of chosen components used for constructing the second yield prediction model are one or more component selected from the group consisting of component Nos. 14, 23, 36, 37, 41, 51, 68, 90, 122, 149, 214, 230, 235, 247, 249, 252, 275, 284, 298, 305, 308, 313, 317, 347, 363, 421, 422, and 428 described in the Tables A1a to 1c.

9. The method according to claim 5, wherein the subset of the plurality of chosen components which includes fewer components than the plurality of chosen components used for constructing the second yield prediction model are one or more component selected from the group consisting of soyasaponin Bb; a monoglucoside of a composition formula $C_{21}H_{22}O_{11}$, wherein a glucose is bonded to dihydroflavonol with an aglycon of a composition formula $C_{15}H_{12}O_6$; a triglycoside of a composition formula $C_{33}H_{40}O_{19}$, wherein one glucose and two rhamnoses are bonded to a flavonol with an aglycon of a composition formula $C_{15}H_{10}O_6$; and a monoglucoside of a composition formula $C_{21}H_{22}O_{12}$, wherein a glucose is bonded to dihydroflavonol with an aglycon of a composition formula $C_{15}H_{12}O_7$.

10. The method according to claim 5, wherein the subset of the plurality of chosen components which includes fewer components than the plurality of chosen components used for constructing the second yield prediction model are at least 2 of the 10 components having the 10 highest VIP values calculated with respect to the first yield prediction model, the first yield prediction model having been constructed using the components described in the Tables A1a to 1c.

11. The method according to claim 5, wherein the subset of the plurality of chosen components which includes fewer components than the plurality of chosen components used for constructing the second yield prediction model are at least 2 of the 22 components having the highest 22 VIP values calculated with respect to the first yield prediction model, the first yield prediction model having been constructed using the components described in the Tables A1a to 1c.

12. The method according to claim 5, wherein subset of the plurality of chosen components which includes fewer components than the plurality of chosen components used for constructing the second yield prediction model are at least 3 of the 63 components having the highest 63 VIP values calculated with respect to the first yield prediction model, the first yield prediction model having been constructed using the components described in the Tables A1a to 1c.

13. The method according to claim 5, wherein the subset of the plurality of chosen components which includes fewer components than the plurality of chosen components used for constructing the second yield prediction model are at least 4 of the 94 components having the highest 94 VIP values calculated with respect to the first yield prediction model, the first yield prediction model having been constructed using the components described in the Tables A1a to 1c.

14. The method according to claim 5, wherein the subset of the plurality of chosen components which includes fewer components than the plurality of chosen components used for constructing the second yield prediction model are at least 5 of the 95 components having the 95 highest VIP values calculated with respect to the first yield prediction model, the first yield prediction model having been constructed using the components described in the Tables A1a to 1c.

15. The method according to claim 5, wherein the subset of the plurality of chosen components which includes fewer components than the plurality of chosen components used for constructing the second yield prediction model are at least 6 of the 126 components having the 126 highest VIP values calculated with respect to the first yield prediction model, the first yield prediction model having been constructed using the components described in the Tables A1a to 1c.

16. The method according to claim 5, wherein the subset of the plurality of chosen components which includes fewer components than the plurality of chosen components used for constructing the second yield prediction model are at least 7 of the 137 components having the 137 highest VIP values calculated with respect to the first yield prediction model, the first yield prediction model having been constructed using the components described in the Tables A1a to 1c.

17. The method according to claim 5, wherein the subset of the plurality of chosen components which includes fewer components than the plurality of chosen components used for constructing the second yield prediction model are at least 8 of the 138 components having the 138 highest VIP values calculated with respect to the first yield prediction model, the first yield prediction model having been constructed using the components described in the Tables A1a to 1c.

18. The method according to claim 5, wherein the subset of the plurality of chosen components which includes fewer components than the plurality of chosen components used for constructing the second yield prediction model are at least 9 of the 139 components having the 139 highest VIP values calculated with respect to the first yield prediction model, the first yield prediction model having been constructed using the components described in the Tables A1a to 1c.

19. The method according to claim 5, wherein the subset of the plurality of chosen components which includes fewer components than the plurality of chosen components used for constructing the second yield prediction model are at least 10 of the 160 components having the 160 highest VIP values calculated with respect to the first yield prediction model, the first yield prediction model having been constructed using the components described in the Tables A1a to 1c.

20. The method according to claim 5, wherein the subset of the plurality of chosen components which includes fewer components than the plurality of chosen components used for constructing the second yield prediction model are the components described in the following Tables 6a to 6d selected from the components described in the Tables A1a to 1c:

| Table 6a | | Table 6b | | Table 6c | | Table 6d | |
|---|---|---|---|---|---|---|---|
| 317 | 331 | 318 | 236 | 55 | 203 | 83 | 375 |
| 149 | 279 | 380 | 371 | 265 | 32 | 368 | 410 |
| 422 | 58 | 352 | 110 | 133 | 50 | 18 | 166 |
| 421 | 320 | 157 | 408 | 82 | 397 | 88 | 400 |
| 305 | 390 | 223 | 212 | 191 | 79 | 204 | 130 |
| 356 | 108 | 116 | 121 | 386 | 405 | 56 | 205 |
| 328 | 35 | 153 | 398 | 311 | 314 | 77 | 62 |
| 284 | 44 | 237 | 29 | 351 | 94 | 250 | 292 |
| 68 | 327 | 80 | 213 | 273 | 43 | 429 | 302 |
| 90 | 245 | 227 | 231 | 12 | 146 | 267 | 346 |
| 355 | 15 | 85 | 194 | 262 | 376 | 148 | 401 |
| 23 | 381 | 253 | 192 | 361 | 173 | 46 | 264 |
| 389 | 131 | 283 | 45 | 53 | 65 | 155 | 312 |
| 122 | 431 | 171 | 406 | 409 | 64 | 49 | 1 |
| 37 | 313 | 300 | 70 | 136 | 69 | 154 | 340 |
| 308 | 278 | 160 | 303 | 274 | 81 | 234 | 258 |
| 179 | 388 | 392 | 48 | 103 | 6 | 291 | 377 |
| 329 | 233 | 21 | 142 | 238 | 417 | 425 | 337 |
| 428 | 39 | 95 | 276 | 229 | 47 | 162 | 240 |

-continued

| Table 6a | | Table 6b | | Table 6c | | Table 6d | |
|---|---|---|---|---|---|---|---|
| 51 | 252 | 86 | 196 | 315 | 128 | 413 | 150 |
| 304 | 158 | 59 | 84 | 144 | 215 | 24 | 104 |
| 325 | 362 | 209 | 5 | 177 | 30 | 19 | 404 |
| 358 | 17 | 263 | 336 | 207 | 419 | 222 | 293 |
| 42 | 294 | 178 | 246 | 105 | 354 | 34 | 323 |
| 310 | 73 | 269 | 235 | 170 | 219 | 427 | 11 |
| 93 | 385 | 172 | 277 | 164 | 418 | 301 | 163 |
| 20 | 261 | 138 | 92 | 202 | 239 | 185 | 175 |
| 367 | 71 | 33 | 372 | 114 | 145 | 124 | 391 |
| 299 | 57 | 412 | 342 | 16 | 420 | 280 | 63 |
| 363 | 7 | 430 | 89 | 287 | 87 | 189 | 411 |
| 139 | 208 | 365 | 125 | 31 | 206 | | 201. |
| 395 | 282 | 112 | 109 | 290 | 297 | | |
| 214 | 330 | 259 | 373 | 220 | 156 | | |
| 309 | 176 | 271 | 26 | 141 | 344 | | |
| 54 | 161 | 195 | 403 | 27 | 326 | | |
| 22 | 359 | 91 | 394 | 159 | 414 | | |
| 399 | 165 | 307 | 248 | 76 | 180 | | |
| 298 | 187 | 75 | 285 | 378 | 74 | | |
| 316 | 396 | 286 | 147 | 281 | 186 | | |
| 357 | 353 | 322 | 38 | 132 | 393 | | |

21. The method according to claim 5, wherein the subset of the plurality of chosen components which includes fewer components than the plurality of chosen components used for constructing the second yield prediction model are the following 100 components selected from the components described in the Tables A1a to 1c, components Nos. 7, 15, 17, 20, 21, 22, 23, 35, 37, 39, 42, 44, 51, 54, 57, 58, 68, 71, 73, 80, 85, 86, 90, 93, 95, 108, 116, 122, 131, 139, 149, 153, 157, 158, 160, 161, 165, 171, 176, 179, 187, 208, 214, 223, 227, 233, 237, 245, 252, 253, 261, 278, 279, 282, 283, 284, 294, 298, 299, 300, 304, 305, 308, 309, 310, 313, 316, 317, 318, 320, 325, 327, 328, 329, 330, 331, 352, 353, 355, 356, 357, 358, 359, 362, 363, 367, 380, 381, 385, 388, 389, 390, 392, 395, 396, 399, 421, 422, 428, and 431.

22. The method according to claim 5, wherein at least one of the first yield prediction model and the second yield prediction model is a model constructed using an OPLS method.

23. The method according to claim 5, wherein at least one of the first yield prediction model and the second yield prediction model is a model constructed using a machine learning/regression analysis method.

24. The method according to claim 1, wherein at least one of the leaf sample collected from the plurality of first soybean plants and the leaf sample collected from the second soybean plant is collected at a stage from a cotyledon stage to a seed stage.

25. The method according to claim 1, wherein at least one of the leaf sample collected from the plurality of first soybean plants and the leaf sample collected from the second soybean plant is collected at a stage from a cotyledon stage to a bloom stage.

26. The method according to claim 1, wherein the first analytical data is mass analysis data.

27. A method, the method comprising:
choosing the group consisting of 2-hydroxypyridine, choline, citric acid, glyceric acid, glycine, L-pyroglutamic acid, malonic acid, sucrose, and threitol;
acquiring first analytical data of each component from the group consisting of 2-hydroxypyridine, choline, citric acid, glyceric acid, glycine, L-pyroglutamic acid, malonic acid, sucrose, and threitol from a leaf sample collected from a plurality of first soybean plants;
constructing, by a processor, a first yield prediction model in a form of a machine learning model using the first analytical data of each component from the group consisting of 2-hydroxypyridine, choline, citric acid, glyceric acid, glycine, L-pyroglutamic acid, malonic acid, sucrose, and threitol of the leaf sample collected from the plurality of first soybean plants;
calculating a variable importance in projection (VIP) value for each component from the group consisting of 2-hydroxypyridine, choline, citric acid, glyceric acid, glycine, L-pyroglutamic acid, malonic acid, sucrose, and threitol of the leaf sample collected from the plurality of first soybean plants with respect to the first yield prediction model;
selecting a subset of the components from the group consisting of 2-hydroxypyridine, choline, citric acid, glyceric acid, glycine, L-pyroglutamic acid, malonic acid, sucrose, and threitol based upon the VIP values, the subset of the components including fewer components than the group consisting of 2-hydroxypyridine, choline, citric acid, glyceric acid, glycine, L-pyroglutamic acid, malonic acid, sucrose, and threitol;
constructing, by the processor, a second yield prediction model in a form of a machine learning model using the first analytical data of each of the components in the subset of the components including fewer components than the group consisting of 2-hydroxypyridine, choline, citric acid, glyceric acid, glycine, L-pyroglutamic acid, malonic acid, sucrose, and threitol;
acquiring second analytical data of the components of the subset of the components including fewer components than the group consisting of 2-hydroxypyridine, choline, citric acid, glyceric acid, glycine, L-pyroglutamic acid, malonic acid, sucrose, and threitol from a leaf sample collected from a second soybean plant from a field;
predicting a soybean yield using the second analytical data and the second yield prediction model, which was constructed using the first analytical data of each of the components in the subset of the components including fewer components than the group consisting of 2-hydroxypyridine, choline, citric acid, glyceric acid, glycine, L-pyroglutamic acid, malonic acid, sucrose, and threitol;
selecting a material for the field from which the second soybean plant came based upon the predicted soybean yield;
comparing an actual soybean yield of the second soybean plant and the predicted soybean yield; and
optimizing the second yield prediction model based upon a result of the comparison of the actual soybean yield and the predicted soybean yield.

* * * * *